US012785468B2

(12) United States Patent
Katsuyama

(10) Patent No.: US 12,785,468 B2
(45) Date of Patent: Nov. 3, 2026

(54) ROTARY ELECTRIC MACHINE

(71) Applicant: Mitsubishi Electric Corporation, Tokyo (JP)

(72) Inventor: Ryuto Katsuyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 278 days.

(21) Appl. No.: 18/506,728

(22) Filed: Nov. 10, 2023

(65) Prior Publication Data

US 2024/0213831 A1 Jun. 27, 2024

(30) Foreign Application Priority Data

Dec. 23, 2022 (JP) ................................. 2022-206331

(51) Int. Cl.

*H02K 1/20* (2006.01)
*H02K 9/19* (2006.01)
*H02K 11/33* (2016.01)

(52) U.S. Cl.

CPC ................. *H02K 1/20* (2013.01); *H02K 9/19* (2013.01); *H02K 11/33* (2016.01)

(58) Field of Classification Search

CPC ............ H02K 1/20; H02K 9/19; H02K 9/197; H02K 9/20; H02K 9/193; H02K 9/18; H02K 11/33; H02K 11/30; H02K 5/22; H02K 5/225; H02K 5/20; H02K 5/203

See application file for complete search history.

(56) References Cited

U.S. PATENT DOCUMENTS

2011/0169352 A1* 7/2011 Nagao .................... H02K 11/33 310/59
2013/0049495 A1* 2/2013 Matsuo ............... G06F 16/1748 310/59
2019/0123619 A1* 4/2019 Sakurada ............... H02K 5/203
2019/0131851 A1* 5/2019 Herb ...................... H02K 9/197
2019/0296605 A1* 9/2019 Okuhata ............ H02K 11/0094
2020/0395821 A1* 12/2020 Sakurada ............... H02K 11/20
2021/0313860 A1* 10/2021 Jang ......................... B60K 1/00
2022/0006350 A1* 1/2022 Kang ........................ B60K 1/00
2022/0006354 A1* 1/2022 Wang ....................... B60K 1/00

(Continued)

FOREIGN PATENT DOCUMENTS

JP 2011-182480 A 9/2011

*Primary Examiner* — Oluseye Iwarere
*Assistant Examiner* — Nicholas Lee Setzer
(74) *Attorney, Agent, or Firm* — Sughrue Mion, PLLC

(57) ABSTRACT

To provide a rotary electric machine that the cooling performance of the winding part on the axial direction one side with connection can be higher than the cooling performance of the winding part on the axial direction other side with no connection. A motor cooling passage provided in an outer circumferential part of the stator is provided with circumferential direction parts that is provided with an one side circumferential direction passage and an other side circumferential direction passage; and circumferential direction parts that is provided with an axial direction passage, wherein a length of a part of the one side circumferential direction passage which exists on an upstream side of a center position of a total length of the motor cooling passage is longer than a length of a part of the other side circumferential direction passage which exists on the upstream side of the center position.

14 Claims, 48 Drawing Sheets

(56) References Cited

U.S. PATENT DOCUMENTS

| | | | | |
|---|---|---|---|---|
| 2022/0158523 | A1* | 5/2022 | Ishikawa | F16H 57/0476 |
| 2022/0190683 | A1* | 6/2022 | Shirai | H02K 5/203 |
| 2023/0027341 | A1* | 1/2023 | Mizutani | H02K 3/50 |
| 2023/0113162 | A1* | 4/2023 | Murakami | H02K 7/1008<br>310/268 |
| 2024/0213831 | A1* | 6/2024 | Katsuyama | H02K 5/203 |

* cited by examiner

FIG. 4E D4-D4
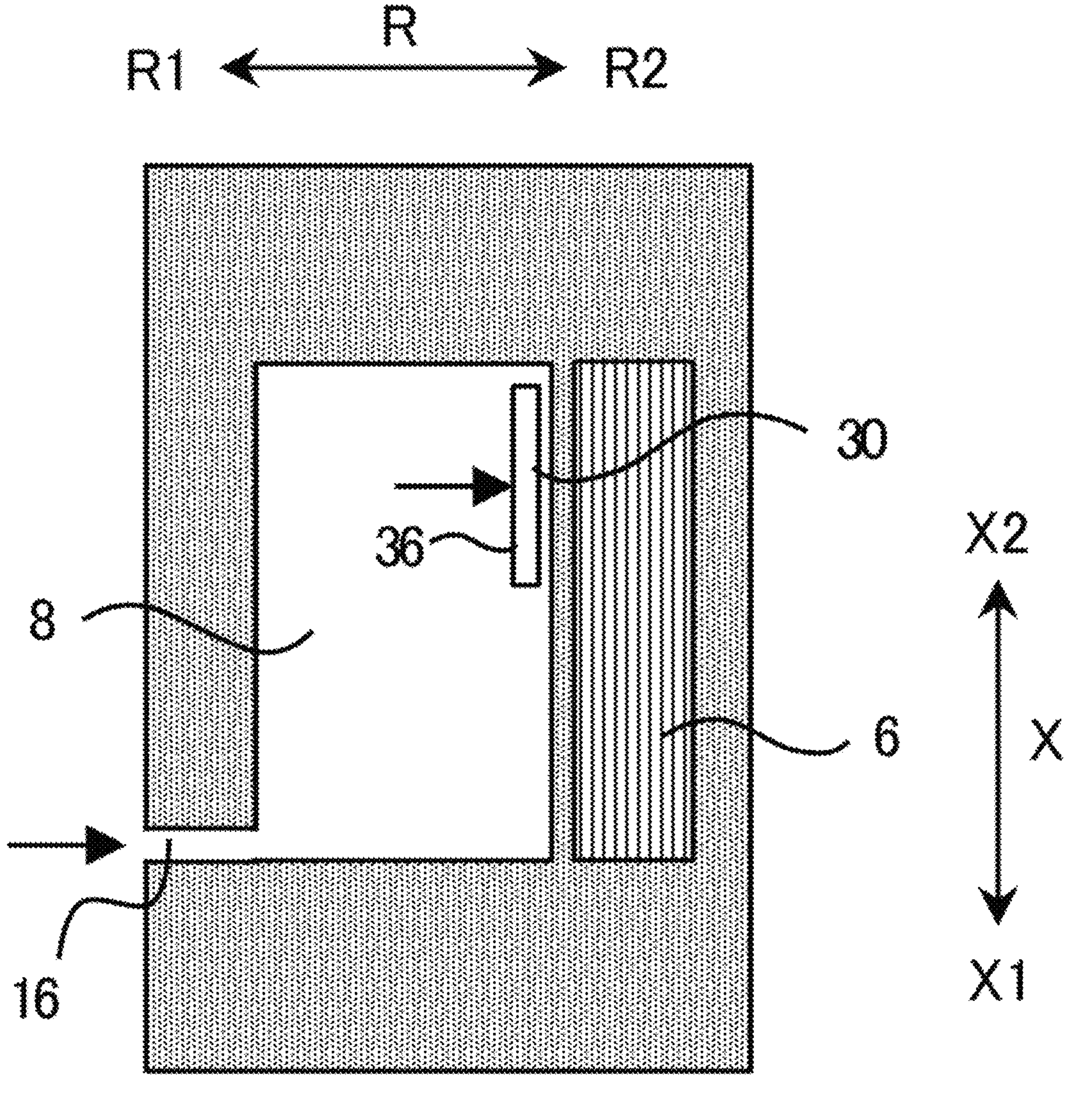

ROTARY ELECTRIC MACHINE

INCORPORATION BY REFERENCE

The disclosure of Japanese Patent Application No. 2022-206331 filed on Dec. 23, 2022 including its specification, claims and drawings, is incorporated herein by reference in its entirety.

BACKGROUND

The present disclosure relates to a rotary electric machine.

JP 2011-182480 A discloses the rotary electric machine which integrally formed the body part of the rotary electric machine and the inverter. In the technology of JP 2011-182480 A, the stator and the inverter are cooled by the common refrigerant passage.

SUMMARY

By the way, when current flows into the winding of the rotary electric machine, heat is generated. If the winding is connected in the coil end on the axial direction one side, conductor amount for connection increases and heating amount increases. Since the connected coil end is crowded, heat dissipation decreases. Therefore, the cooling performance on the axial direction one side where the connection is provided is required to be higher than the cooling performance on the axial direction other side where the connection is not provided, and the winding is required to be cooled efficiently.

However, in the technology of JP 2011-182480 A, this kind connection of the winding is not considered, and the refrigerant only flows through the outer circumferential part of the stator in the circumferential direction, uniformly in the axial direction. Accordingly, the cooling performance on the axial direction one side where the connection is provided cannot be higher than the cooling performance on the axial direction other side, the winding cannot be cooled efficiently. Accordingly, in the technology of JP 2011-182480 A, it is necessary to improve the heat resistance performance of the winding or to enlarge the cooling mechanism.

Then, the purpose of the present disclosure is to provide a rotary electric machine that the cooling performance of the winding part on the axial direction one side can be higher than the cooling performance of the winding part on the axial direction other side, if the winding is connected in the coil end on the axial direction one side.

A rotary electric machine according to the present disclosure including:

- a cylindrical tubular stator;
- a winding that is distributed in a circumferential direction and is wound around the stator;
- a rotor that is disposed on a radial direction inside of the stator;
- a case that covers an outer circumferential face of the stator, and houses the stator, the winding, and the rotor; and
- a motor cooling passage that is provided in an outer circumferential part of the stator;
- wherein the winding is connected in an one side coil end which is projected to the axial direction one side from the stator,
- wherein the motor cooling passage is provided with one or a plurality of circumferential direction parts that is provided with an one side circumferential direction passage which is an axial direction one side passage and an other side circumferential direction passage which is an axial direction other side passage, which are divided into the axial direction and extend in the circumferential direction; and one or a plurality of circumferential direction parts that is provided with an axial direction passage which communicates the one side circumferential direction passage and the other side circumferential direction passage and extends in the axial direction,
- wherein a refrigerant supplied from an inflow port flows through the one side circumferential direction passage and the other side circumferential direction passage in order via the axial direction passage, and then is discharged from an outflow port,
- a length of a part of the one side circumferential direction passage which exists on an upstream side of a center position of a total length of the motor cooling passage is longer than a length of a part of the other side circumferential direction passage which exists on the upstream side of the center position of the total length of the motor cooling passage.

According to the rotary electric machine of the present disclosure, the motor cooling passage which is provided in the outer circumferential part of the stator and extends in the circumferential direction is divided into the axial direction. And, the length of the part of the one side circumferential direction passage which exists on the upstream side of the center position of the total length of the motor cooling passage is longer than the length of the part of the other side circumferential direction passage which exists on the upstream side of the center position of the total length of the motor cooling passage. Accordingly, an average temperature of the refrigerant which flows through the one side circumferential direction passage becomes lower than an average temperature of the refrigerant which flows through the other side circumferential direction passage. Accordingly, by the one side circumferential direction passage whose refrigerant temperature is comparatively low, the axial direction one side part of the stator close to the one side coil end whose heating amount becomes comparatively large due to the connection can be cooled effectively. Therefore, the cooling performance of the winding part on the axial direction one side can be higher than the cooling performance of the winding part on the axial direction other side, the winding can be cooled efficiently, and the cooling mechanism can be miniaturized.

BRIEF DESCRIPTION OF THE DRAWINGS

FIG. 4E is a schematic cross-sectional view of the rotary electric machine cut at D4-D4 cross section position of FIG. 4D, which shows the module cooling passage and the like, according to Embodiment 4;

DETAILED DESCRIPTION OF THE EMBODIMENTS

1. Embodiment 1

Figure 1A:
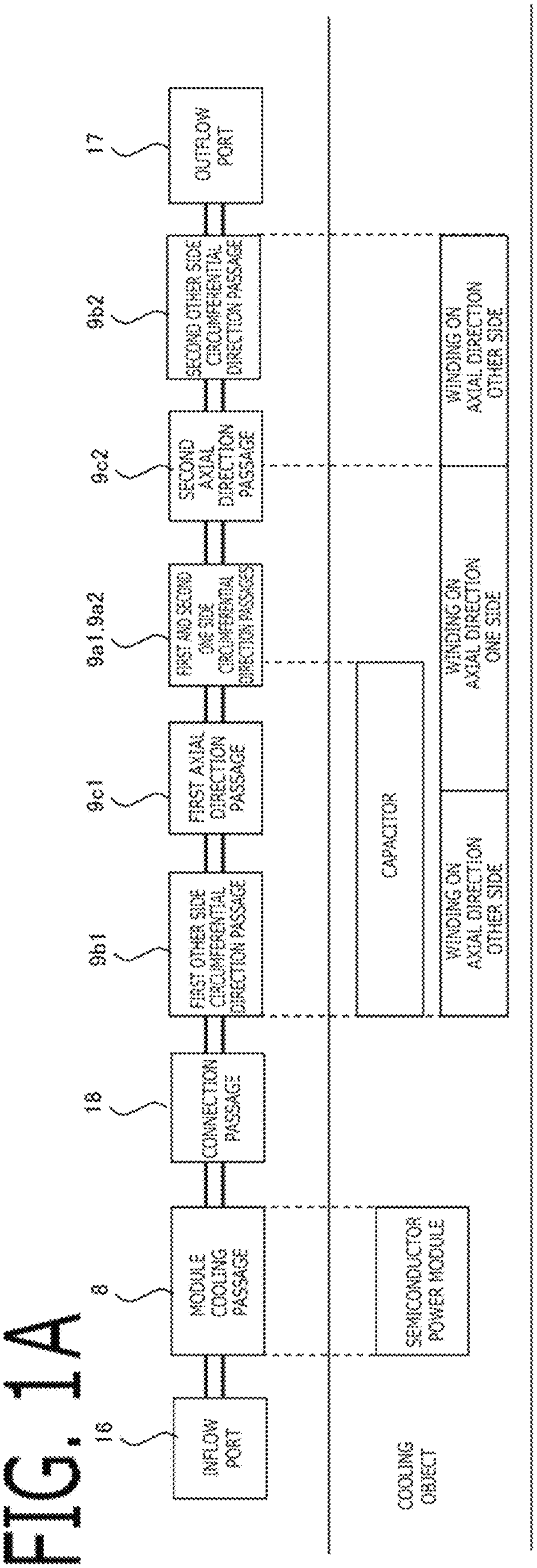
FIG. 1A is a schematic diagram showing an order of refrigerant flow, and a cooling object, according to Embodiment 1.
Figure 1B:
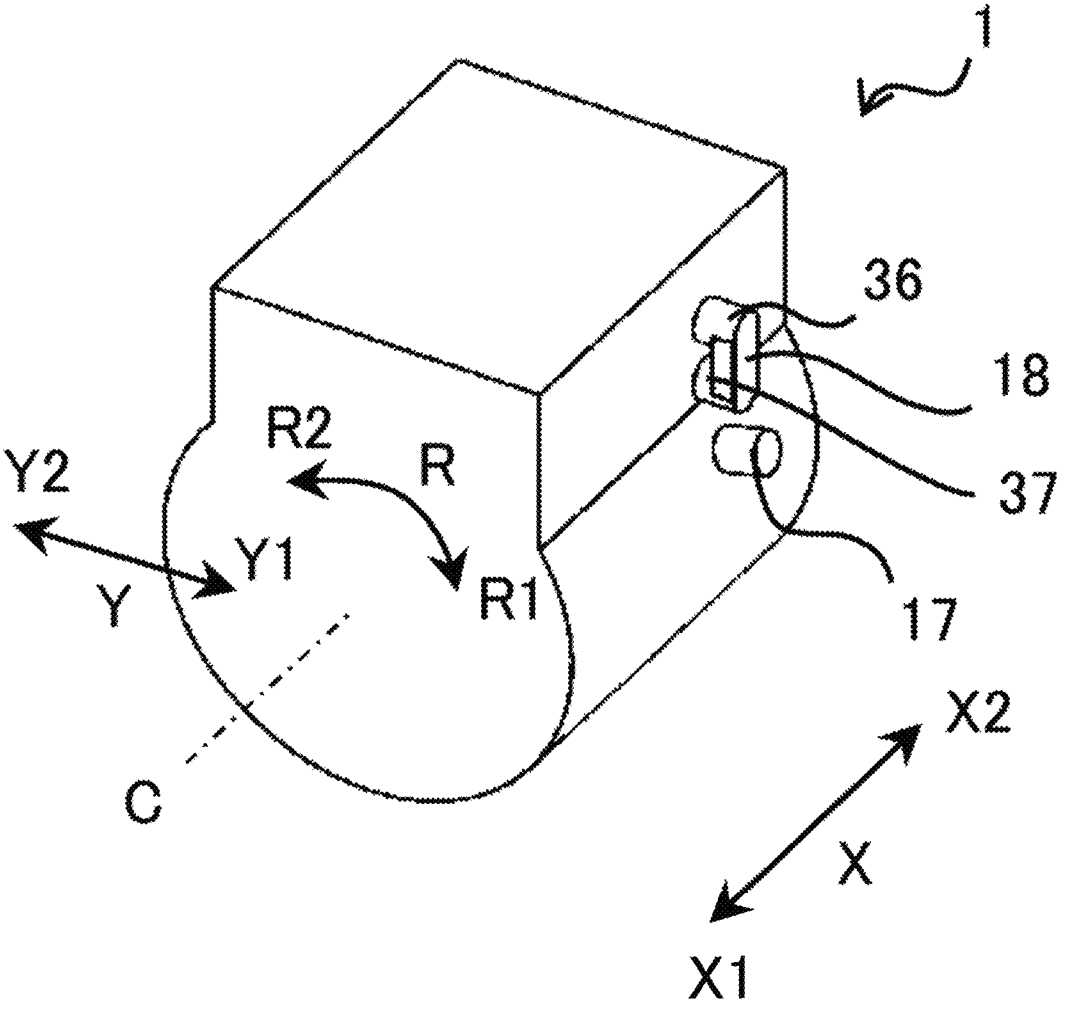
FIG. 1B is a schematic isometrical drawing of the rotary electric machine, according to Embodiment 1.
Figure 1C:
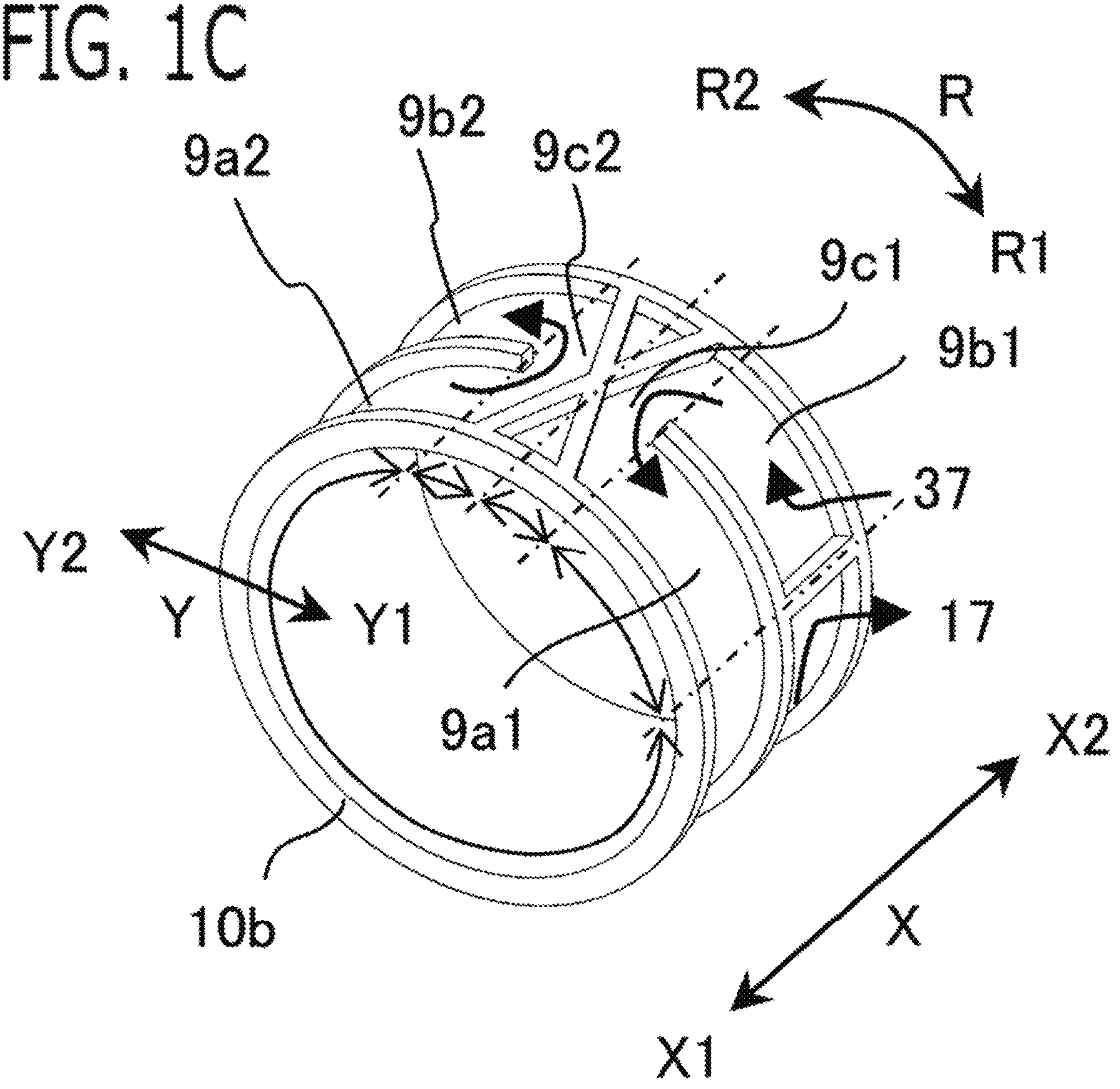
FIG. 1C is an isometrical drawing of a principal part for explaining the motor cooling passage provided in the outer circumferential part of the stator, according to Embodiment 1.
Figure 1D:
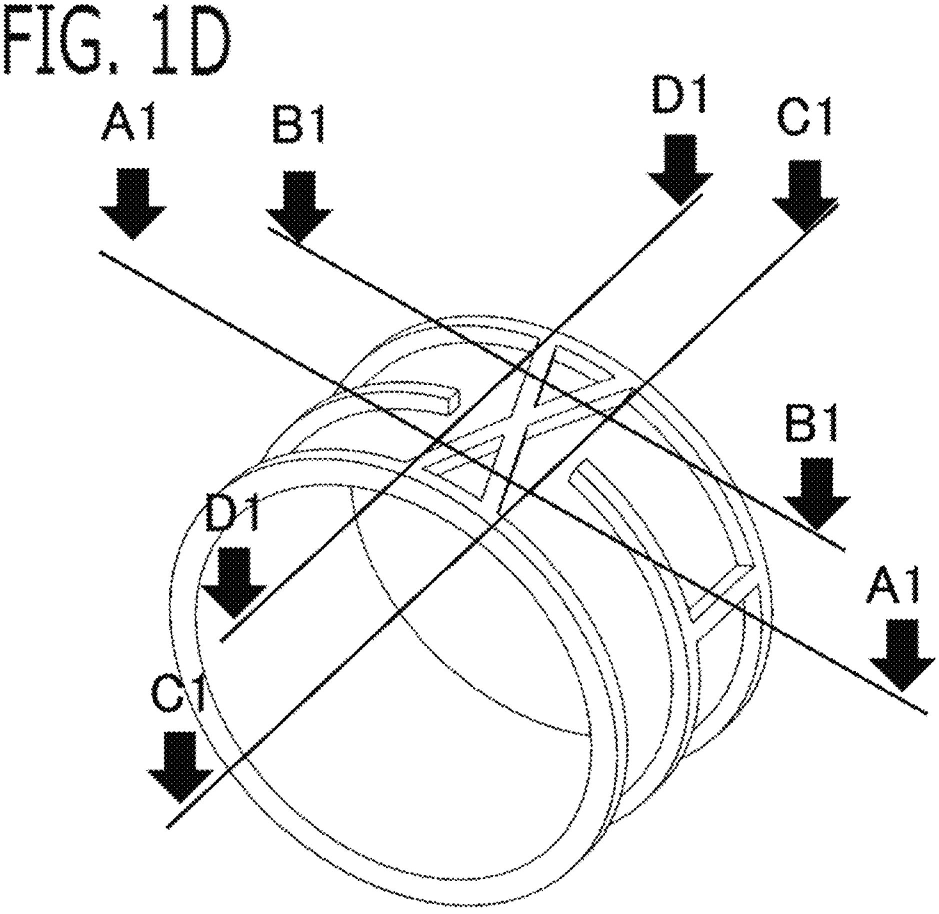
FIG. 1D is an indication figure of cross section position showing a relation between the cross section positions of the rotary electric machine and the motor cooling passage which are shown in FIG. 1G to FIG. 1J, according to Embodiment 1.
Figure 1E:
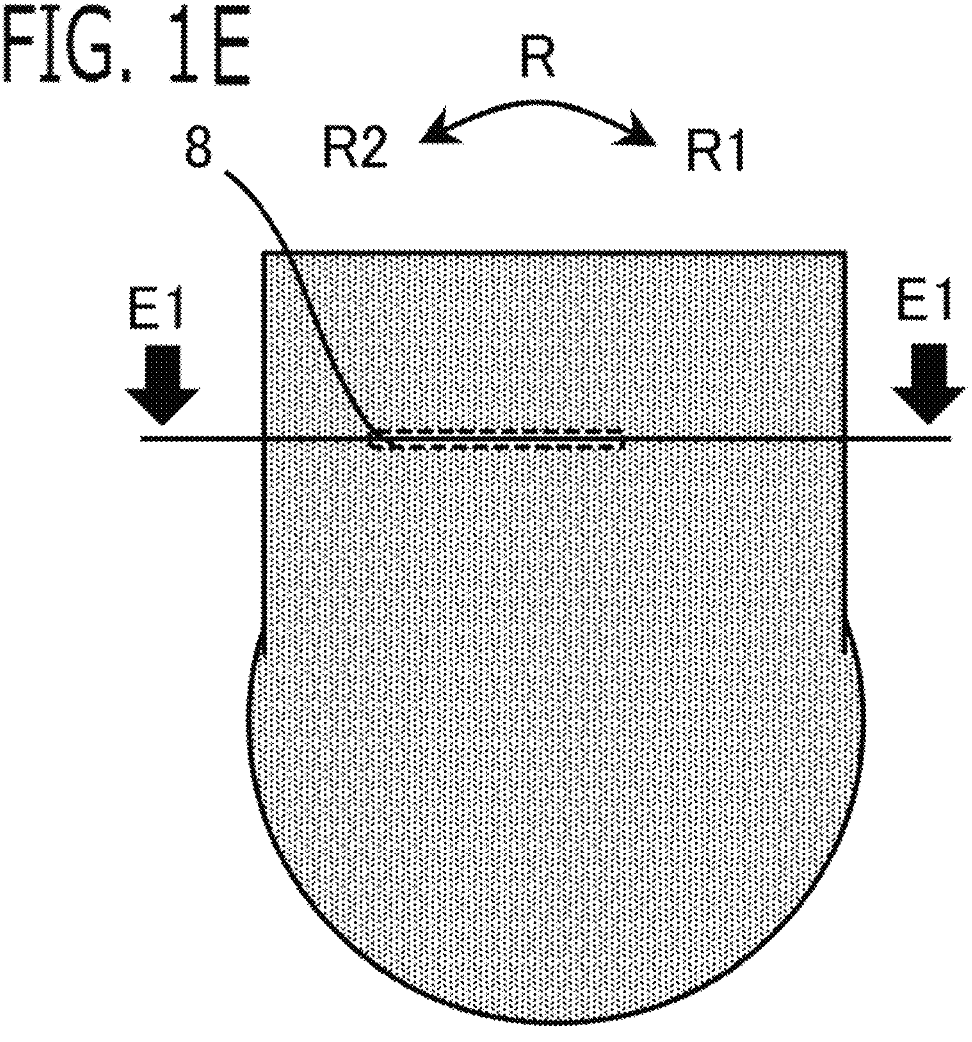
FIG. 1E is a schematic indication figure of cross section position of the rotary electric machine cut in the radial direction, which shows the cross section position of the rotary electric machine shown in FIG. 1F, according to Embodiment 1.
Figure 1F:
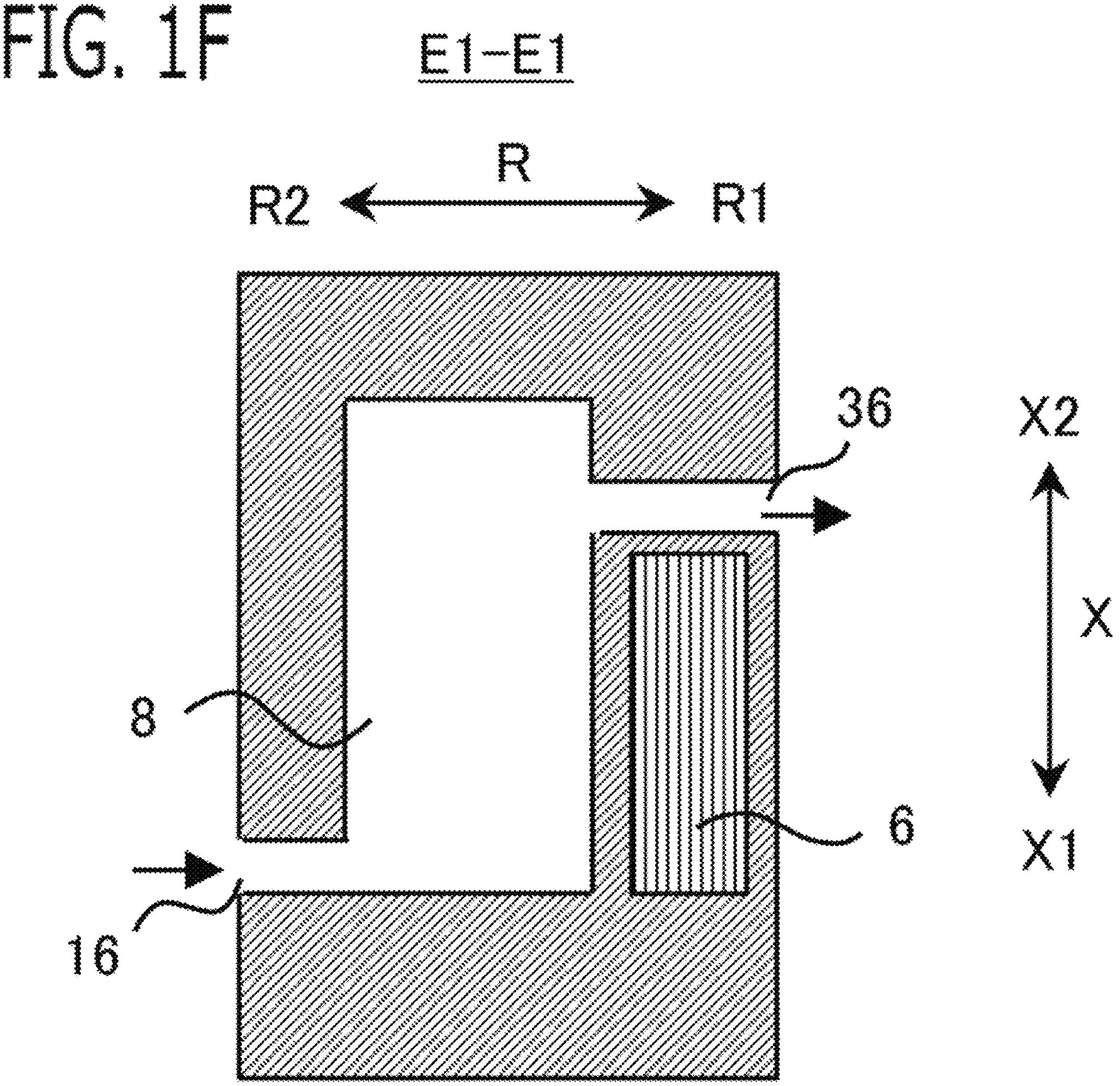
FIG. 1F is a schematic cross-sectional view of the rotary electric machine cut at E1-E1 cross section position of FIG. 1E, which shows a module cooling passage and the like, according to Embodiment 1.
Figure 1G:
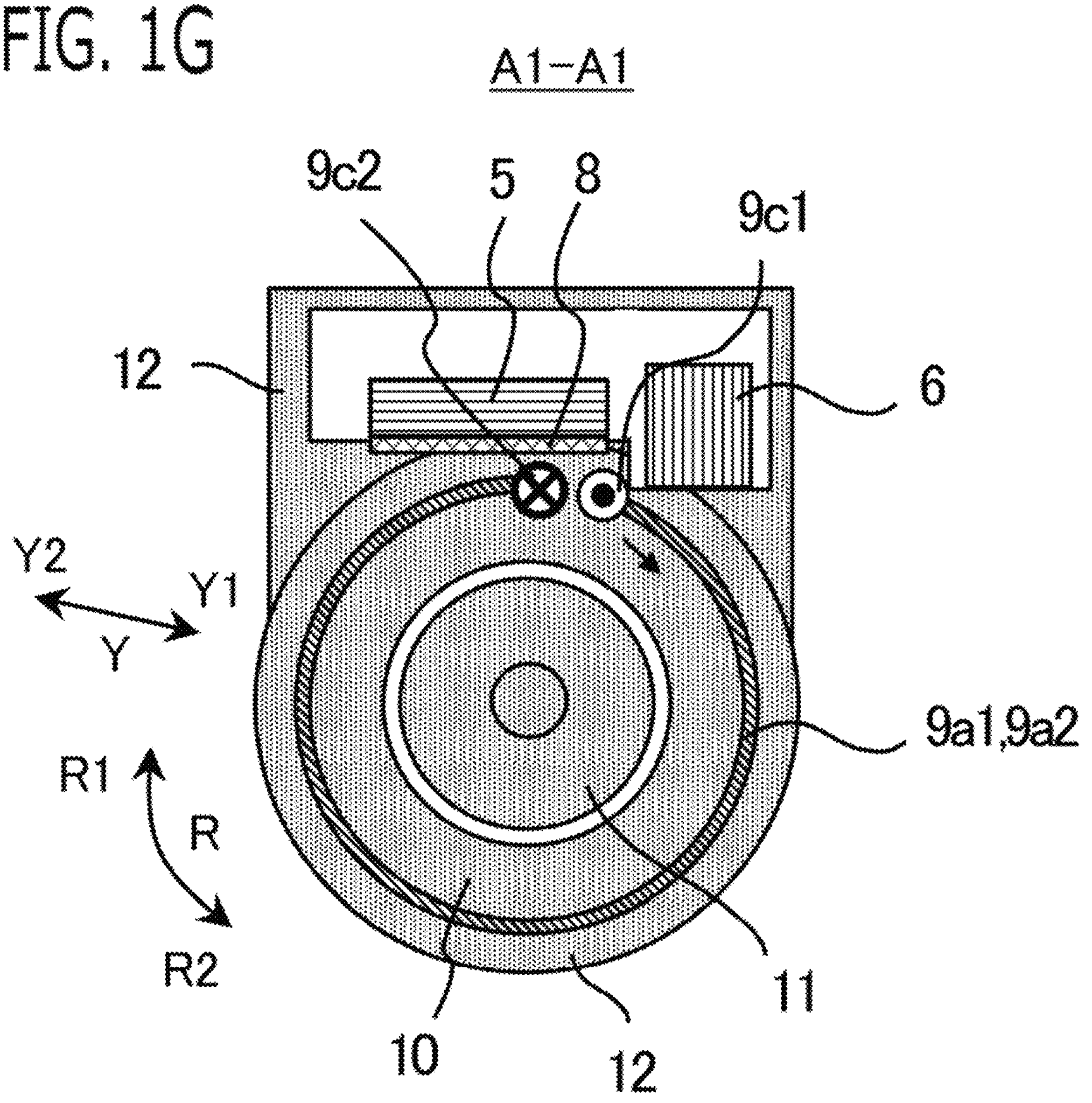
FIG. 1G is a schematic cross-sectional view of the rotary electric machine cut in the radial direction at A1-A1 cross section position of FIG. 1D, according to Embodiment 1.
Figure 1H:
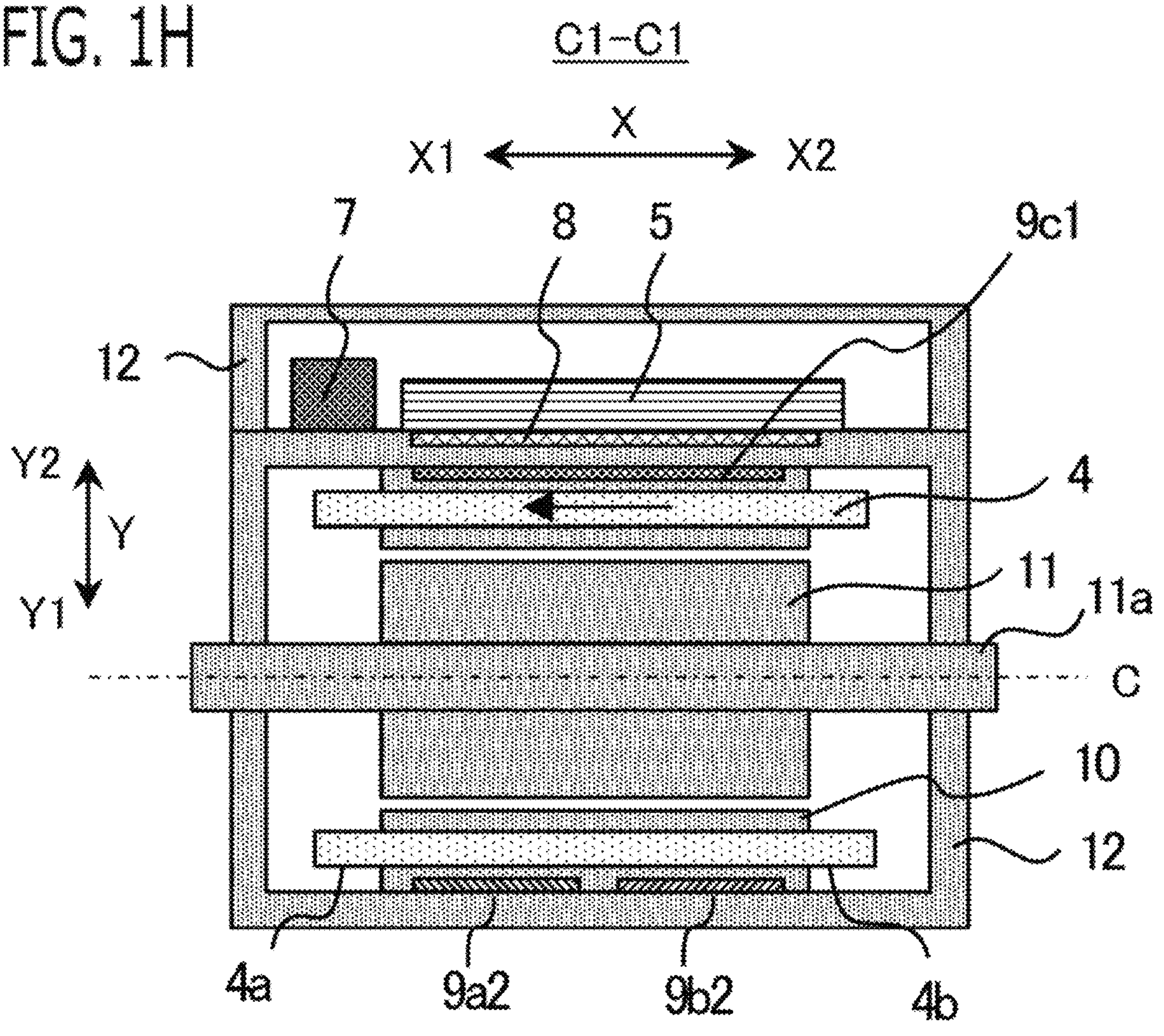
FIG. 1H is a schematic cross-sectional view of the rotary electric machine cut in the axial direction at C1-C1 cross section position of FIG. 1D, according to Embodiment 1.
Figure 1I:
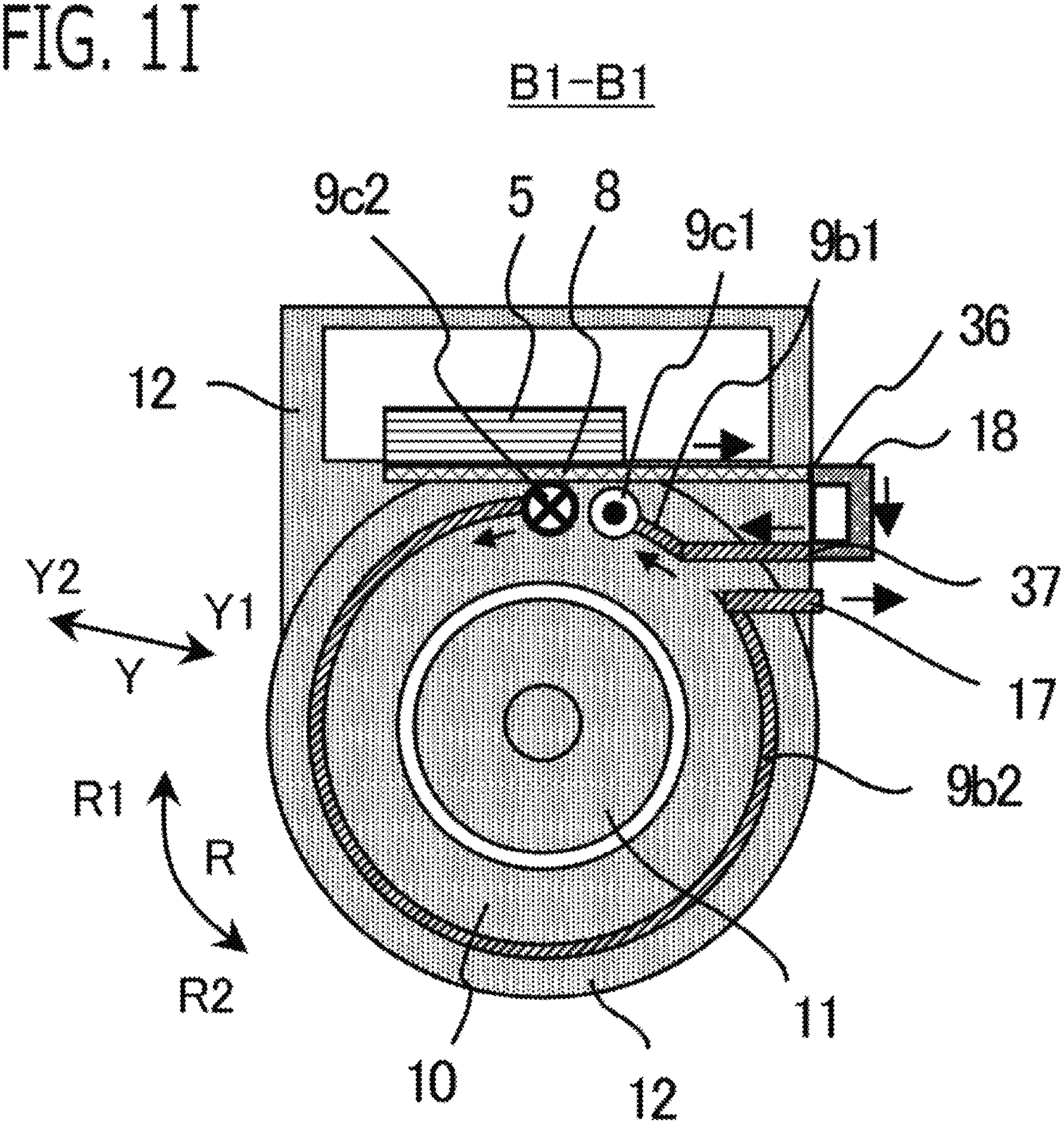
FIG. 1I is a schematic cross-sectional view of the rotary electric machine cut in the radial direction at B1-B1 cross section position of FIG. 1D, according to Embodiment 1.
Figure 1J:
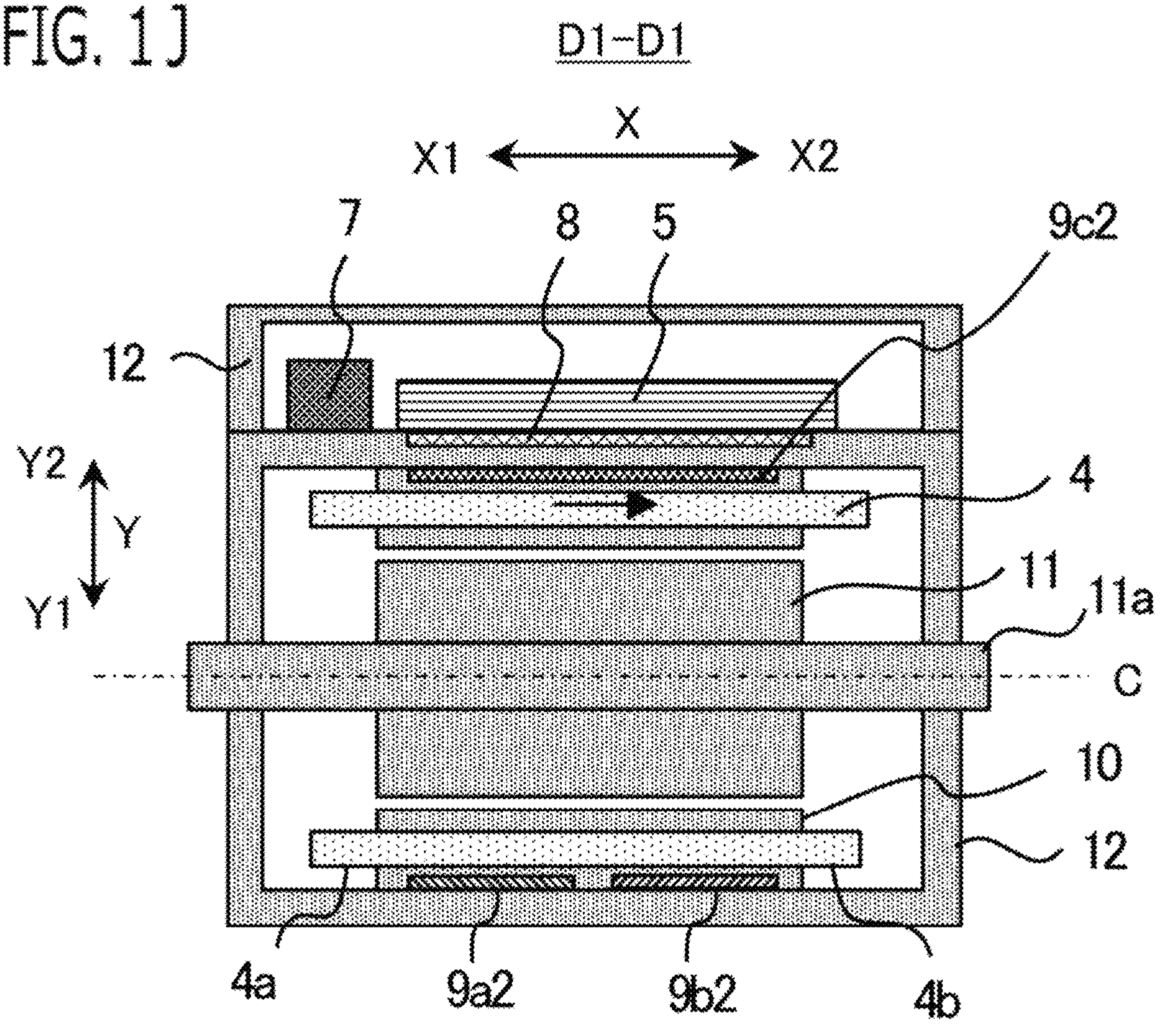
FIG. 1J is a schematic cross-sectional view of the rotary electric machine cut in the axial direction at D1-D1 cross section position of FIG. 1D, according to Embodiment 1.

A rotary electric machine 1 according to Embodiment 1 will be explained with reference to drawings. FIG. 1A is a schematic diagram showing an order of refrigerant flow, and a cooling object. FIG. 1B is a schematic isometrical drawing of the rotary electric machine 1. FIG. 1C is an isometrical drawing of a principal part for explaining the motor cooling passage 9 provided in an outer circumferential part of the stator 10. FIG. 1D is an indication figure of cross section position showing a relation between the cross section positions of the rotary electric machine 1 and the motor cooling passage 9, which are shown in FIG. 1G to FIG. 1J. FIG. 1E is a schematic indication figure of cross section position of the rotary electric machine 1 cut in the radial direction Y, which shows the cross section position of the rotary electric machine 1 shown in FIG. 1F. FIG. 1F is a schematic cross-sectional view of the rotary electric machine 1 cut at E1-E1 cross section position of FIG. 1E, which shows a module cooling passage 8 and the like. FIG. 1G is a schematic cross-sectional view of the rotary electric machine 1 cut in the radial direction at A1-A1 cross section position of FIG. 1D. FIG. 1H is a schematic cross-sectional view of the rotary electric machine 1 cut in the axial direction at C1-C1 cross section position of FIG. 1D. FIG. 1I is a schematic cross-sectional view of the rotary electric machine 1 cut in the radial direction at B1-B1 cross section position of FIG. 1D. FIG. 1J is a schematic cross-sectional view of the rotary electric machine 1 cut in the axial direction at D1-D1 cross section position of FIG. 1D.

As shown in FIG. 1G, FIG. 1H, and the like, the rotary electric machine 1 is provided with a cylindrical tubular stator 10; a winding 4 that is distributed in the circumferential direction R and is wound around the stator 10; a rotor 11 that is disposed on a radial direction inside Y1 of the stator 10; case 12 that covers an outer circumferential face of the stator 10 and houses the stator 10, the winding 4, and the rotor 11; and a motor cooling passage 9 that is provided in an outer circumferential part of the stator 10. A rotation axis 11*a* which integrally rotates with the rotor 11 is rotatably supported by the case 12.

In the present disclosure, a direction parallel to a rotation axial center C of the rotor 11 is defined as the axial direction X. And, the radial direction Y and the circumferential direction R are a radial direction and a circumferential direction about the rotation axial center C. A specific side of the axial direction X is defined as the axial direction one side X1, and an opposite side of the axial direction one side X1 is defined as the axial direction other side X2. A side approaching the rotation axial center C in the radial direction Y is defined as the radial direction inside Y1, and a side separating from the rotation axial center C in the radial direction Y is defined as the radial-direction outside Y2. The radial direction inside Y1 is also referred to as an inner circumferential side, and the radial direction outside Y2 is also referred to as an outer circumferential side. A specific side of the circumferential direction R is defined as the circumferential direction one side R1, and an opposite side of the circumferential direction one side R1 is defined as the circumferential direction other side R2.

In the present embodiment, the rotary electric machine 1 is provided with an inverter 2 that is disposed on the radial direction outside Y2 of the stator 10 and is provided with a capacitor 6 and a semiconductor power module 5 which supply power to the winding 4; and a module cooling passage 8 that cools the semiconductor power module 5 and is connected with the motor cooling passage 9. The case 12 further houses the inverter 2 and the module cooling passage 8. A case which housed a body part of the rotary electric machine, such as the stator 10 and the rotor 11, and a case which housed the inverter 2 are different bodies.

For example, the semiconductor power module 5 is provided with a bridge circuit where the positive electrode side switching device and the negative electrode side switching device are connected in series. In the present embodiment, windings 4 of plural phases (for example, three phases) are provided, and bridge circuits of plural phases are provided. A connection node between the positive pole side switching device and the negative pole side switching device in the bridge circuit of each phase is connected to the winding of corresponding phase. The positive electrode side terminal of each bridge circuit (the positive electrode side switching device) is connected to the positive electrode side electric line connected to the positive electrode side of the DC power source. The negative electrode side terminal of each bridge circuit (the negative electrode side switching device) is connected to the negative electrode side electric line connected to the negative electrode side of the DC power source. The capacitor 6 is connected between the positive electrode side electric line and the negative electrode side electric line.

In the present embodiment, the semiconductor power module 5 is formed in one module. But, for example, it may be divided into a plurality of modules for each bridge circuit or each switching device. If the rotary electric machine 1 is provided with a field winding, the semiconductor power module 5 may be provided with a switching device for the field winding. The semiconductor power module 5 may be provided with other circuits for control and for fail-safe.

<Winding 4>

The stator 10 is provided with a cylindrical tubular iron core in which annular disc-like electromagnetic steel plates are laminated in the axial direction X. The iron core is provided with a plurality of slots distributed in the circumferential direction R. Each slot penetrates in the axial direction X. The winding 4 is provided with a body part disposed within each slot of the stator 10, one side coil end 4*a* projected to the axial direction one side X1 from the stator 10, and other side coil end 4*b* projected to the axial direction other side X2 from the stator 10. The winding 4 is wound around the stator 10 distributedly in the circumferential direction R.

<Necessity for Cooling of One Side Coil End 4*a*>

The winding 4 is connected in the one side coil end 4*a*. Specifically, the winding 4 of each phase disposed distributedly in the circumferential direction is mutually connected in the one side coil end 4*a*. On the other hand, in the other side coil end 4*b*, the winding 4 projects from a certain slot in the axial direction other side X2, and extends in the circumferential direction. And then, it extends in the axial direction one side X1, and is inserted into other slots. Therefore, the winding 4 is not mutually connected in the other side coil end 4*b*.

The heating amount of the one side coil end 4*a* which is connected becomes larger than the heating amount of the other side coil end 4*b* which is not connected. This is because conductor amount increases for connection, and heating amount becomes large. Since conductors are crowded due to the connection, heat dissipation decreases. Heat of the one side coil end 4*a* is transferred to the axial direction one side X1 part of the stator 10. Heat of the other side coil end 4*b* is transferred to the axial direction other side X2 part of the stator 10. Accordingly, a cooling amount of the axial direction one side X1 part of the stator 10 close to the one side coil end 4*a* is required to increase more than a cooling amount of the axial direction other side X2 part of the stator 10.

<Motor Cooling Passage 9>

The motor cooling passage e 9 is provided in an outer circumferential part of the stator 10. In the present embodiment, the stator 10 is provided with a cylindrical tubular iron core, and a cylindrical tubular passage forming member 10*b* fitted into the outer circumferential face of the iron core so that heat transfer is possible. That is, a part where the winding 4 is wound and a part where the motor cooling passage 9 is formed are different bodies. The part where the winding 4 is wound and the part where the motor cooling passage 9 is formed may be formed integrally.

In the present embodiment, recesses hollow in the radial direction inside Y1 are formed in the outer circumferential face of the stator 10 (the passage forming member 10*b*). The openings on the radial direction outside Y2 in the recesses are covered and closed by the cylindrical tubular inner circumferential face of the case 12. The motor cooling passage 9 is formed by a space between the recesses of the outer circumferential face of the stator 10 and the inner circumferential face of the case 12. The inflow port 37 of the motor cooling passage and the outflow port 17 of the motor cooling passage are formed by penetrating the case 12 in the radial direction Y. The motor cooling passage 9 may be formed inside the outer circumferential part (the passage forming member 10*b*) of the stator 10.

The motor cooling passage 9 is provided with one or a plurality of circumferential direction parts that is provided with an one side circumferential direction passage 9*a* which is an axial direction one side X1 passage and an other side circumferential direction passage 9*b* which is an axial direction other side X2 passage, which are divided into the axial direction X and extend in the circumferential direction R; and one or a plurality of circumferential direction parts that is provided with an axial direction passage 9*c* which communicates the one side circumferential direction passage 9*a* and the other side circumferential direction passage 9*b* and extends in the axial direction X. A refrigerant supplied from an inflow port 37 flows through the one side circumferential direction passage 9*a* and the other side circumferential direction passage 9*b* in order via the axial direction passage 9*c*, and then is discharged from an outflow port 17. That is, the refrigerant flows through the one or the plurality of axial direction passages 9*c*, the one or the plurality of one side circumferential direction passages 9*a*, and the one or the plurality of other side circumferential direction passages 9*b* in a preliminarily set order.

Then, a length of a part of the one side circumferential direction passage 9*a* which exists on an upstream side of a center position of a total length of the motor cooling passage 9 is longer than a length of a part of the other side circumferential direction passage 9*b* which exists on the upstream side of the center position of the total length of the motor cooling passage 9.

According to this configuration, an average temperature of the refrigerant which flows through the one side circumferential direction passage 9*a* becomes lower than an average temperature of the refrigerant which flows through the other side circumferential direction passage 9*b*. Accordingly, by the one side circumferential direction passage 9*a* whose refrigerant temperature is comparatively low, the axial direction one side X1 part of the stator 10 close to the one side coil end 4*a* whose heating amount becomes comparatively large by the connection can be cooled effectively.

The refrigerant discharged from the rotary electric machine 1 is cooled by an external heat exchange mechanism, such as a radiator. And then, the refrigerant is supplied to the rotary electric machine 1 again, and circulates. A fluid, such as a cooling water or a cooling oil, is used for the refrigerant.

In the present embodiment, as shown in FIG. 1C, the motor cooling passage 9 is provided with a circumferential direction part provided with the first one side circumferential direction passage 9*a*1 and the first other side circumferential direction passage 9*b*1; a circumferential direction part provided with the second one side circumferential direction passage 9*a*2 and the second other side circumferential direction passage 9*b*2; a circumferential direction part provided with the first axial direction passage 9*c*1; and a circumferential direction part provided with the second axial direction passage 9*c*2.

Then, the circumferential direction one side R1 end of the first other side circumferential direction passage 9*b*1 is connected to the inflow port 37. The circumferential direction other side R2 end of the first other side circumferential direction passage 9*b*1 is connected to the axial direction other side X2 part of the first axial direction passage 9*c*1. The axial direction one side X1 part of the first axial direction passage 9*c*1 is connected to the circumferential direction other side R2 end of the first one side circumferential direction passage 9*a*1. The circumferential direction one side R1 end of the first one side circumferential direction passage 9*a*1 is connected to the circumferential direction other side R2 end of the second one side circumferential direction passage 9*a*2. The circumferential direction one side R1 end of the second one side circumferential direction passage 9*a*2 is connected to the axial direction one side X1 part of the second axial direction passage 9*c*2. The axial direction other side X2 part of the second axial direction passage 9*c*2 is connected to the circumferential direction one side R1 end of the second other side circumferential direction passage 9*b*2. The circumferential direction other side R2 end of the second other side circumferential direction passage 9*b*2 is connected to the outflow port 17.

The second axial direction passage 9*c*2 is adjacently disposed on the circumferential direction other side R2 of the first axial direction passage 9*c*1. A length in the circumferential direction of a circumferential direction part provided with the second one side circumferential direction passage 9*a*2 and the second other side circumferential direction passage 9*b*2 is longer than a length in the circumferential direction of a circumferential direction part provided with the first one side circumferential direction passage 9*a*1 and the first other side circumferential direction passage 9*b*1. Preferably, the length in the circumferential direction of the circumferential direction part provided with the first one side circumferential direction passage 9*a*1 and the first other side circumferential direction passage 9*b*1 may be a length in the circumferential direction of 90 degrees or less (in this example, the length in the circumferential direction of about 45 degrees). And, the length in the circumferential direction of the circumferential direction part provided with the second one side circumferential direction passage 9*a*2 and the second other side circumferential direction passage 9*b*2 may be a length in the circumferential direction of 180 degrees or more (in this example, the length in the circumferential direction of about 270 degrees).

According to this configuration, as shown in FIG. 1C, the refrigerant flows into the comparatively short first other side circumferential direction passage 9*b*1 from the inflow port 37, and flows to the circumferential direction other side R2. Then, the refrigerant flows through the first axial direction passage 9*c*1 in the axial direction one side X1, and then, it flows into the first one side circumferential direction passage 9*a*1, and flows to the circumferential direction one side R1. Then, the refrigerant flows through the second one side circumferential direction passage 9*a*2 to the circumferential direction one side R1 succeedingly. Then, the refrigerant flows through the second axial direction passage 9*c*2 to the axial direction other side X2, and then, it flows into the second other side circumferential direction passage 9*b*2, and flows to the circumferential direction other side R2. Then, the refrigerant is discharged from the outflow port 17.

Herein, since the first other side circumferential direction passage 9*b*1 is comparatively short, a temperature rise of the refrigerant is low. The refrigerant with low temperature flows through the first axial direction passage 9*c*1, the first one side circumferential direction passage 9*a*1, and the second one side circumferential direction passage 9*a*2. Accordingly, by the refrigerant with a comparatively low temperature that flows through the first and second one side circumferential direction passages 9*a*1, 9*a*2, the one side coil end 4*a* whose heating amount becomes comparatively large by the connection can be cooled effectively. On the other hand, the refrigerant whose temperature increased in the first and second one side circumferential direction passages 9*a*1, 9*a*2 flows through the second other side circumferential direction passage 9*b*2, and cools the other side coil end 4*b*. However, since the heating amount of the other side coil end 4*b* which is not connected is lower than the heating amount of the one side coil end 4*a*, cooling performance can be secured.

Between the circumferential direction one side R1 end of the first other side circumferential direction passage 9*b*1 and the circumferential direction other side R2 end of the second other side circumferential direction passage 9*b*2 is partitioned by a wall extended in the axial direction X. Between the circumferential direction other side R2 end of the first axial direction passage 9*c*1 and the circumferential direction one side R1 end of the second axial direction passage 9*c*2 is partitioned by a wall extended in the axial direction X. In the present embodiment, these are partitioned by X-shaped wall, but the wall may be an arbitrary shape.

<Cooling of Inverter 2>

As mentioned above, the inverter 2 is disposed on the radial direction outside Y2 of the stator 10, and is provided with the capacitor 6 and the semiconductor power module 6 which supply power to the winding 4. The module cooling passage 8 is connected to the motor cooling passage 9, and cools the semiconductor power module 5.

The module cooling passage 8 is disposed on the radial direction outside Y2 of the motor cooling passage 9, and the semiconductor power module 5 is disposed on the radial direction outside Y2 of the module cooling passage 8 so that heat transfer is possible. In the present embodiment, the module cooling passage 8 is disposed on the radial direction outside Y2 of the second axial direction passage 9*c*2 and the like.

According to this configuration, since the module cooling passage 8 is disposed between the semiconductor power module 5 and the motor cooling passage 9, the heat transfer between the body part of the rotary electric machine, such as the stator 10, and the semiconductor power module 5 is suppressed, and occurrence of heat interference can be suppressed. By providing the module cooling passage 8 dedicated to the semiconductor power module 5, the module cooling passage 8 can be formed so that the cooling performance of the semiconductor power module 5 is improved.

The motor cooling passage 9 and the module cooling passage 8 are connected by a connection passage 18. According to this configuration, by the common refrigerant, the body part of the rotary electric machine, such as the stator 10, and the semiconductor power module 5 can be cooled, and the cooling mechanism can be simplified.

As shown in FIG. 1B and the like, an outflow port 36 of the module cooling passage 8 is connected with the inflow port 37 of the motor cooling passage 9 via the connection passage 18. According to this configuration, the semiconductor power module 5 which has a larger temperature rise amount than the one side coil end 4*a* is cooled first, and cooling efficiency can be improved.

The module cooling passage 8 is formed in a part of the case 12 or a housing which houses the inverter 2. The refrigerant cooled by the external heat exchange mechanism is supplied to an inflow port 16 of the module cooling passage 8. The refrigerant discharged from the outflow port 17 of the motor cooling passage 9 is supplied to the external heat exchange mechanism and cooled. A cooling passage which cools other cooling objects may be interposed between the heat exchange mechanism and the rotary electric machine 1. As shown in FIG. 1F and the like, the inflow port 16 of the module cooling passage 8 is formed in the circumferential direction other side R2 end of the module cooling passage 8, and is opened to the circumferential direction other side R2. The outflow port 36 of the module cooling passage 8 is formed in the axial direction other side X2 part of the circumferential direction one side R1 end of the module cooling passage 8, is opened to the circumferential direction one side R1, and is connected to the connection passage 18.

As mentioned above, the case 12 further houses the inverter 2 and the module cooling passage 8. The connection passage 18 is provided outside the case 12. According to this configuration, the degree of freedom of arrangement of the connection passage 18 becomes high. Attachment and detachment of the connection passage 18 can be made easy, and attachment and detachment of the inverter 2 can be made easy.

The capacitor 6 is disposed on the radial direction outside Y2 of a part of the motor cooling passage 9 on the upstream side of the center position of the total length of the motor cooling passage 9 so that heat transfer is possible. According to this configuration, by the refrigerant on the upstream side of the center position with a comparatively low temperature, the capacitor 6 with a comparatively low heat resistant temperature can be effectively cooled. By cooling the capacitor 6 by the motor cooling passage 9, it is not necessary to provide a cooling passage dedicated to capacitor 6, and the apparatus can be miniaturized.

In the present embodiment, one axial direction passage (in this example, the first axial direction passage 9*c*1) is provided in the part of the motor cooling passage 9 on the upstream side of the center position of the total length of the motor cooling passage 9. Then, the capacitor 6 is disposed on the radial direction outside Y2 of this one axial direction passage (the first axial direction passage 9*c*1) so that heat transfer is possible. According to this configuration, since the first axial direction passage 9*c*1 is provided on the upstream side of the center position, the refrigerant temperature which flows through the first axial direction passage 9*c*1 becomes low comparatively. The first axial direction passage 9*c*1 extends in the axial direction X. An area of the passage part for cooling the capacitor where the low-temperature refrigerant flows is expanded also to the axial direction other side X2, and the capacitor 6 with the comparatively low heat resistant temperature can be cooled effectively.

In the present embodiment, the capacitor 6 is disposed on the radial direction outside Y2 of the first axial direction passage 9*c*1, the circumferential direction other side R2 end of the first other side circumferential direction passage 9*b*1, and the circumferential direction other side R2 end of the first one side circumferential direction passage 9*a*1 so that heat transfer is possible. According to this configuration, the capacitor 6 can be cooled effectively by the low-temperature refrigerant just after flowing into the inflow port 37 of the motor cooling passage 9. Since the first axial direction passage 9*c*1 and the first other side circumferential direction passage 9*b*1 are provided on the upstream side of the first one side circumferential direction passage 9*a*1, the area of the passage part for cooling the capacitor where the low-temperature refrigerant flows can be expanded also to the axial direction other side X2. Since the volume of the capacitor 6 is large, the capacitor 6 can be effectively cooled by expanding the cooling area where the low-temperature refrigerant flows to the axial direction other side X2.

The capacitor 6 is disposed on the circumferential direction one side R1 of the module cooling passage 8 so that heat transfer is possible. According to this configuration, the capacitor 6 can be effectively cooled also by the module cooling passage 8 where the comparatively low-temperature refrigerant flows.

The inverter 2 is provided with a terminal block 7 which connects the winding 4 to the capacitor 6 and the semiconductor power module 5. The terminal block 7 has a terminal of each phase connected to the winding 4 of each phase. The terminal block 7 of each phase is connected to the connection node between the positive electrode side switching device and the negative electrode side switching device in the bridge circuit of each phase. Then, a connection line extended in the radial direction outside Y2 from the connected one side coil end 4*a* (the winding 4 of each phase) is connected to the terminal block 7 of each phase. As shown in FIG. 1H and FIG. 15, the terminal block 7 is disposed on the radial direction outside Y2 of the one side coil end 4*a*. The terminal block 7 is disposed on the axial direction one side X1 of the semiconductor power module 5. The terminal block 7 may be provided with a positive electrode side terminal and a negative electrode side terminal which are connected to the positive electrode side and the negative electrode side of the DC power source. The positive electrode side terminal is connected to the positive electrode side electric line, and the negative electrode side terminal is connected to the negative electrode side electric line.

<Rotary Electric Machine for Vehicle>

In the present embodiment, the rotary electric machine 1 is a driving force source of the wheel of vehicle. Since the rotary electric machine 1 is mounted on the vehicle, the cooling mechanism can be miniaturized and the mountability to the vehicle can be improved, by cooling each part effectively as described above. The rotary electric machine 1 may not be the driving force source of the wheel of vehicle, but may be a driving force source of various kinds of apparatuses.

2. Embodiment 2

Next, the rotary electric machine 1 according to Embodiment 2 will be explained. The explanation for constituent parts the same as those in Embodiment 1 will be omitted. The basic configuration of the rotary electric machine 1 according to the present embodiment is the same as that of Embodiment 1. Embodiment 2 is different from Embodiment 1 in that the module cooling passage 8 is not provided.

Figure 2A:
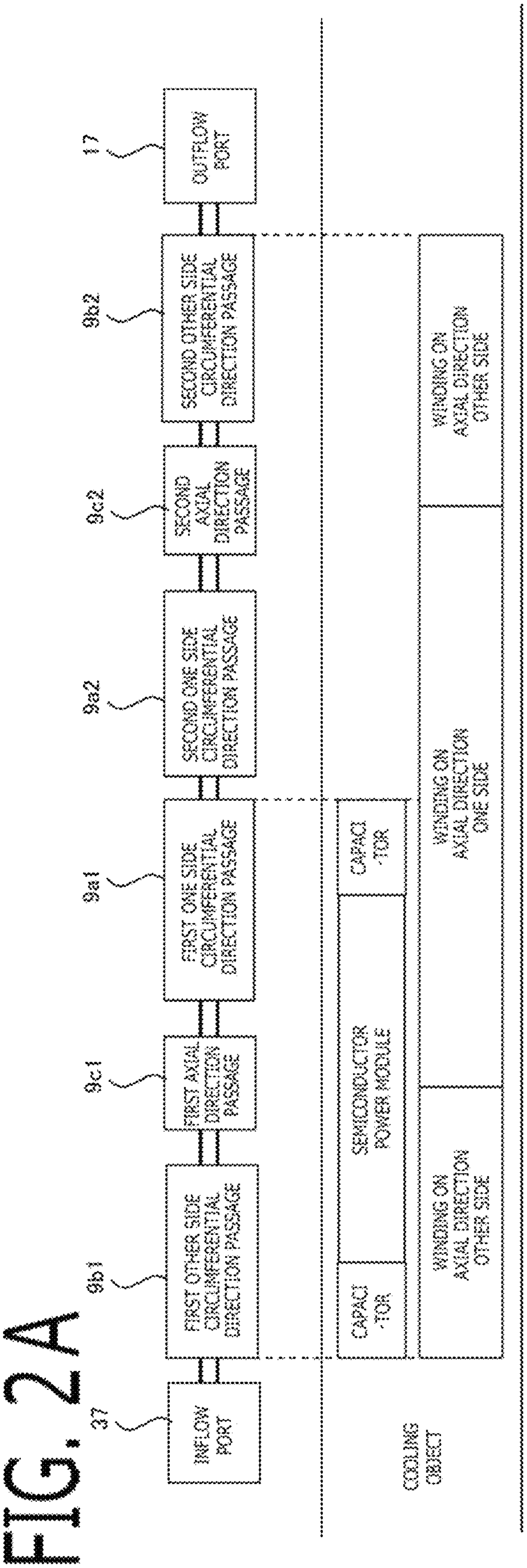
FIG. 2A is a schematic diagram showing an order of refrigerant flow, and a cooling object, according to Embodiment 2.
Figure 2B:
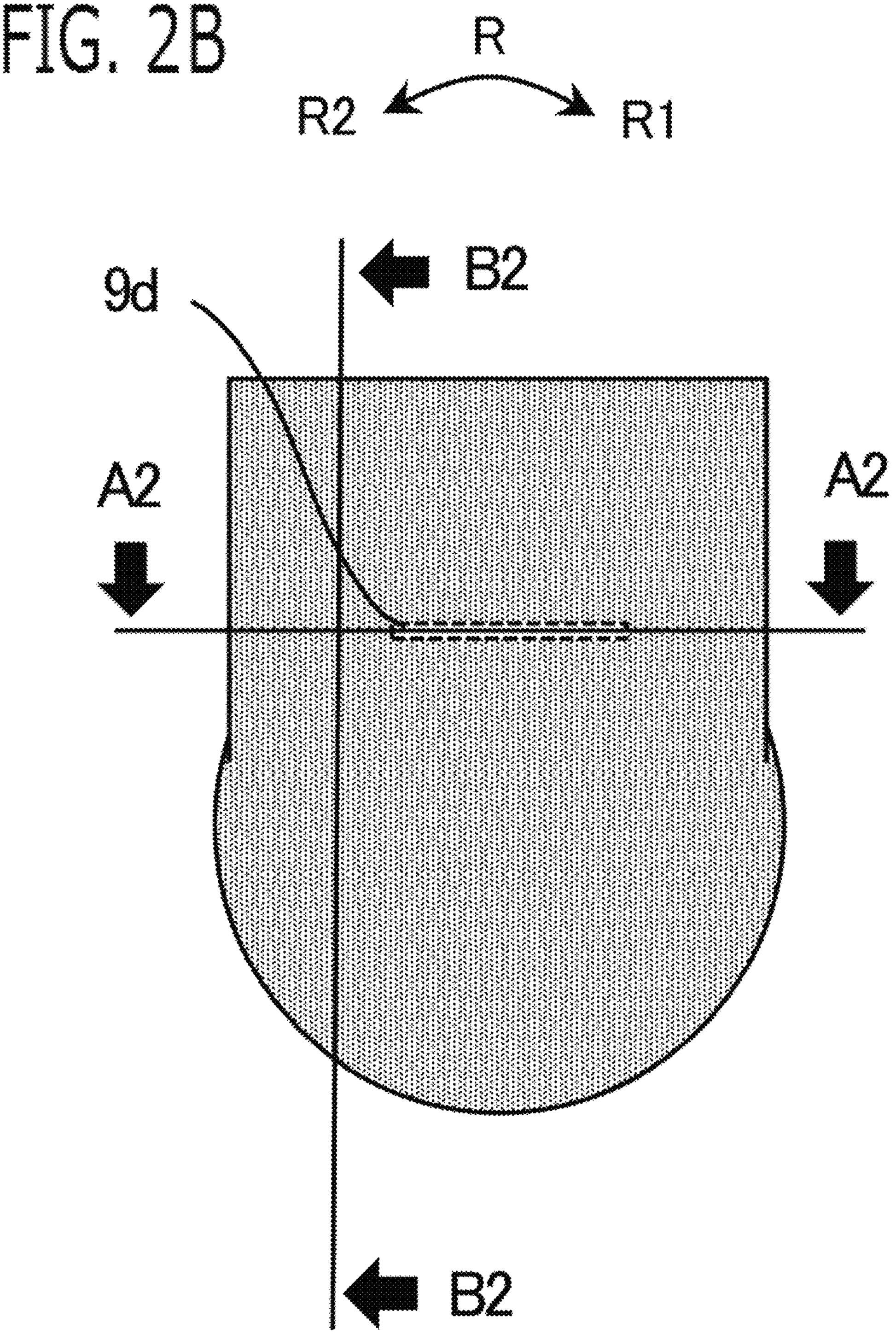
FIG. 2B is a schematic indication figure of cross section position of the rotary electric machine cut in the radial direction, which shows the cross section position of the rotary electric machine shown in FIG. 2D and FIG. 2G, according to Embodiment 2.
Figure 2C:
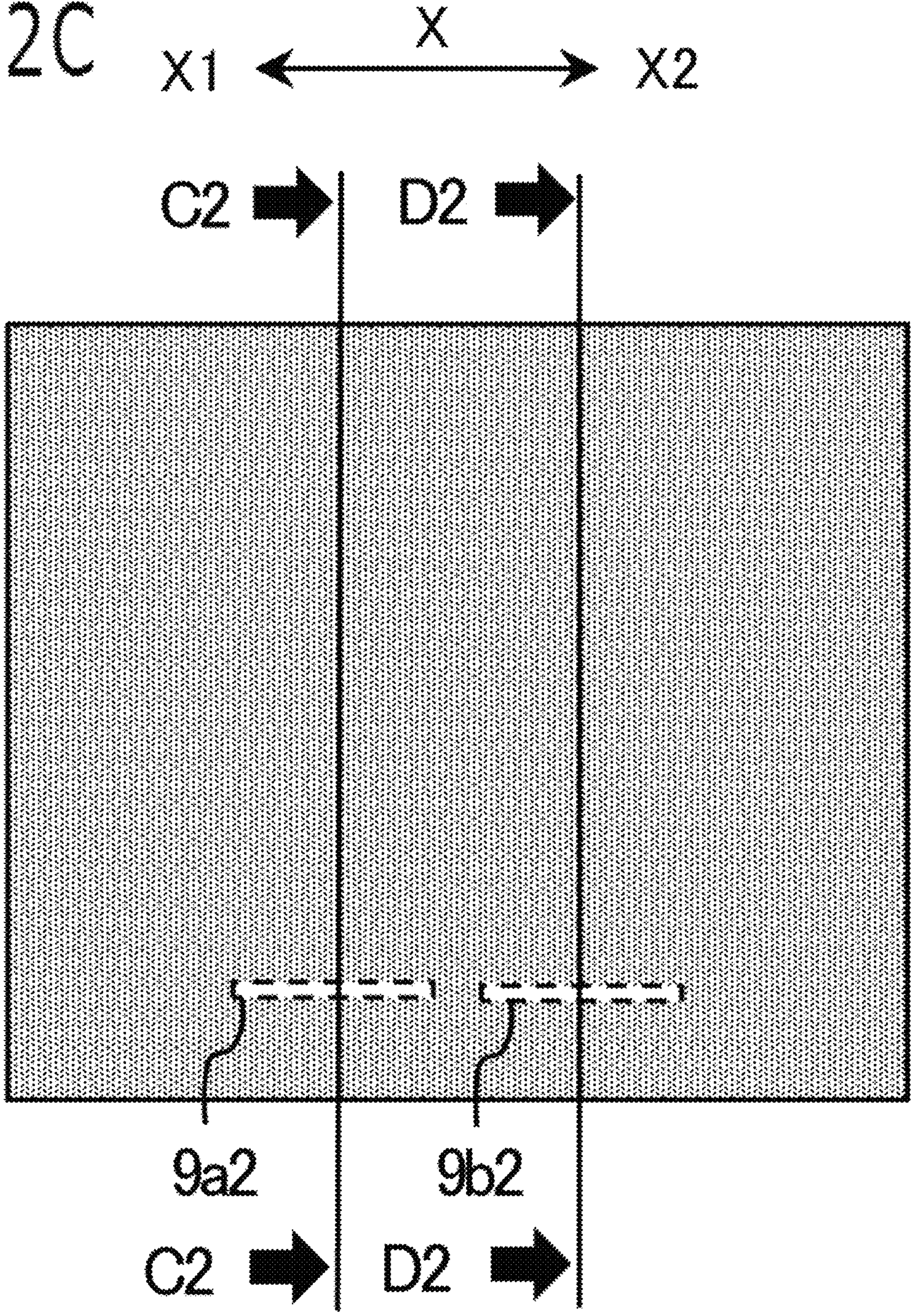
FIG. 2C is a schematic indication figure of cross section position of the rotary electric machine cut in the axial direction, which shows the cross section position of the rotary electric machine shown in FIG. 2E and FIG. 2F, according to Embodiment 2.
Figure 2D:
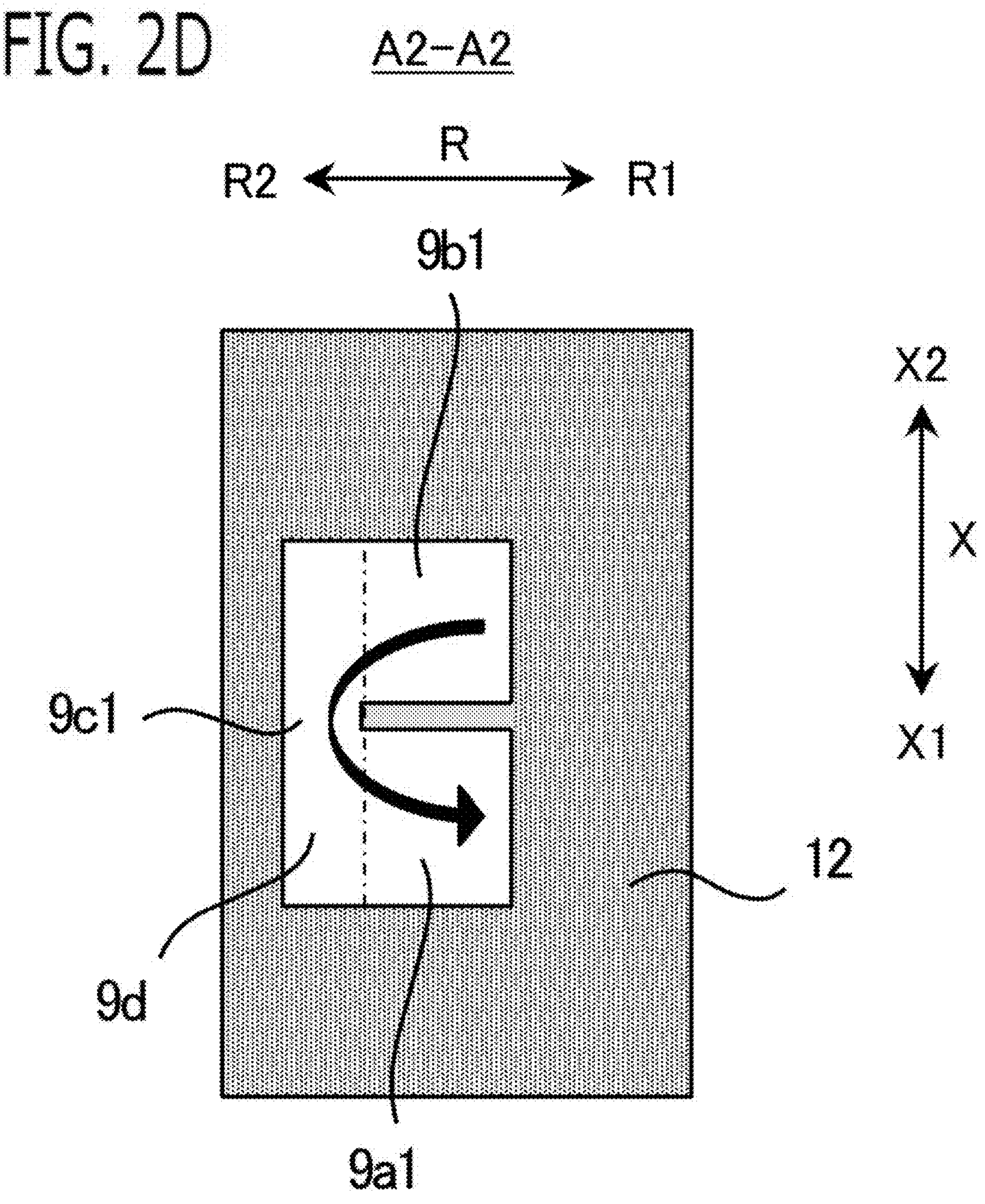
FIG. 2D is a schematic cross-sectional view showing a part of the motor cooling passage disposed on the radial direction inside of the semiconductor power module, which is cut the rotary electric machine at A2-A2 cross section position of FIG. 2B, according to Embodiment 2.
Figure 2E:
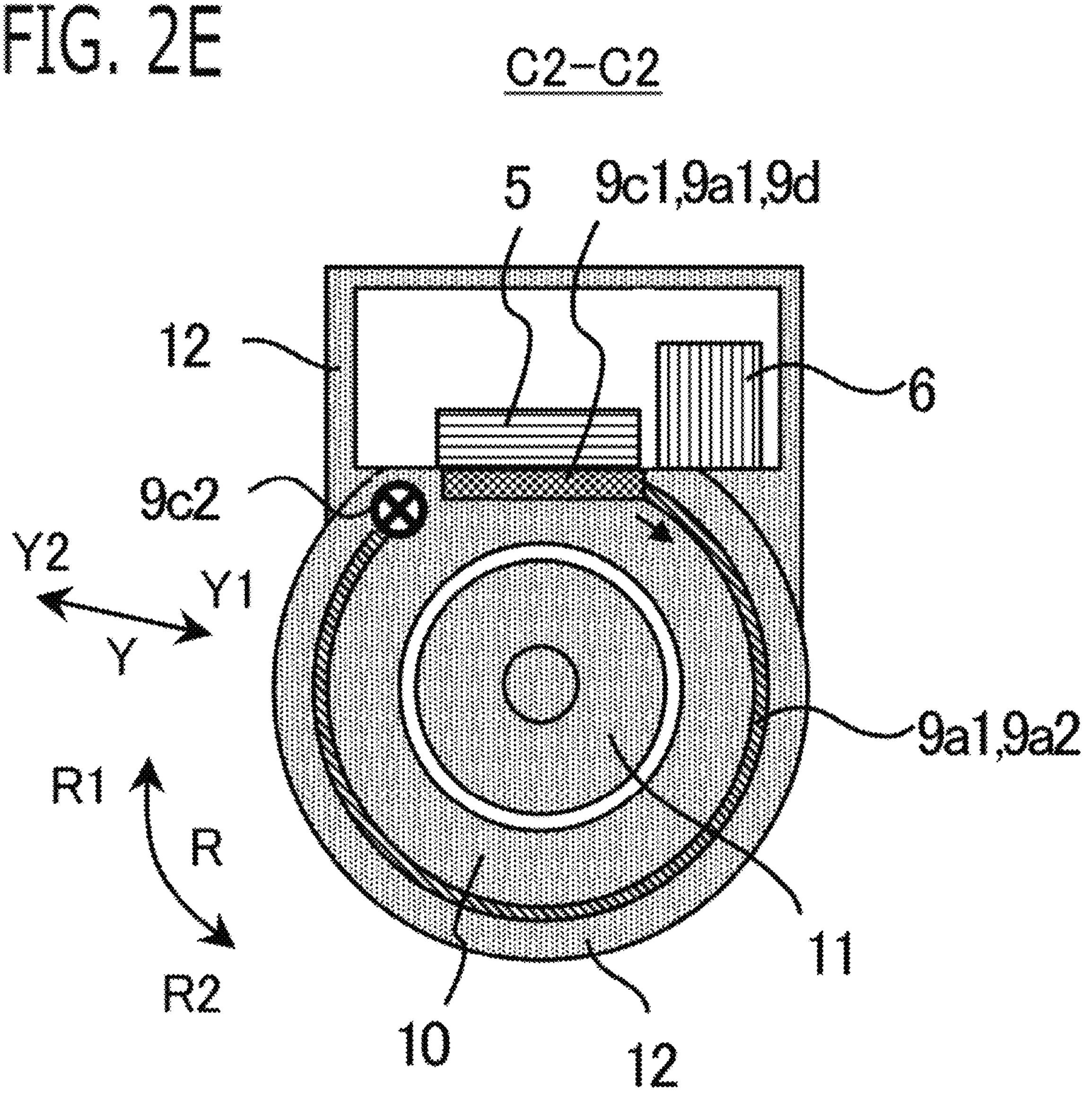
FIG. 2E is a schematic cross-sectional view of the rotary electric machine cut in the radial direction at C2-C2 cross section position of FIG. 2C, according to Embodiment 2.
Figure 2F:
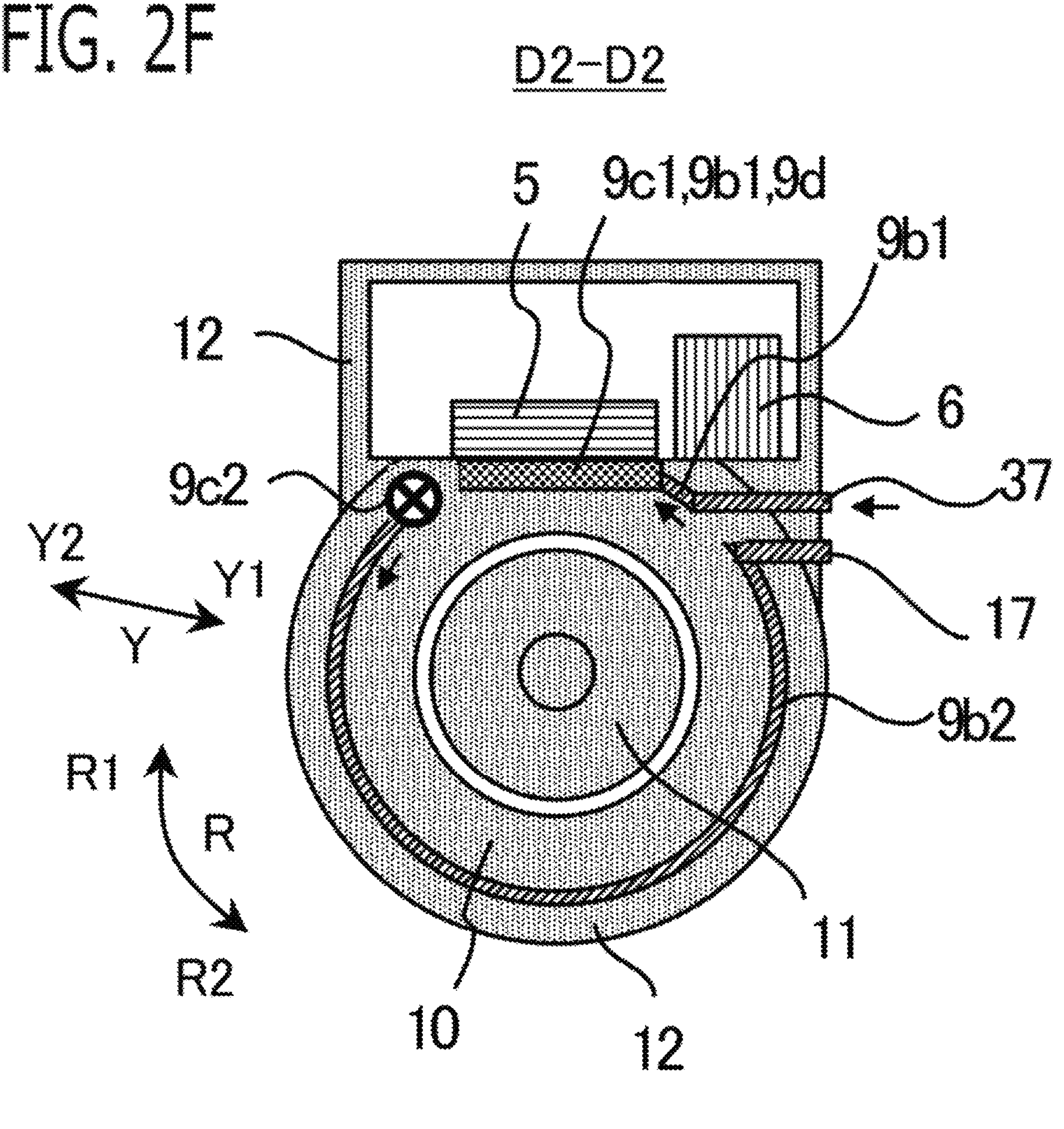
FIG. 2F is a schematic cross-sectional view of the rotary electric machine cut in the radial direction at D2-D2 cross section position of FIG. 2C, according to Embodiment 2.
Figure 2G:
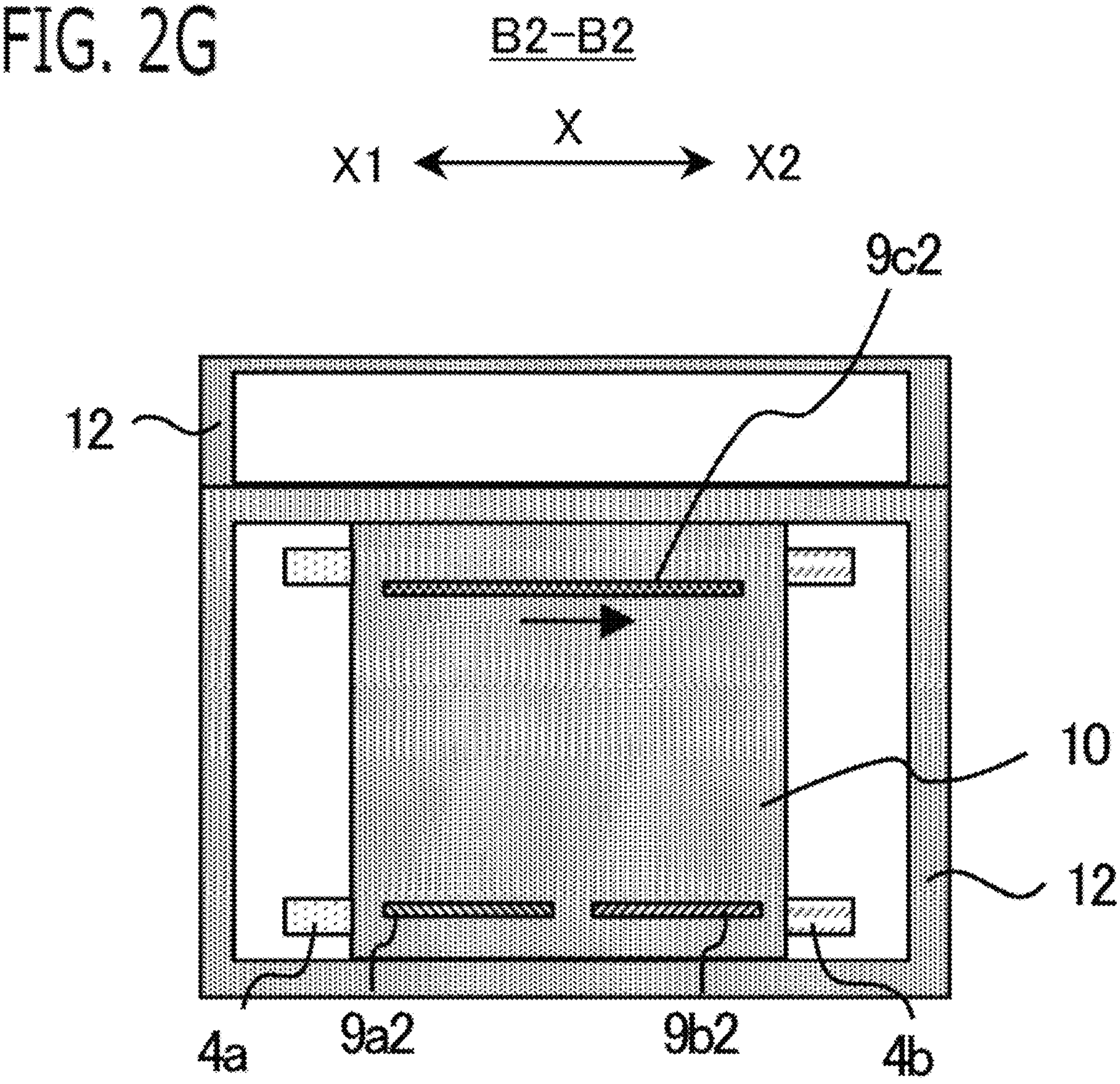
FIG. 2G is a schematic cross-sectional view of the rotary electric machine cut in the axial direction at B2-B2 cross section position of FIG. 2B, according to Embodiment 2.

FIG. 2A is a schematic diagram showing an order of refrigerant flow, and a cooling object. FIG. 2B is a schematic indication figure of cross section position of the rotary electric machine 1 cut in the radial direction Y, which shows the cross section position of the rotary electric machine 1 shown in FIG. 2D and FIG. 2G. FIG. 2C is a schematic indication figure of cross section position of the rotary electric machine 1 cut in the axial direction X, which shows the cross section position of the rotary electric machine 1 shown in FIG. 2E and FIG. 2F. FIG. 2D is a schematic cross-sectional view showing a part of the motor cooling passage 9 disposed on the radial direction inside Y1 of the semiconductor power module 5, which is cut the rotary electric machine 1 at A2-A2 cross section position of FIG. 2B, FIG. 2E is a schematic cross-sectional view of the rotary electric machine 1 cut in the radial direction Y at C2-C2 cross section position of FIG. 2C. FIG. 2F is a schematic cross-sectional view of the rotary electric machine 1 cut in the radial direction Y at D2-D2 cross section position of FIG. 2C. FIG. 2G is a schematic cross-sectional view of the rotary electric machine 1 cut in the axial direction X at B2-B2 cross section position of FIG. 2B.

In the present embodiment, the module cooling passage 8 is not provided, and the semiconductor power module 5 is cooled by the motor cooling passage 9.

In the present embodiment, similarly to Embodiment 1, the motor cooling passage 9 is provided with a circumferential direction part provided with the first one side circumferential direction passage 9*a*1 and the first other side circumferential direction passage 9*b*1; a circumferential direction part provided with the second one side circumferential direction passage 9*a*2 and the second other side circumferential direction passage 9*b*2; a circumferential direction part provided with the first axial direction passage 9*c*1; and a circumferential direction part provided with the second axial direction passage 9*c*2. Then, similarly to Embodiment 1, each passage is connected and the refrigerant flows through each passage in order. The refrigerant cooled by the external heat exchange mechanism is supplied to the inflow port 37 of the motor cooling passage 9. The refrigerant discharged from the outflow port 17 of the motor cooling passage 9 is supplied to the external heat exchange mechanism and cooled.

In the present embodiment, the semiconductor power module 5 is disposed on the radial direction outside Y2 of a part of the motor cooling passage 9 on the upstream side of the center position of the total length of the motor cooling passage 9 so that heat transfer is possible. According to this configuration, by the refrigerant on the upstream side of the center position with a comparatively low temperature, the semiconductor power module 5 with a large temperature rise amount can be cooled effectively. By cooling the semiconductor power module 5 by the motor cooling passage 9, it is not necessary to provide a cooling passage dedicated to the semiconductor power module 5, and the apparatus can be miniaturized.

The semiconductor power module 5 is disposed on the radial direction outside Y2 of the first axial direction passage 9*c*1, the circumferential direction other side R2 end of the first other side circumferential direction passage 9*b*1, and the circumferential direction other side R2 end of the first one side circumferential direction passage 9*a*1 so that heat transfer is possible. According to this configuration, the semiconductor power module 5 can be cooled effectively by the low-temperature refrigerant just after flowing into the inflow port 37 of the motor cooling passage 9. Since the first axial direction passage 9*c*1 and the first other side circumferential direction passage 9*b*1 are provided on the upstream side of the first one side circumferential direction passage 9*a*1, the area of the passage part for cooling the semiconductor power module where the low-temperature refrigerant flows can be expanded also to the axial direction other side X2, and the semiconductor power module 5 can be cooled effectively.

A part of the motor cooling passage 9 disposed on the radial direction inside Y1 of the semiconductor power module 5 is referred to as a module cooling part 9*d*. The radial direction outside of the module cooling part 9*d* of the motor cooling passage 9 is not covered with the cylindrical tubular inner circumferential face of the case 12, but is covered with the radial direction inside Y1 surface of the semiconductor power module 5, and is closed. According to this configuration, the semiconductor power module 5 can be directly cooled by the refrigerant, and cooling efficiency can be improved.

The module cooling part 9*d* of the motor cooling passage 9 is formed in a rectangular shape in accordance with the shape of the semiconductor power module 5.

In the present embodiment, the capacitor 6 is disposed on the radial direction outside Y2 of the first other side circumferential direction passage 9*b*1 and the first one side circumferential direction passage 9*a*1 so that heat transfer is possible. According to this configuration, the capacitor 6 can be cooled effectively by the low-temperature refrigerant just after flowing into the inflow port 37 of the motor cooling passage 9. Since the first other side circumferential direction passage 9*b*1 is provided on the upstream side of the first one side circumferential direction passage 9*a*1, the area of the passage part for cooling the capacitor where the low-temperature refrigerant flows can be expanded also to the axial direction other side X2. Since the volume of the capacitor 6 is large, the capacitor 6 can be effectively cooled by expanding the cooling area where the low-temperature refrigerant flows to the axial direction other side X2.

3. Embodiment 3

Next, the rotary electric machine 1 according to Embodiment 3 will be explained. The explanation for constituent parts the same as those in Embodiment 1 will be omitted. The basic configuration of the rotary electric machine 1 according to the present embodiment is the same as that of Embodiment 1. Embodiment 3 is different from Embodiment 1 in that the motor cooling passage 9 is divided into an upstream side passage part and a downstream side passage part by a connection passage 30 which connects between the motor cooling passage 9 and the module cooling passage 8.

Figure 3A:
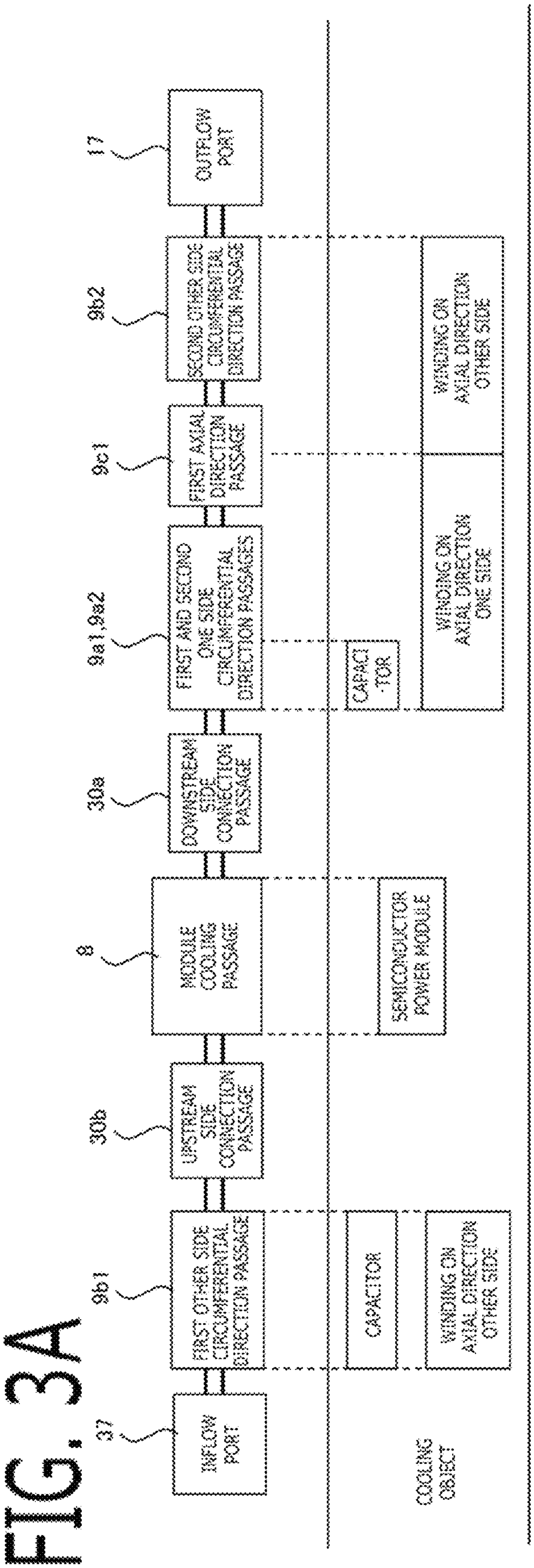
FIG. 3A is a schematic diagram showing an order of refrigerant flow, and a cooling object, according to Embodiment 3.
Figure 3B:
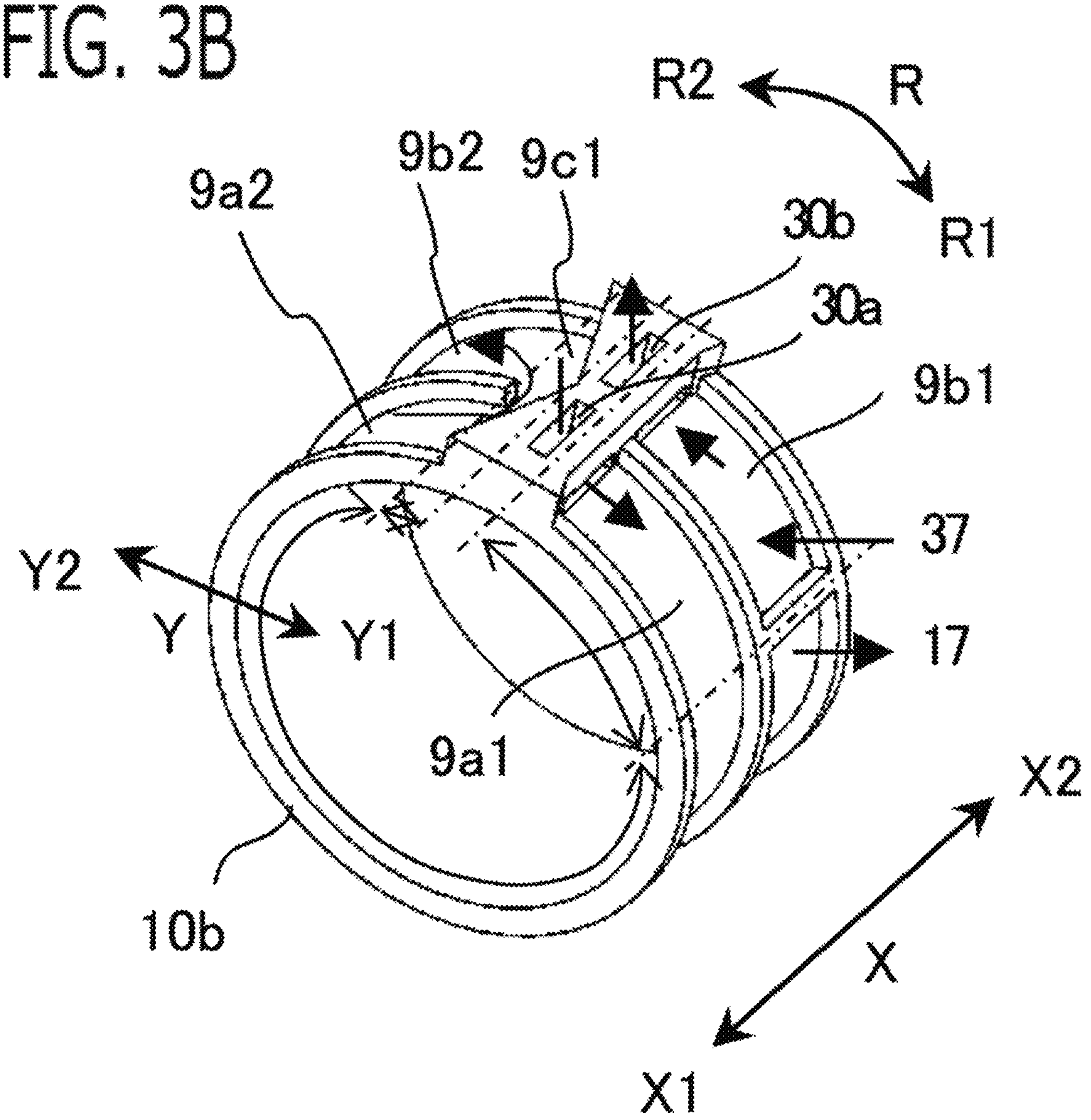
FIG. 3B is an isometrical drawing of a principal part for explaining the motor cooling passage and the connection passage provided in the outer circumferential part of the stator, according to Embodiment 3.
Figure 3C:
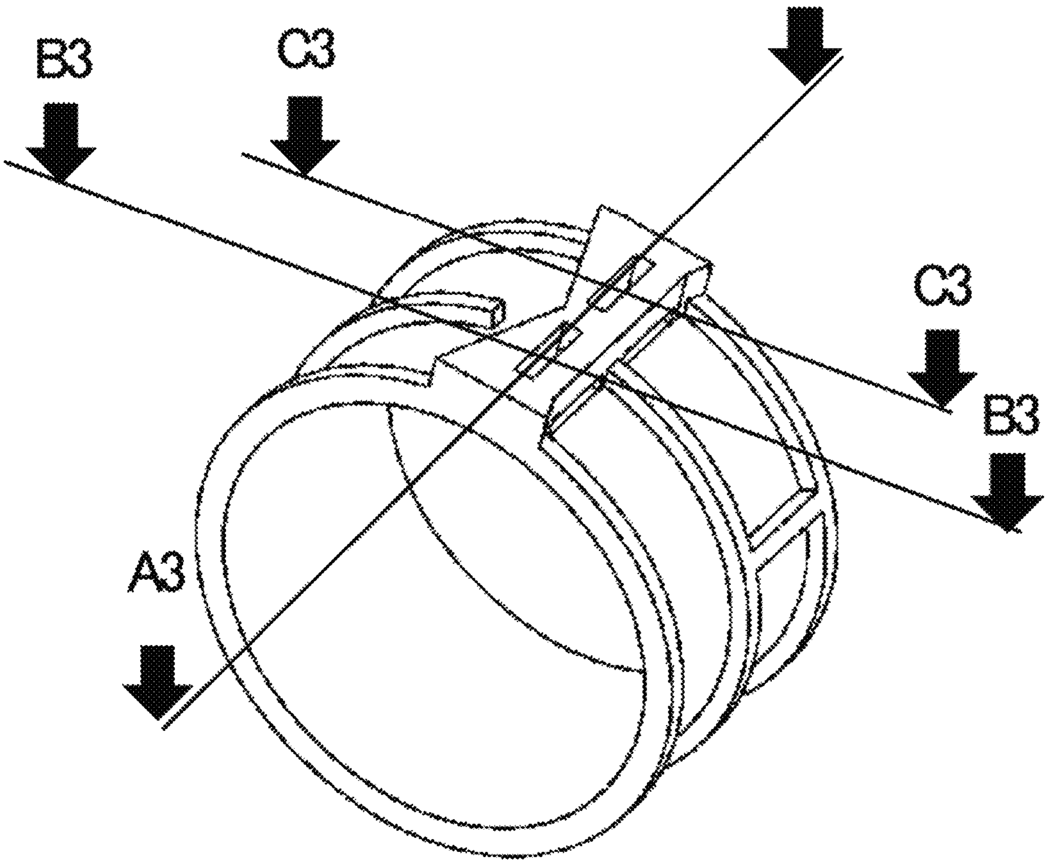
FIG. 3C is an indication figure of cross section position showing a relation between the cross section positions of the rotary electric machine and the motor cooling passage, which are shown in FIG. 3F to FIG. 3H, according to Embodiment 3.
Figure 3D:
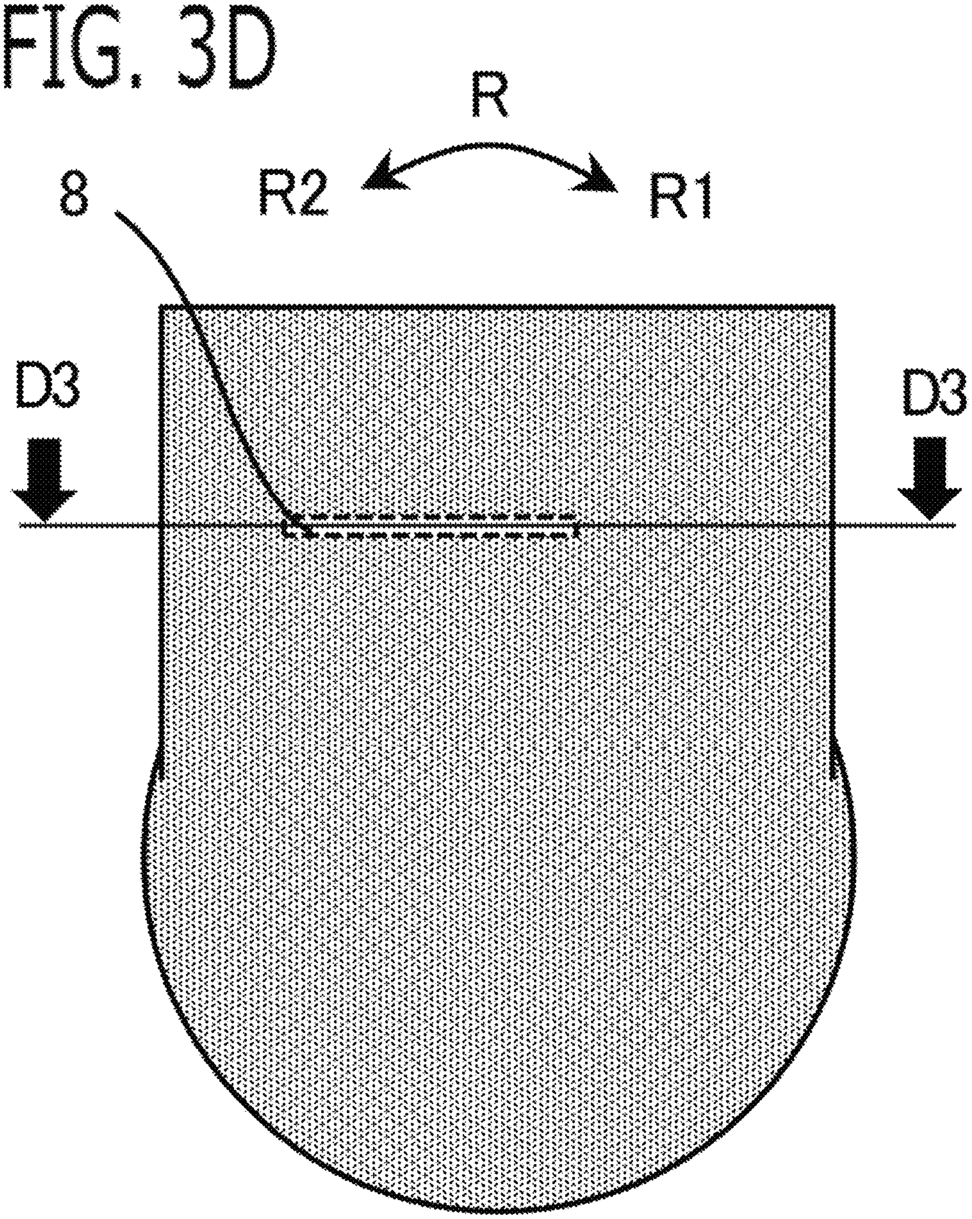
FIG. 3D is a schematic indication figure of cross section position of the rotary electric machine cut in the radial direction, which shows the cross section position of the rotary electric machine shown in FIG. 3E, according to Embodiment 3.
Figure 3E:
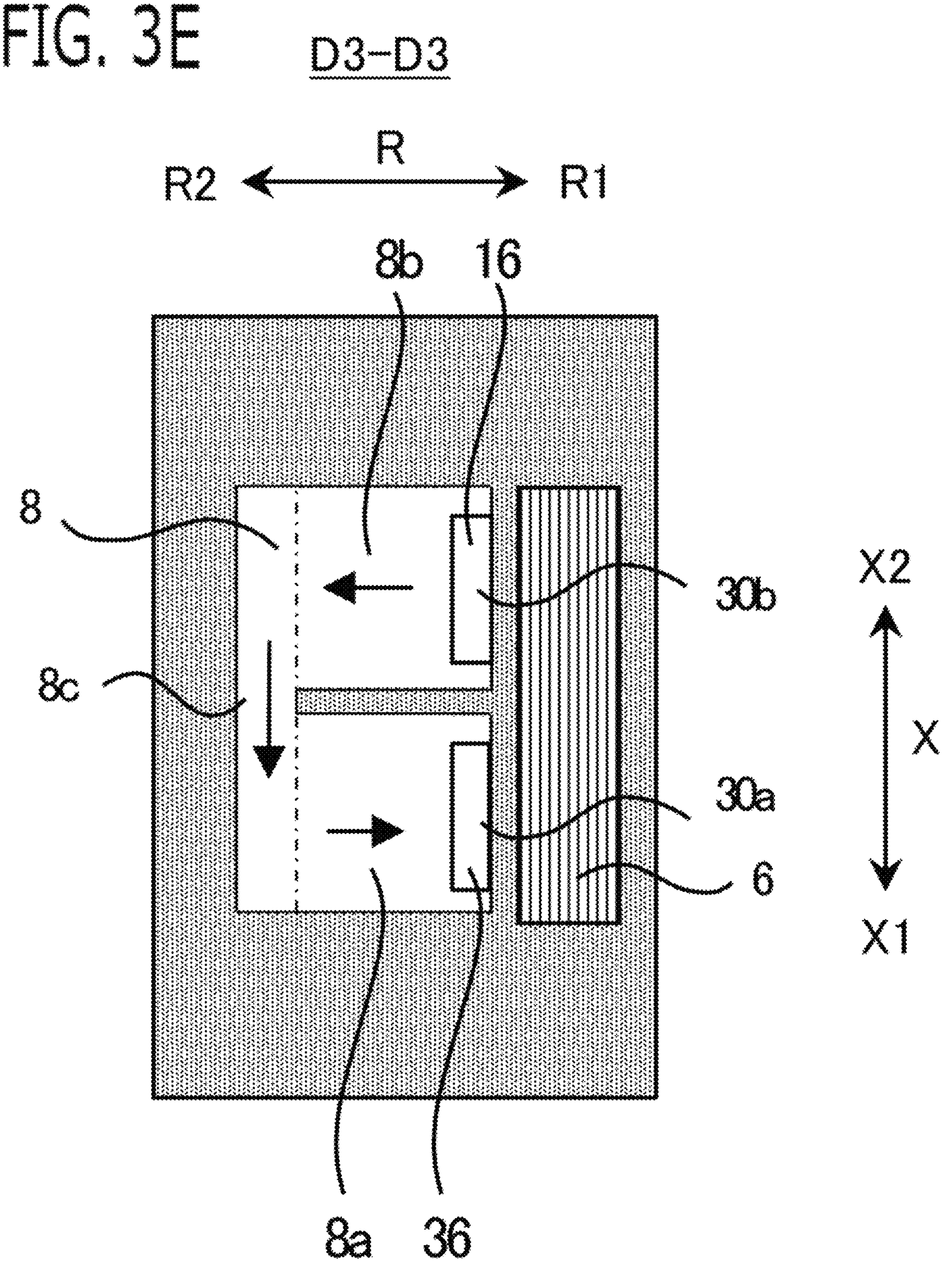
FIG. 3E is a schematic cross-sectional view of the rotary electric machine cut at D3-D3 cross section position of FIG. 3D, which shows the module cooling passage and the like, according to Embodiment 3.
Figure 3F:
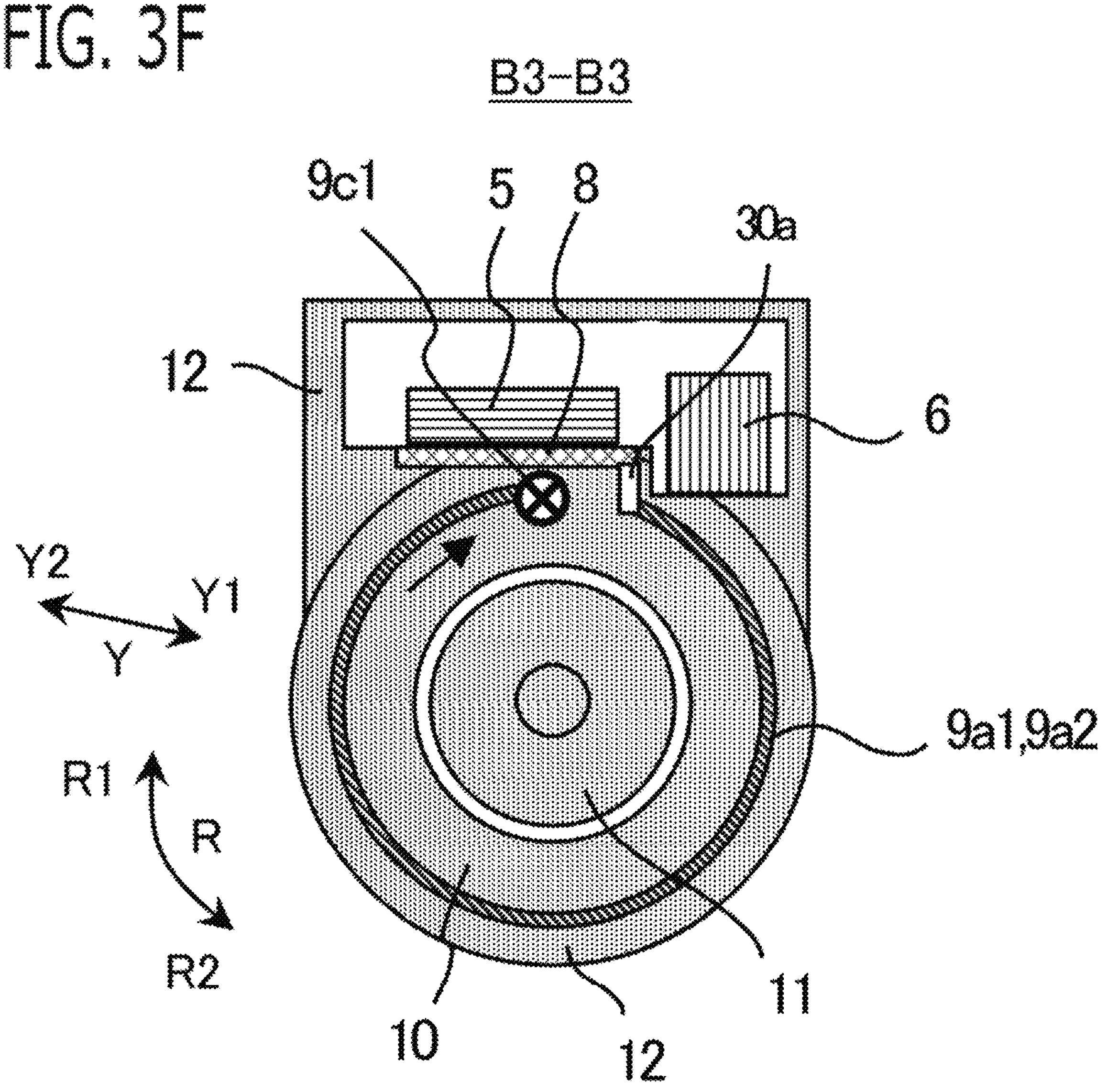
FIG. 3F is a schematic cross-sectional view of the rotary electric machine cut in the radial direction at B3-B3 cross section position of FIG. 3C, according to Embodiment 3.
Figure 3G:
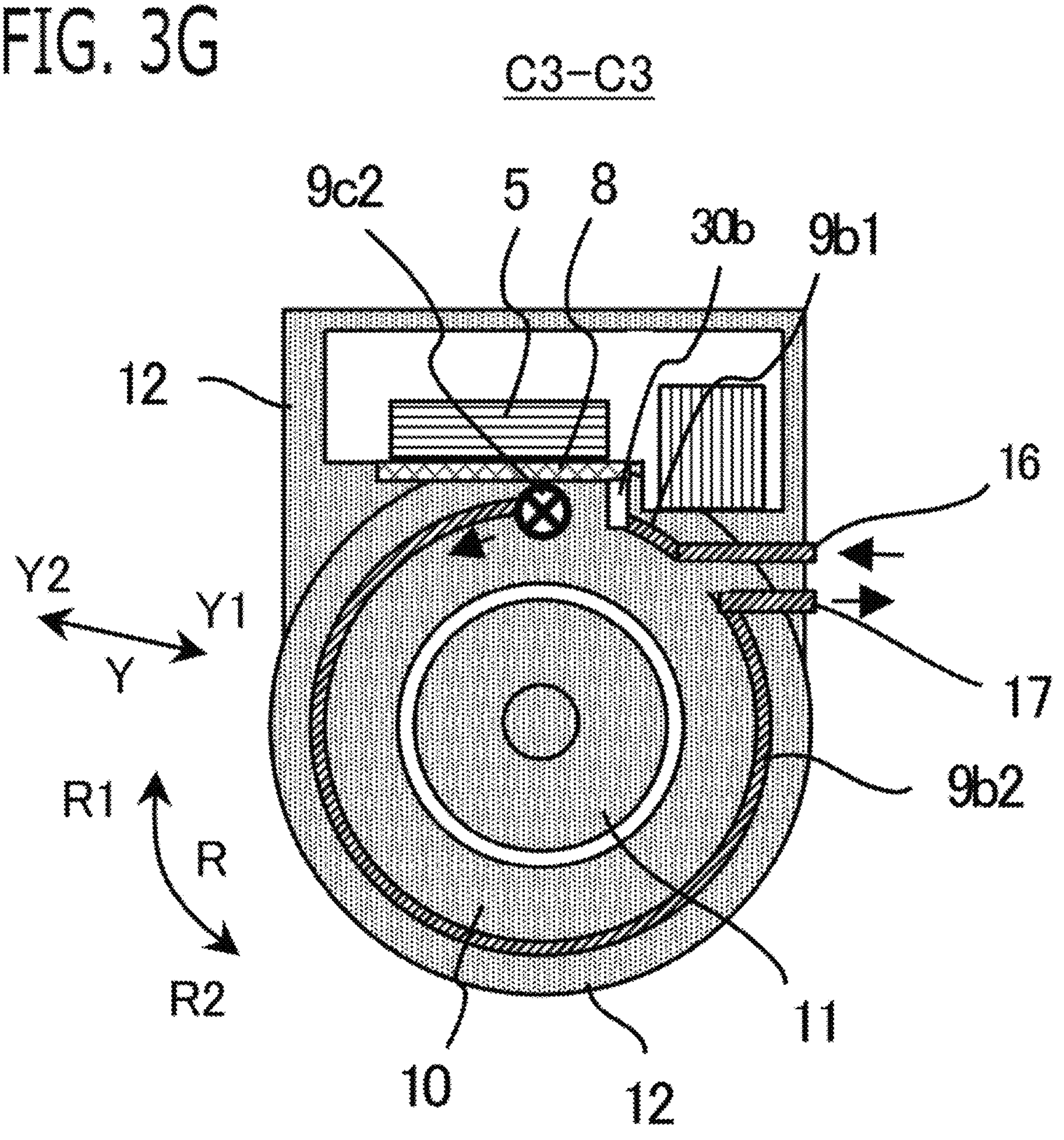
FIG. 3G is a schematic cross-sectional view of the rotary electric machine cut in the radial direction at C3-C3 cross section position of FIG. 3C, according to Embodiment 3.
Figure 3H:
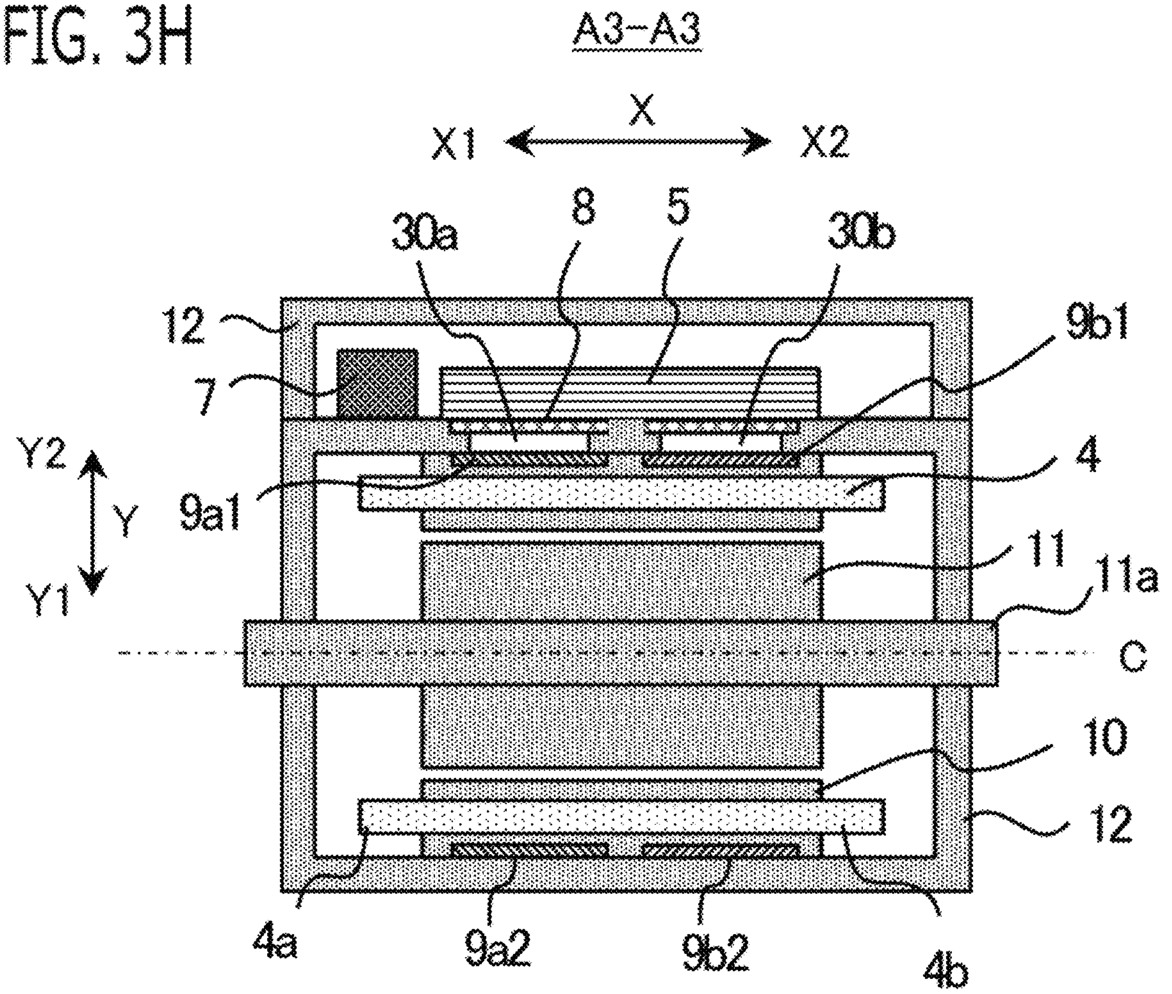
FIG. 3H is a schematic cross-sectional view of the rotary electric machine cut in the axial direction at A3-A3 cross section position of FIG. 3C, according to Embodiment 3.

FIG. 3A is a schematic diagram showing an order of refrigerant flow, and a cooling object. FIG. 3B is an isometrical drawing of a principal part for explaining the motor cooling passage 9 and the connection passage 30 provided in the outer circumferential part of the stator 10. FIG. 3C is an indication figure of cross section position showing a relation between the cross section positions of the rotary electric machine 1 and the motor cooling passage 9 which are shown in FIG. 3F to FIG. 3H. FIG. 3D is a schematic indication figure of cross section position of the rotary electric machine 1 cut in the radial direction Y, which shows the cross section position of the rotary electric machine 1 shown in FIG. 3E. FIG. 3E is a schematic cross-sectional view of the rotary electric machine 1 cut at D3-D3 cross section position of FIG. 3D, which shows a module cooling passage 8 and the like. FIG. 3F is a schematic cross-sectional view of the rotary electric machine 1 cut in the radial direction at B3-B3 cross section position of FIG. 3C. FIG. 3G is a schematic cross-sectional view of the rotary electric machine 1 cut in the radial direction at C3-C3 cross section position of FIG. 3C. FIG. 3H is a schematic cross-sectional view of the rotary electric machine 1 cut in the axial direction at A3-A3 cross section position of FIG. 3C.

In the present embodiment, unlike Embodiment 1, the motor cooling passage 9 is divided into an upstream side passage part and a downstream side passage part by a connection passage 30. As the connection passage 30, an upstream side connection passage 30*b* which connects a downstream end of the upstream side passage part with an inflow port 16 of the module cooling passage 8, and a downstream side connection passage 30*a* which connects an outflow port 36 of the module cooling passage 8 with an upstream end of the downstream side passage part are provided.

According to this configuration, the motor cooling passage 9 can be divided at a suitable position, and be bypassed to the module cooling passage 8. And, a flexibility of design can be improved.

A division position between the upstream side passage part and the downstream side passage part exists on the upstream side of the center position of the total length of the motor cooling passage 9. According to this configuration, by the refrigerant on the upstream side of the center position with a comparatively low temperature, the semiconductor power module 5 with a large temperature rise amount can be cooled effectively.

The connection passage 30 is provided inside the case 12.

In the present embodiment, similarly to Embodiment 1, the motor cooling passage 9 is provided with the circumferential direction part provided with the first one side circumferential direction passage 9*a*1 and the first other side circumferential direction passage 9*b*1; the circumferential direction part provided with the second one side circumferential direction passage **9*a*2 and the second other side circumferential direction passage 9*b*2; and the circumferential direction part provided with the first axial direction passage 9*c*1. In the present embodiment, the second axial direction passage 9*c*2** is not provided.

As shown in FIG. 3B and FIG. 3E, the downstream side connection passage **30*a* is disposed on the axial direction one side X1 of the upstream side connection passage 30*b*, the upstream side connection passage 30*b* and the downstream side connection passage 30*a* are adjacent to each other in the axial direction X. The circumferential direction one side R1 end of the first other side circumferential direction passage 9*b*1 is connected to the inflow port 37. The circumferential direction other side R2 end of the first other side circumferential direction passage 9*b*1 is connected to an upstream end of the upstream side connection passage 30*b***.

A downstream end of the upstream side connection passage **30*b* is connected to the inflow port 16 of the module cooling passage 8. An outflow port 36 of the module cooling passage is connected to an upstream end of the downstream side connection passage 30*a***.

A downstream end of the downstream side connection passage **30*a* is connected to the circumferential direction other side R2 end of the first one side circumferential direction passage 9*a*1. The circumferential direction one side R1 end of the first one side circumferential direction passage 9*a*1 is connected to the circumferential direction other side R2 end of the second one side circumferential direction passage 9*a*2. The circumferential direction one side R1 end of the second one side circumferential direction passage 9*a*2 is connected to the axial direction one side X1 part of the first axial direction passage 9*c*1. The axial direction other side X2 part of the first axial direction passage 9*c*1 is connected to the circumferential direction one side R1 end of the second other side circumferential direction passage 9*b*2. The circumferential direction other side R2 end of the second other side circumferential direction passage 9*b*2 is connected to the outflow port 17**.

The first axial direction passage **9*c*1 is adjacently disposed on the circumferential direction other side R2 of the upstream side connection passage 30*b* and the downstream side connection passage 30*a*. A length in the circumferential direction of a circumferential direction part provided with the second one side circumferential direction passage 9*a*2 and the second other side circumferential direction passage 9*b*2 is longer than a length in the circumferential direction of a circumferential direction part provided with the first one side circumferential direction passage 9*a*1 and the first other side circumferential direction passage 9*b*1. Preferably, the length in the circumferential direction of the circumferential direction part provided with the first one side circumferential direction passage 9*a*1 and the first other side circumferential direction passage 9*b*1 may be a length in the circumferential direction of 90 degrees or less (in this example, the length in the circumferential direction of about 45 degrees). And, the length in the circumferential direction of the circumferential direction part provided with the second one side circumferential direction passage 9*a*2 and the second other side circumferential direction passage 9*b*2** may be a length in the circumferential direction of 180 degrees or more (in this example, the length in the circumferential direction of about 270 degrees).

According to this configuration, as shown in FIG. 3B, the refrigerant flows into the comparatively short first other side circumferential direction passage **9*b*1 from the inflow port 37, and flows to the circumferential direction other side R2. Then, the refrigerant flows through the module cooling passage 8 via the upstream side connection passage 30*b*. Then, the refrigerant flows into the first one side circumferential direction passage 9*a*1 via the downstream side connection passage 30*a*, and flows to the circumferential direction one side R1. Then, the refrigerant flows through the second one side circumferential direction passage 9*a*2 to the circumferential direction one side R1 succeedingly. Then, the refrigerant flows through the first axial direction passage 9*c*1 to the axial direction other side X2, and then, it flows into the second other side circumferential direction passage 9*b*2, and flows to the circumferential direction other side R2. Then, the refrigerant is discharged from the outflow port 17**.

Herein, since the first other side circumferential direction passage **9*b*1 is comparatively short, a temperature rise of the refrigerant is low. The refrigerant with low temperature flows through the module cooling passage 8, the first one side circumferential direction passage 9*a*1, and the second one side circumferential direction passage 9*a*2. Accordingly, by the refrigerant with a comparatively low temperature that flows through the module cooling passage 8 and the first and second one side circumferential direction passages 9*a*1, 9*a*2, the semiconductor power module 5 with a large temperature rise amount and the one side coil end 4*a* whose heating amount becomes comparatively large by the connection can be cooled effectively. On the other hand, the refrigerant whose temperature increased in the first and second one side circumferential direction passages 9*a*1, 9*a*2 flows through the second other side circumferential direction passage 9*b*2, and cools the other side coil end 4*b*. However, since the heating amount of the other side coil end 4*b* which is not connected is lower than the heating amount of the one side coil end 4*a***, cooling performance can be secured.

A part of the stator 10 where the upstream side and the downstream side connection passages **30*b*, 30*a* are formed is projected to the radial direction outside Y2 from its surrounding parts, and this projection part is not covered by the cylindrical tubular inner circumferential face of the case 12. Then, the upstream side and the downstream side connection passages 30*b*, 30*a* are extended in the radial direction Y inside the projection part of the stator 10. The radial direction inside Y1 end of the upstream side connection passage 30*b* is opened to the circumferential direction one side R1, and is communicated to the first other side circumferential direction passage 9*b*1. The radial direction inside Y1 end of the downstream side connection passage 30*a* is opened to the circumferential direction one side R1, and is communicated to the first one side circumferential direction passage 9*a*1. The radial direction outside Y2 end of the upstream side connection passage 30*b* is opened to the radial direction outside Y2, and is communicated to the inflow port 16 of the module cooling passage 8. The radial direction outside Y2 end of the downstream side connection passage 30*a* is opened to the radial direction outside Y2, and is communicated to the outflow port 36 of the module cooling passage 8**.

The module cooling passage 8 is provided with an other side circumferential direction passage **8*b* extended in the circumferential direction other side R2 from the inflow port 16 of the module cooling passage 8 disposed on the axial direction other side X2; an axial direction passage 8*c* extended to the axial direction one side X1 from the circumferential direction other side R2 end of the other side circumferential direction passage 8*b*; and an one side circumferential direction passage 8*a* extended to the circumferential direction one side R1 from the axial direction one side X1 end of the axial direction passage 8*c* to the outflow port 36 of the module cooling passage 8. The module cooling passage 8 is formed in a rectangular shape in accordance with the shape of the semiconductor power module 5**.

The module cooling passage 8 is disposed on the radial direction outside Y2 of the motor cooling passage 9, and the semiconductor power module 5 is disposed on the radial direction outside Y2 of the module cooling passage 8 so that heat transfer is possible. In the present embodiment, the module cooling passage 8 is disposed on the radial direction outside Y2 of the first axial direction passage 9*c*1 and the like.

According to this configuration, since the module cooling passage 8 is disposed between the semiconductor power module 5 and the motor cooling passage 9, the heat transfer between the body part of the rotary electric machine, such as the stator 10, and the semiconductor power module 5 is suppressed, and occurrence of heat interference can be suppressed. By providing the module cooling passage 8 dedicated to the semiconductor power module 5, the module cooling passage 8 can be formed so that the cooling performance of the semiconductor power module 5 is improved.

The capacitor 6 is disposed on the radial direction outside Y2 of a part of the motor cooling passage 9 on the upstream side of the center position of the total length of the motor cooling passage 9 so that heat transfer is possible. According to this configuration, by the refrigerant on the upstream side of the center position with a comparatively low temperature, the capacitor 6 with a comparatively low heat resistant temperature can be effectively cooled. By cooling the capacitor 6 by the motor cooling passage 9, it is not necessary to provide a cooling passage dedicated to capacitor 6, and the apparatus can be miniaturized.

In the present embodiment, the capacitor 6 is disposed on the radial direction outside Y2 of the first other side circumferential direction passage 9*b*1 and the first one side circumferential direction passage 9*a*1 so that heat transfer is possible. According to this configuration, the capacitor 6 can be cooled effectively by the low-temperature refrigerant just after flowing into the inflow port 37 of the motor cooling passage 9. Since the first other side circumferential direction passage 9*b*1 is provided on the upstream side of the first one side circumferential direction passage 9*a*1, the area of the passage part for cooling the capacitor where the low-temperature refrigerant flows can be expanded also to the axial direction other side X2. Since the volume of the capacitor 6 is large, the capacitor 6 can be effectively cooled by expanding the cooling area where the low-temperature refrigerant flows to the axial direction other side X2.

The capacitor 6 is disposed on the circumferential direction one side R1 of the upstream side and the downstream side connection passages 30*b*, 30*a* so that heat transfer is possible. According to this configuration, the capacitor 6 can be effectively cooled also by the upstream side and the downstream side connection passages 30*b*, 30*a* where the comparatively low-temperature refrigerant flows.

4. Embodiment 4

Next, the rotary electric machine 1 according to Embodiment 4 will be explained. The explanation for constituent parts the same as those in Embodiment 1 will be omitted. The basic configuration of the rotary electric machine 1 according to the present embodiment is the same as that of Embodiment 1. Embodiment 4 is different from Embodiment 1 in that the connection passage 30 which connects between the motor cooling passage 9 and the module cooling passage 8 is provided inside the case 12.

Figure 4A:
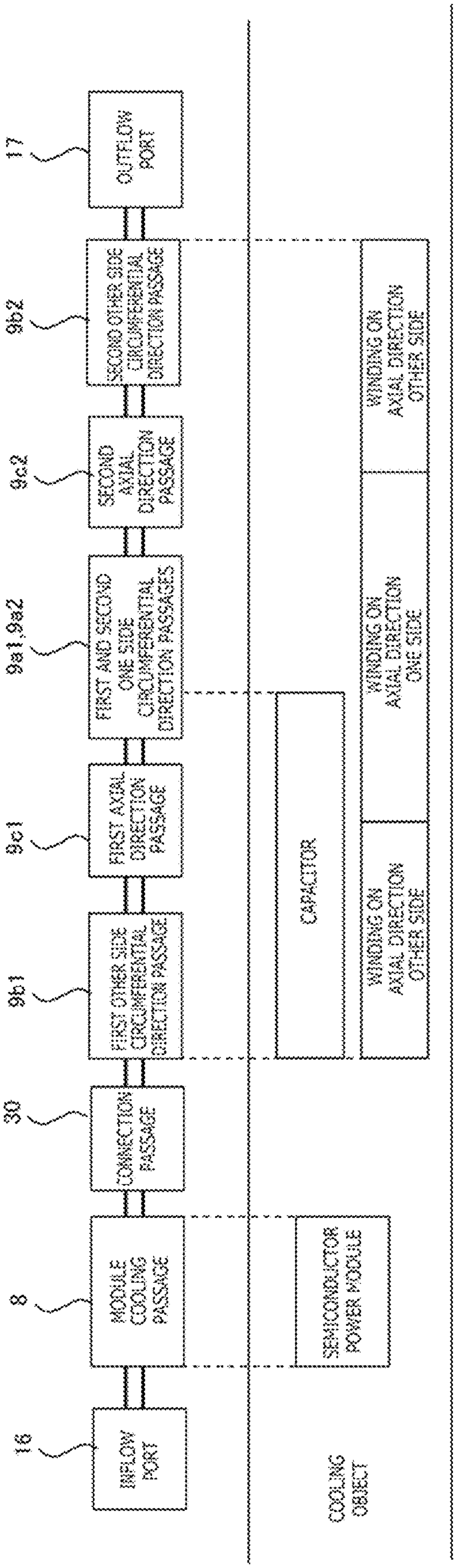
FIG. 4A is a schematic diagram showing an order of refrigerant flow, and a cooling object, according to Embodiment 4.
Figure 4B:
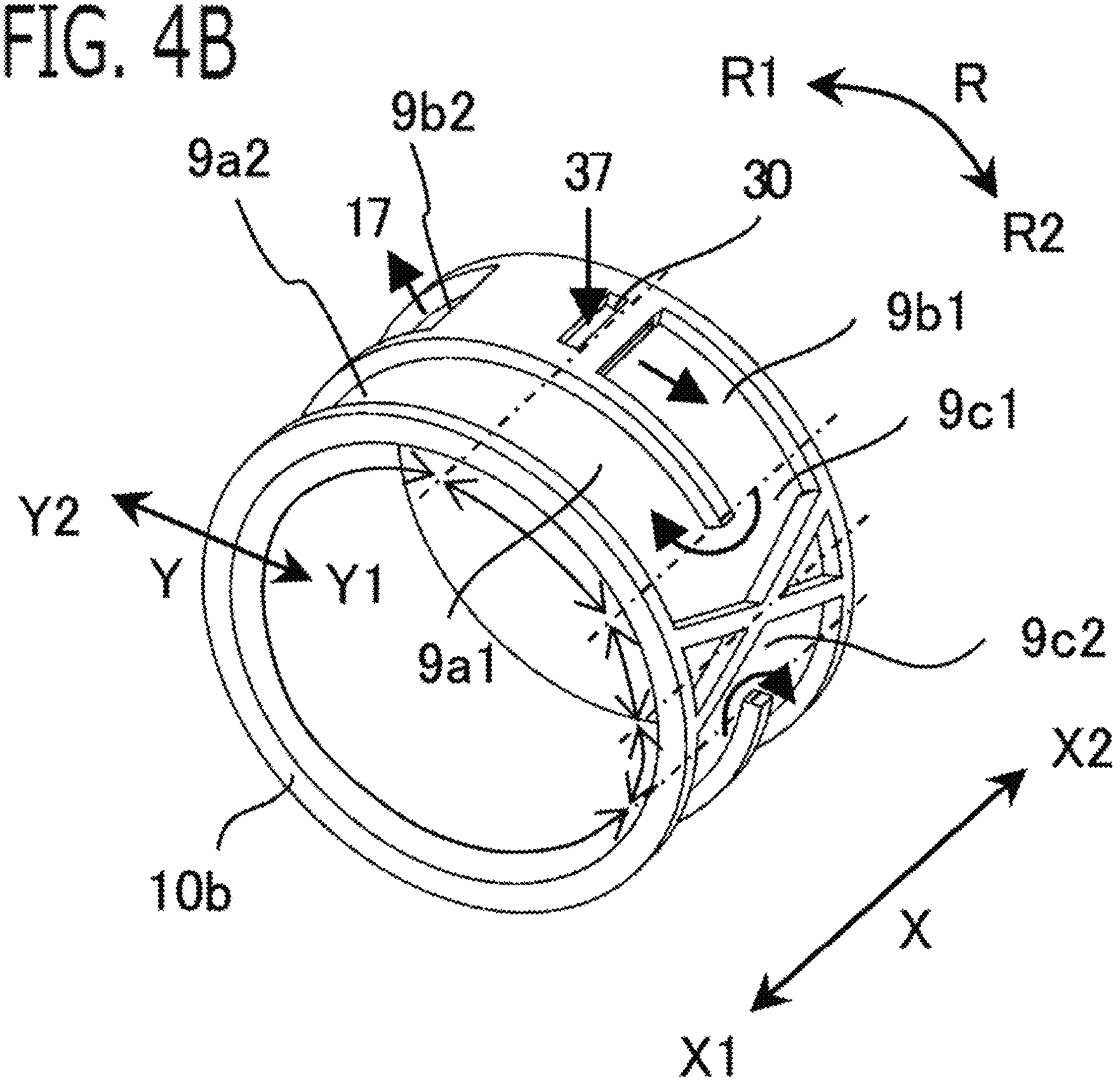
FIG. 4B is an isometrical drawing of a principal part for explaining the motor cooling passage and the connection passage provided in the outer circumferential part of the stator, according to Embodiment 4.
Figure 4C:
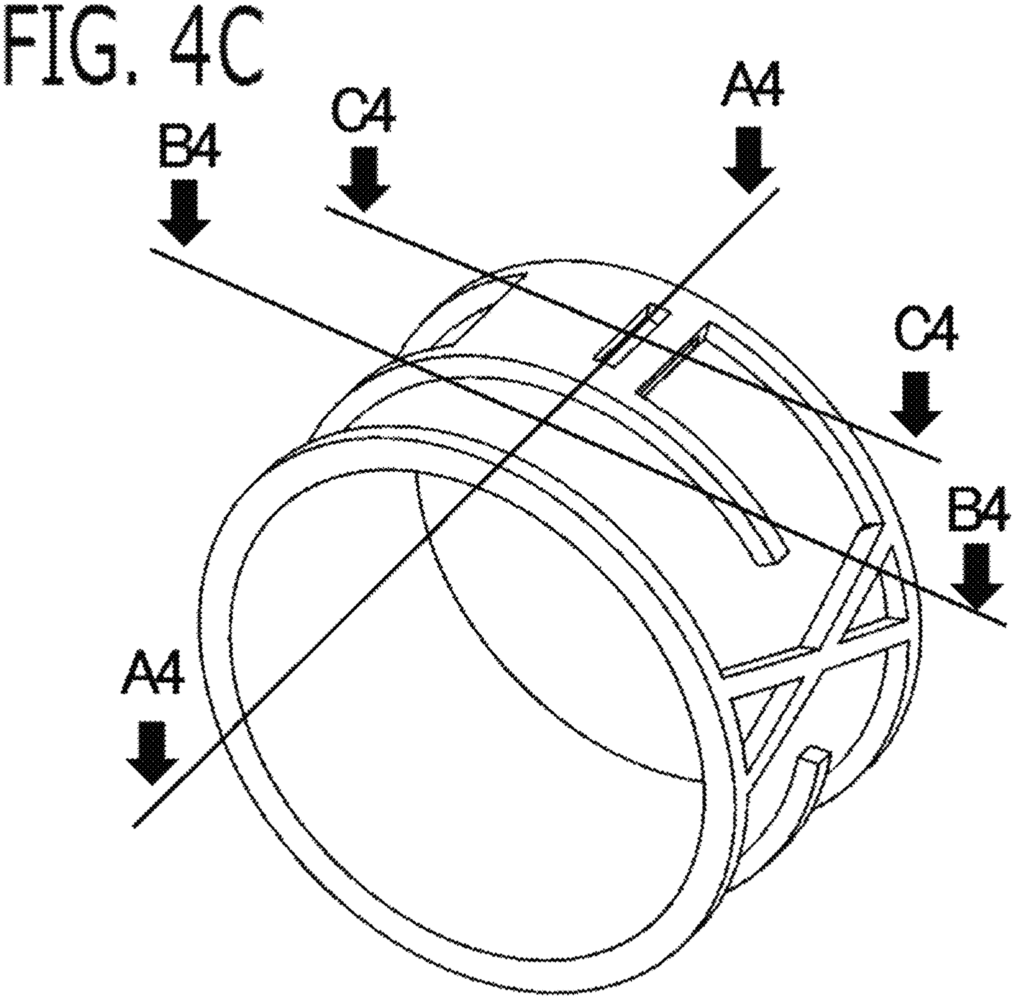
FIG. 4C is an indication figure of cross section position showing a relation between the cross section positions of the rotary electric machine and the motor cooling passage which are shown in FIG. 4F to FIG. 4H, according to Embodiment 4.
Figure 4D:
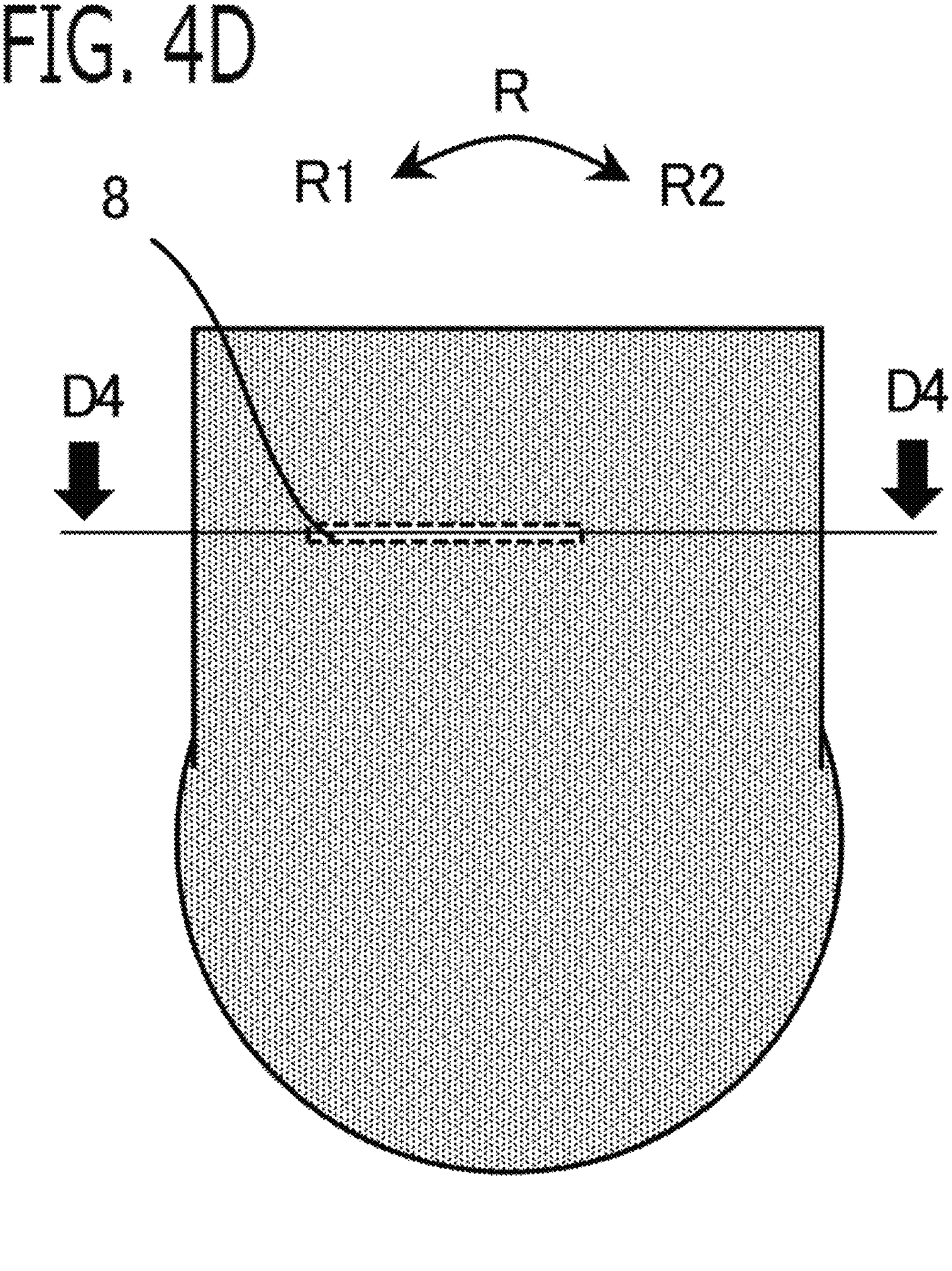
FIG. 4D is a schematic indication figure of cross section position of the rotary electric machine cut in the radial direction, which shows the cross section position of the rotary electric machine shown in FIG. 4E, according to Embodiment 4.
Figure 4F:
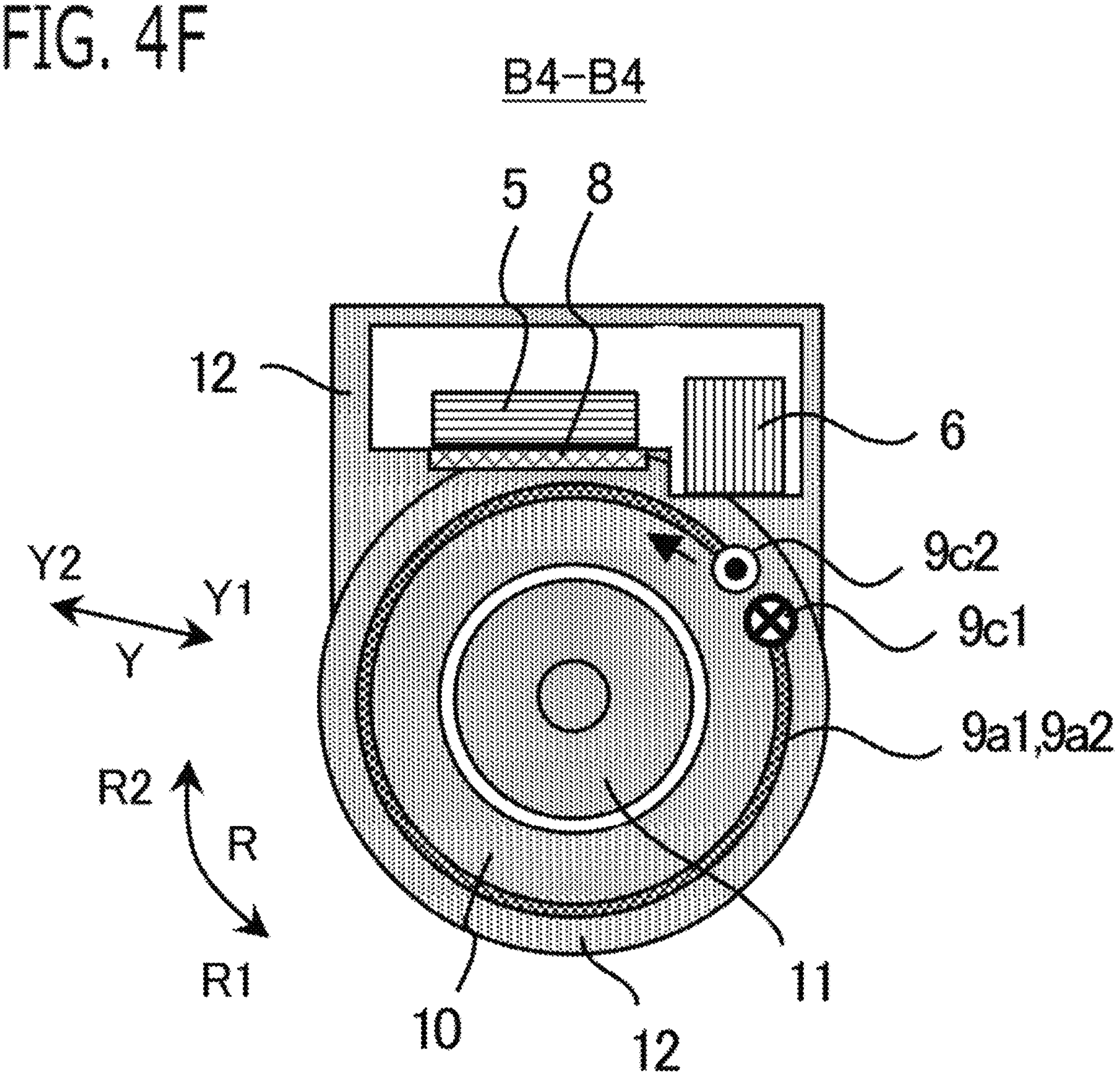
FIG. 4F is a schematic cross-sectional view of the rotary electric machine cut in the radial direction at B4-B4 cross section position of FIG. 4C, according to Embodiment 4.
Figure 4G:
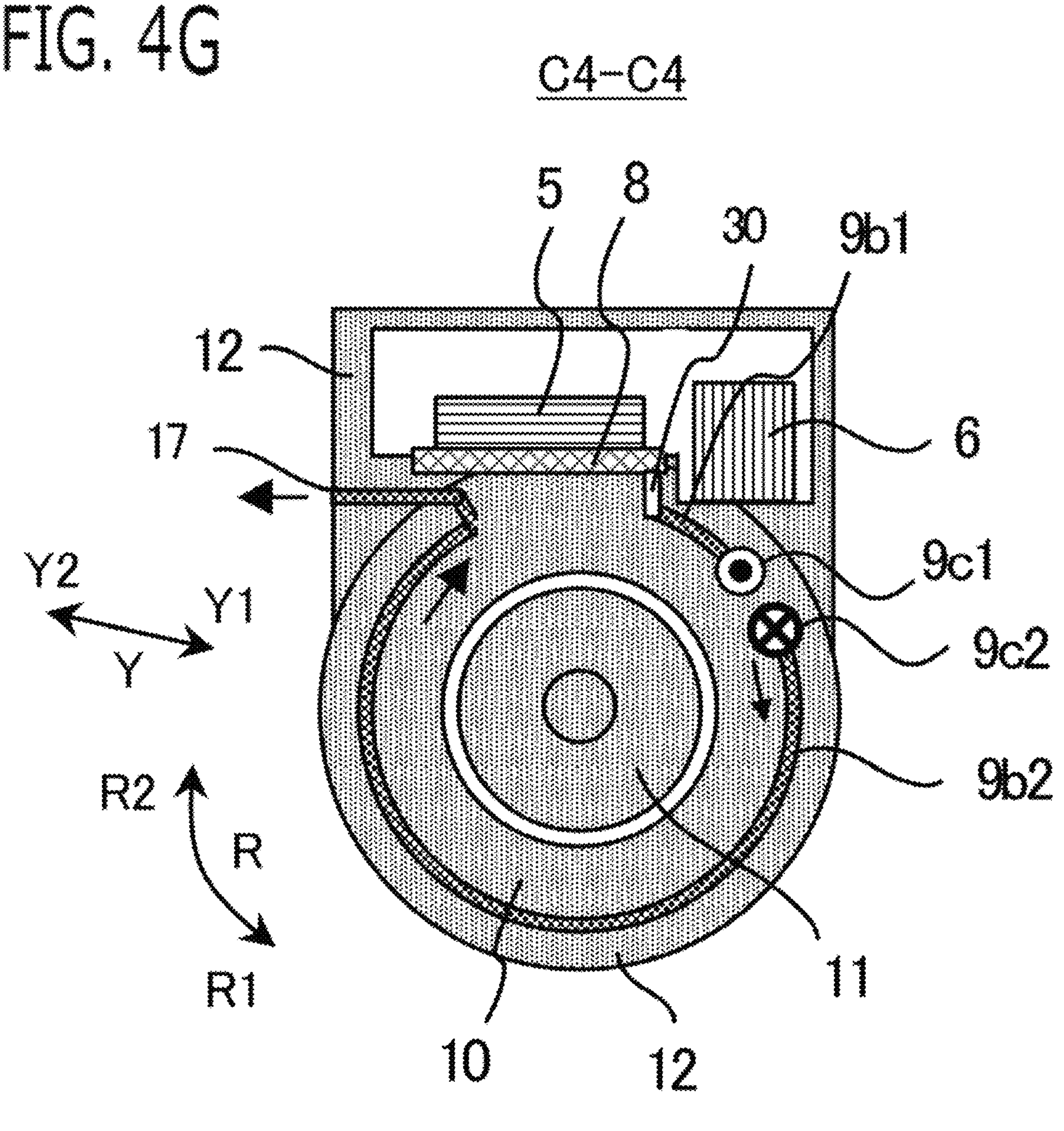
FIG. 4G is a schematic cross-sectional view of the rotary electric machine cut in the radial direction at C4-C4 cross section position of FIG. 4C, according to Embodiment 4.
Figure 4H:
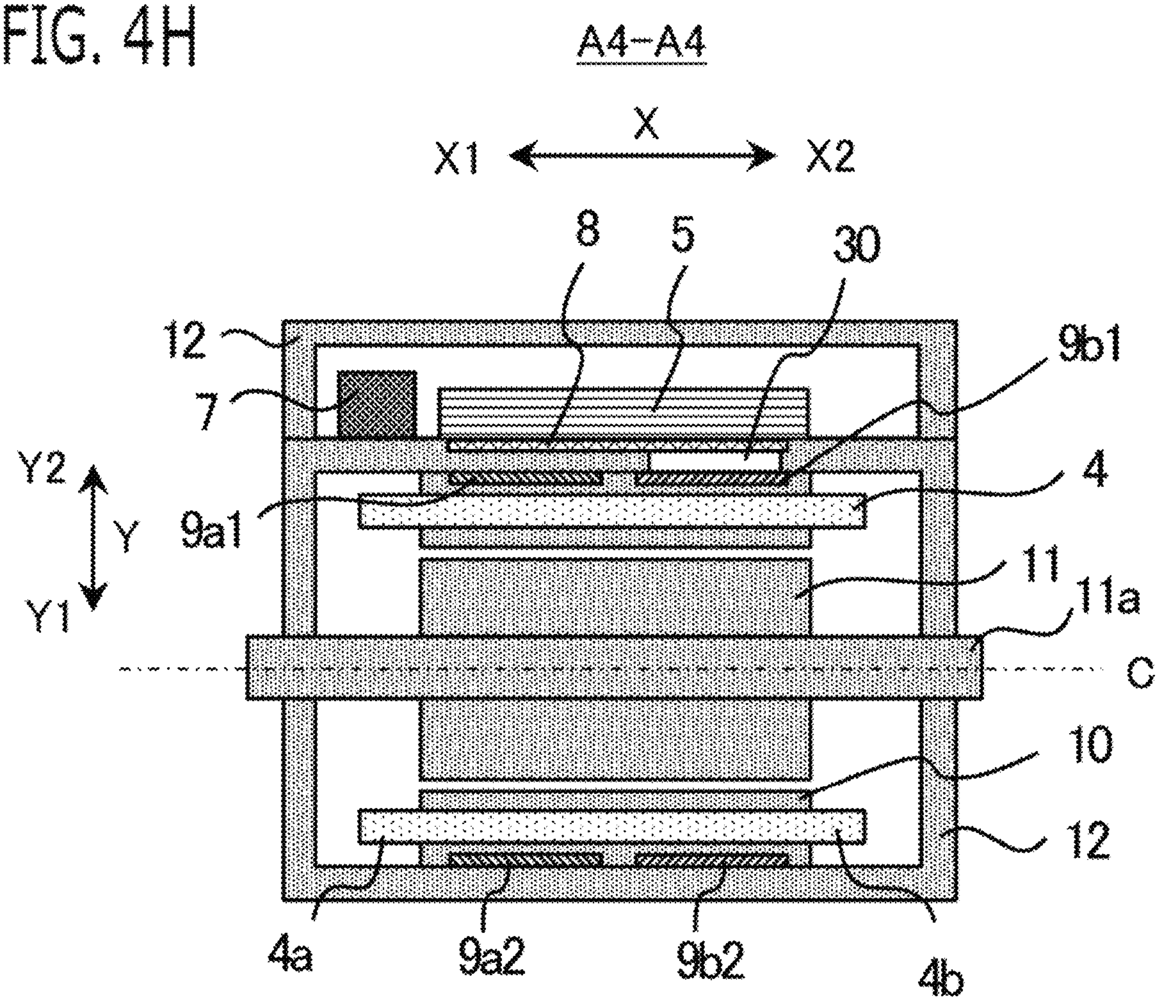
FIG. 4H is a schematic cross-sectional view of the rotary electric machine cut in the axial direction at A4-A4 cross section position of FIG. 4C, according to Embodiment 4.

FIG. 4A is a schematic diagram showing an order of refrigerant flow, and a cooling object. FIG. 4B is an isometrical drawing of a principal part for explaining the motor cooling passage 9 and the connection passage 30 provided in the outer circumferential part of the stator 10. FIG. 4C is an indication figure of cross section position showing a relation between the cross section positions of the rotary electric machine 1 and the motor cooling passage 9 which are shown in FIG. 4F to FIG. 4H. FIG. 4D is a schematic indication figure of cross section position of the rotary electric machine 1 cut in the radial direction Y, which shows the cross section position of the rotary electric machine 1 shown in FIG. 4E. FIG. 4E is a schematic cross-sectional view of the rotary electric machine 1 cut at D4-D4 cross section position of FIG. 4D, which shows a module cooling passage 8 and the like. FIG. 4F is a schematic cross-sectional view of the rotary electric machine 1 cut in the radial direction at B4-B4 cross section position of FIG. 4C. FIG. 4G is a schematic cross-sectional view of the rotary electric machine 1 cut in the radial direction at C4-C4 cross section position of FIG. 4C. FIG. 4H is a schematic cross-sectional view of the rotary electric machine 1 cut in the axial direction at A4-A4 cross section position of FIG. 4C.

Similarly to Embodiment 1, the motor cooling passage 9 is provided with a circumferential direction part provided with the first one side circumferential direction passage 9*a*1 and the first other side circumferential direction passage 9*b*1; a circumferential direction part provided with the second one side circumferential direction passage 9*a*2 and the second other side circumferential direction passage 9*b*2; a circumferential direction part provided with the first axial direction passage 9*c*1; and a circumferential direction part provided with the second axial direction passage 9*c*2.

In the present embodiment, directions of the circumferential direction one side R1 and the circumferential direction other side R2 are defined in directions reverse to Embodiment 1.

The circumferential direction one side R1 end of the first other side circumferential direction passage 9*b*1 is connected to the inflow port 37. The circumferential direction other side R2 end of the first other side circumferential direction passage 9*b*1 is connected to the axial direction other side X2 part of the first axial direction passage 9*c*1. The axial direction one side X1 part of the first axial direction passage 9*c*1 is connected to the circumferential direction other side R2 end of the first one side circumferential direction passage 9*a*1. The circumferential direction one side R1 end of the first one side circumferential direction passage 9*a*1 is connected to the circumferential direction other side R2 end of the second one side circumferential direction passage 9*a*2. The circumferential direction one side R1 end of the second one side circumferential direction passage 9*a*2 is connected to the axial direction one side X1 part of the second axial direction passage 9*c*2. The axial direction other side X2 part of the second axial direction passage 9*c*2 is connected to the circumferential direction one side R1 end of the second other side circumferential direction passage 9*b*2. The circumferential direction other side R2 end of the second other side circumferential direction passage 9*b*2 is connected to the outflow port 17.

The second axial direction passage 9*c*2 is adjacently disposed on the circumferential direction other side R2 of the first axial direction passage 9*c*1. A length in the circumferential direction of a circumferential direction part provided with the second one side circumferential direction passage 9*a*2 and the second other side circumferential direction passage 9*b*2 is longer than a length in the circumferential direction of a circumferential direction part provided with the first one side circumferential direction passage 9*a*1 and the first other side circumferential direction passage 9*b*1. Preferably, the length in the circumferential direction of the circumferential direction part provided with the first one side circumferential direction passage 9*a*1 and the first other side circumferential direction passage 9*b*1 may be a length in the circumferential direction of 90 degrees or less (in this example, the length in the circumferential direction of about 45 degrees). And, the length in the circumferential direction of the circumferential direction part provided with the second one side circumferential direction passage 9*a*2 and the second other side circumferential direction passage 9*b*2 may be a length in the circumferential direction of 180 degrees or more (in this example, the length in the circumferential direction of about 270 degrees).

The module cooling passage 8 is disposed on the radial direction outside Y2 of the motor cooling passage 9, and the semiconductor power module 5 is disposed on the radial direction outside Y2 of the module cooling passage 8 so that heat transfer is possible. In the present embodiment, the module cooling passage 8 is disposed on the radial direction outside Y2 of the second one side circumferential direction passage 9*a*2 and the second other side circumferential direction passage 9*b*2.

The motor cooling passage 9 and the module cooling passage 8 are connected by the connection passage 30. The outflow port 36 of the module cooling passage 8 is connected with the inflow port 37 of the motor cooling passage 9 via the connection passage 30. The module cooling passage 8 is formed in a part of the case 12 or a housing which houses the inverter 2. The module cooling passage 8 is formed in a rectangular shape in accordance with the shape of the semiconductor power module 5. The refrigerant cooled by the external heat exchange mechanism is supplied to the inflow port 16 of the module cooling passage 8. The refrigerant discharged from the outflow port 17 of the motor cooling passage 9 is supplied to the external heat exchange mechanism and cooled. The inflow port 16 of the module cooling passage 8 is formed in the circumferential direction one side R1 end of the module cooling passage 8, and is opened to the circumferential direction one side R1. The outflow port 36 of the module cooling passage 8 is formed in the axial direction other side X2 part of the circumferential direction other side R2 end of the module cooling passage 8, is opened to the radial direction inside Y1, and is connected to the connection passage 30.

In the present embodiment, the connection passage 30 which connects between the motor cooling passage 9 and the module cooling passage 8 is provided inside the case 12. According to this configuration, the connection passage 30 can be protected by the case 12.

The connection passage 30 is extended in the radial direction Y inside the outer circumferential part of the stator 10. The radial direction inside Y1 end of the connection passage 30 is opened to the circumferential direction other side R2, and is communicated to the circumferential direction one side R1 end of the first other side circumferential direction passage 9*b*1 (the inflow port 37). The radial direction outside Y2 end of the connection passage 30 is opened to the radial direction outside Y2, and is communicated to the outflow port 36 of the module cooling passage. This opening on the radial direction outside Y2 is not covered with the cylindrical tubular inner circumferential face of the case 12. According to this configuration, the connection passage 30 can be detached and attached only by moving the inverter 2 and the module cooling passage 8 in the radial direction Y, and the inverter 2 can be detached and attached easily.

The capacitor 6 is disposed on the radial direction outside Y2 of a part of the motor cooling passage 9 on the upstream side of the center position of the total length of the motor cooling passage 9 so that heat transfer is possible. In the present embodiment, the capacitor 6 is disposed on the radial direction outside Y2 of the first other side circumferential direction passage 9*b*1, the first axial direction passage 9*c*1, and the first one side circumferential direction passage 9*a*1 so that heat transfer is possible. The capacitor 6 is disposed on the circumferential direction other side R2 of the connection passage 30 and the module cooling passage 8 so that heat transfer is possible.

5. Embodiment 5

Next, the rotary electric machine 1 according to Embodiment 5 will be explained. The explanation for constituent parts the same as those in Embodiment 1 will be omitted. The basic configuration of the rotary electric machine 1 according to the present embodiment is the same as that of Embodiment 1. Embodiment 5 is different from Embodiment 1 in the shape of the module cooling passage 8 and the like.

Figure 5A:
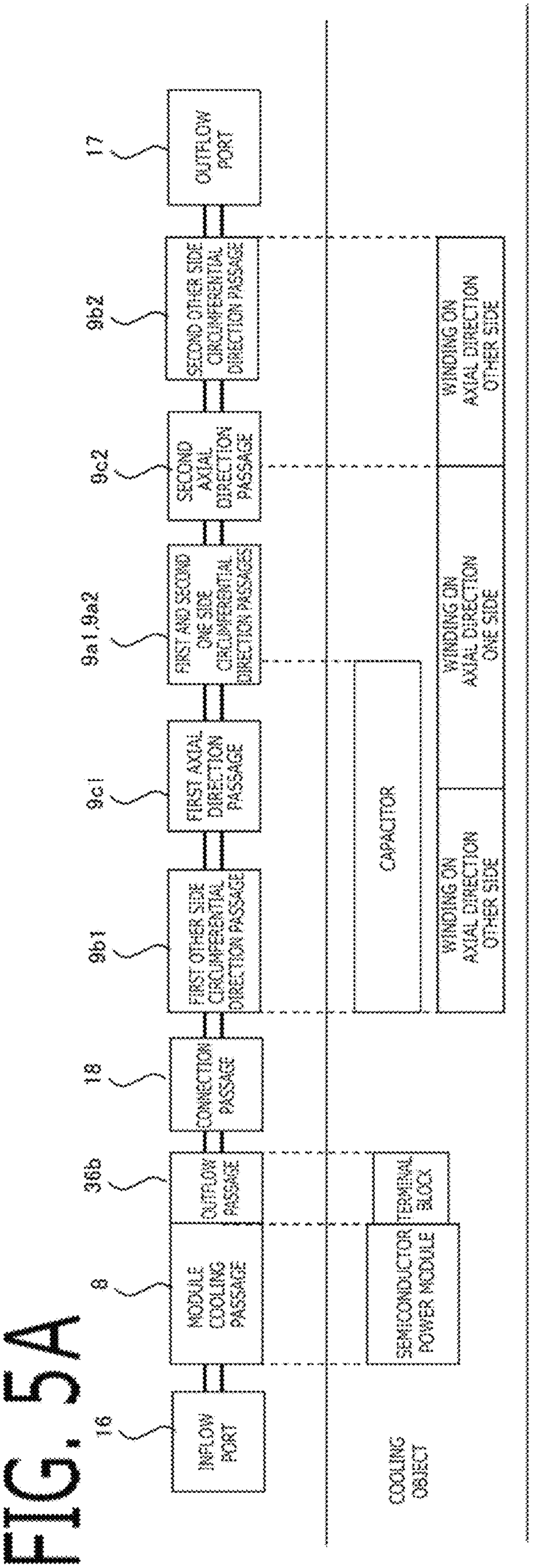
FIG. 5A is a schematic diagram showing an order of refrigerant flow, and a cooling object, according to Embodiment 5.
Figure 5B:
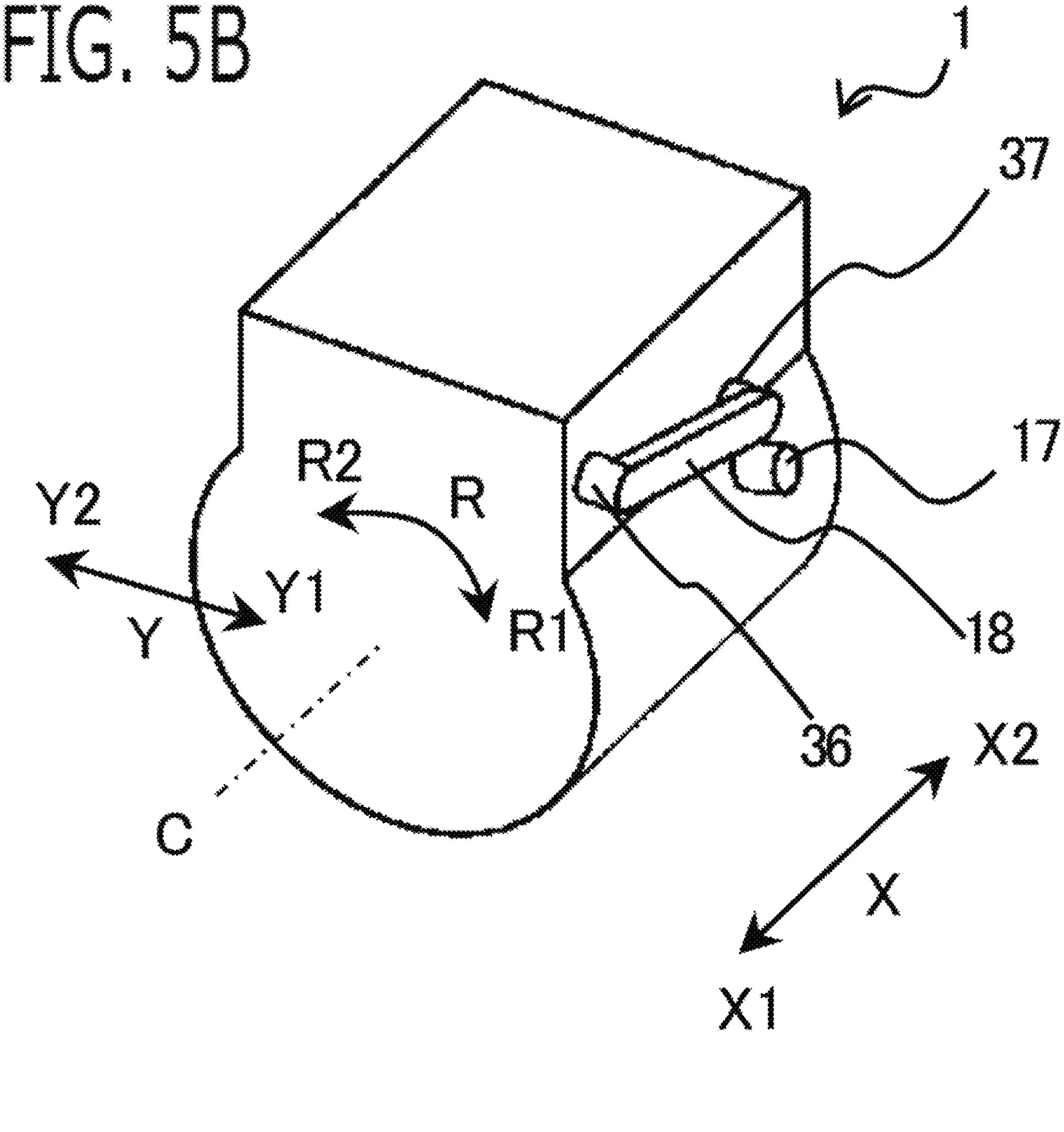
FIG. 5B is a schematic isometrical drawing of the rotary electric machine, according to Embodiment 5.
Figure 5C:
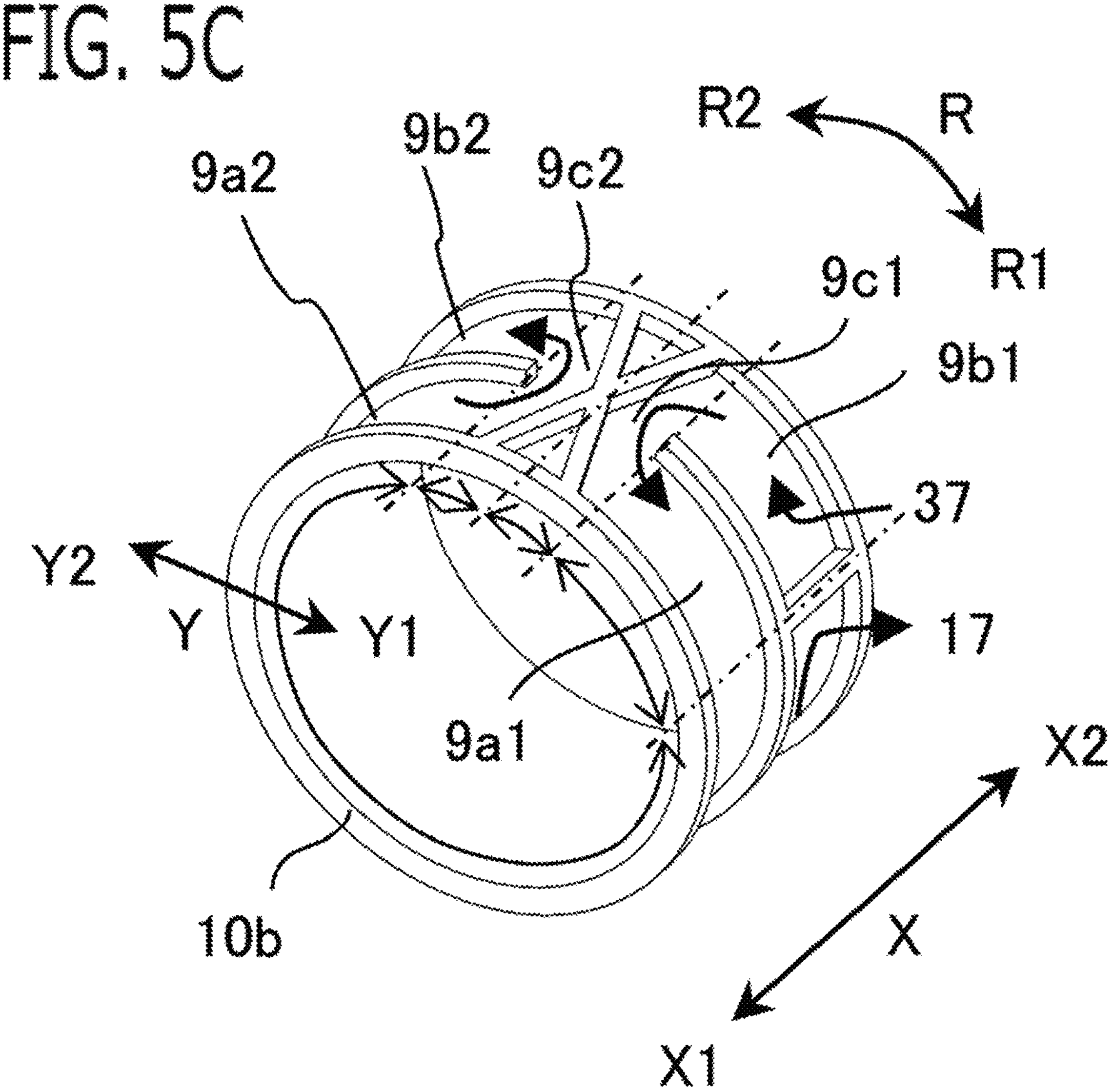
FIG. 5C is an isometrical drawing of a principal part for explaining the motor cooling passage provided in the outer circumferential part of the stator, according to Embodiment 5.
Figure 5D:
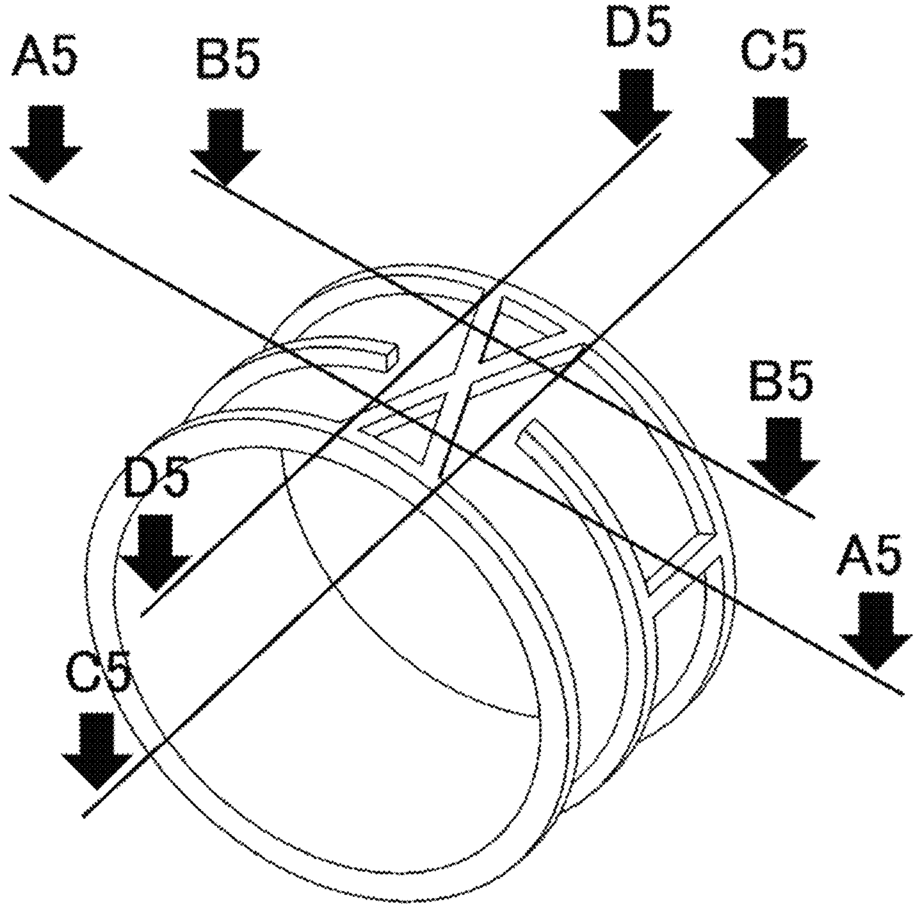
FIG. 5D is an indication figure of cross section position showing a relation between the cross section positions of the rotary electric machine and the motor cooling passage which are shown in FIG. 5H to FIG. SK, according to Embodiment 5.
Figure 5E:
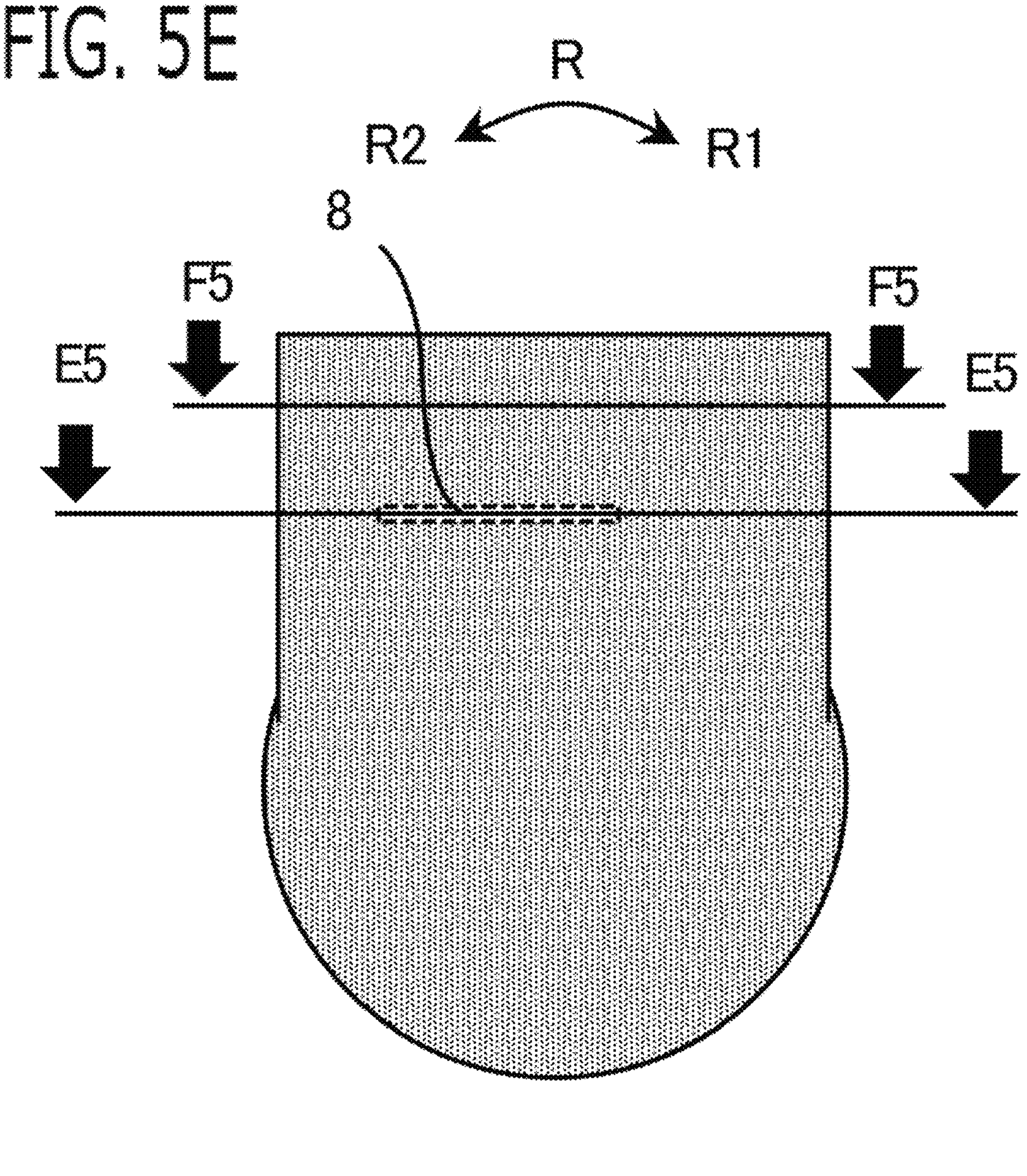
FIG. 5E is a schematic indication figure of cross section position of the rotary electric machine cut in the radial direction, which shows the cross section position of the rotary electric machine shown in FIG. 5F and FIG. 5G, according to Embodiment 5.
Figure 5F:
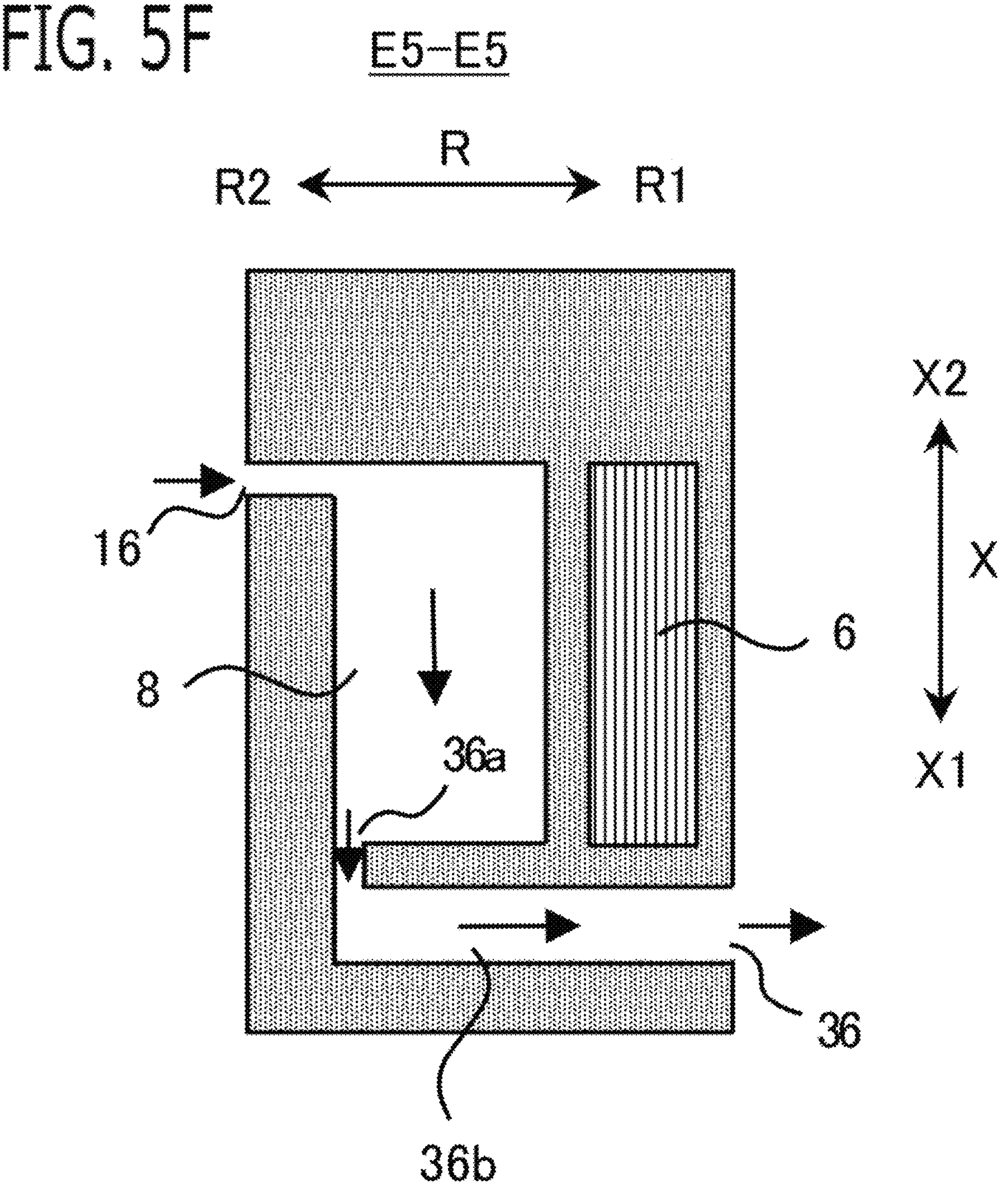
FIG. 5F is a schematic cross-sectional view of the rotary electric machine cut at E5-E5 cross section position of FIG. 5E, which shows the module cooling passage and the like, according to Embodiment 5.
Figure 5G:
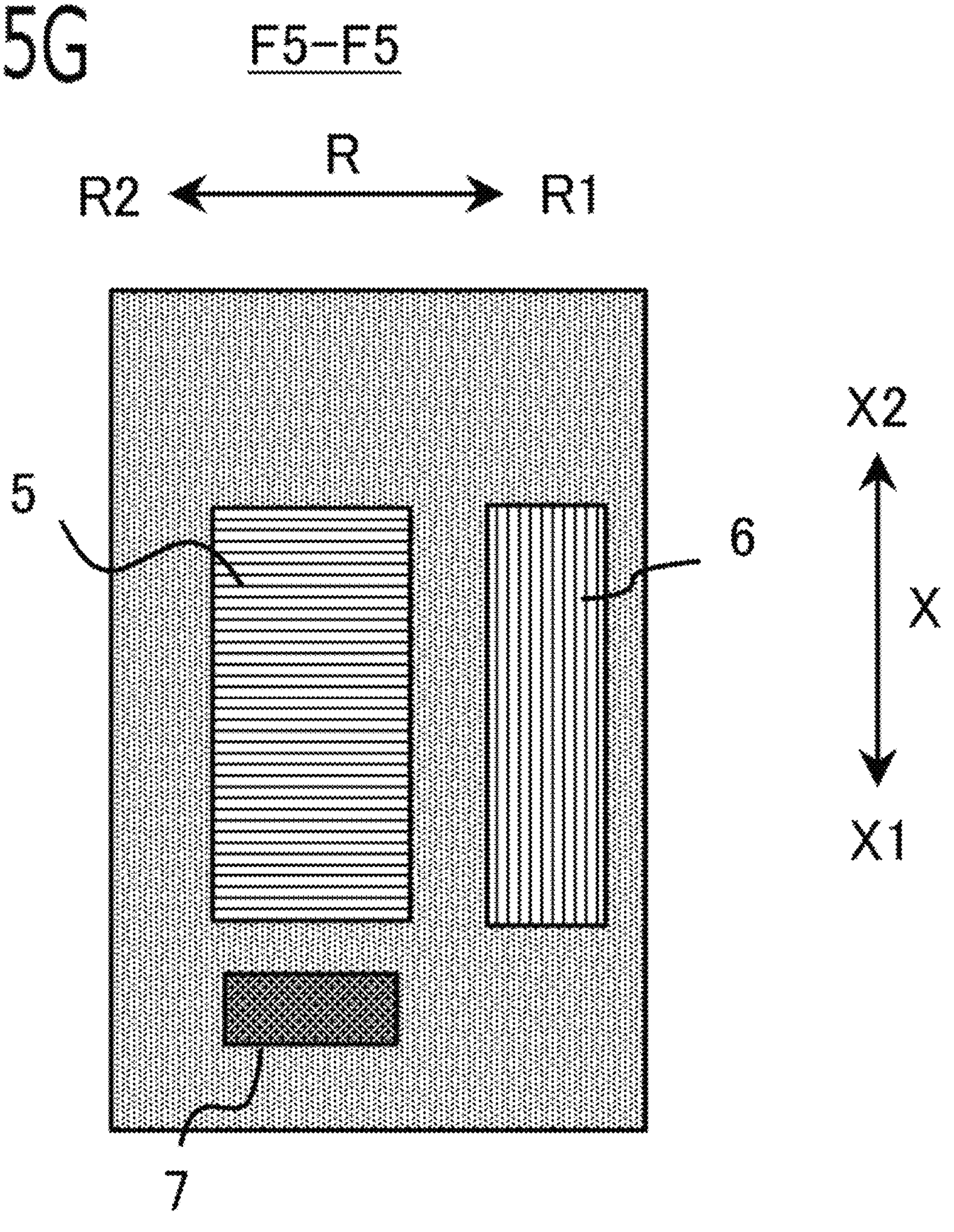
FIG. 5G is a schematic cross-sectional view of the rotary electric machine cut at F5-F5 cross section position of FIG. 5E, which shows the module cooling passage and the like, according to Embodiment 5.
Figure 5H:
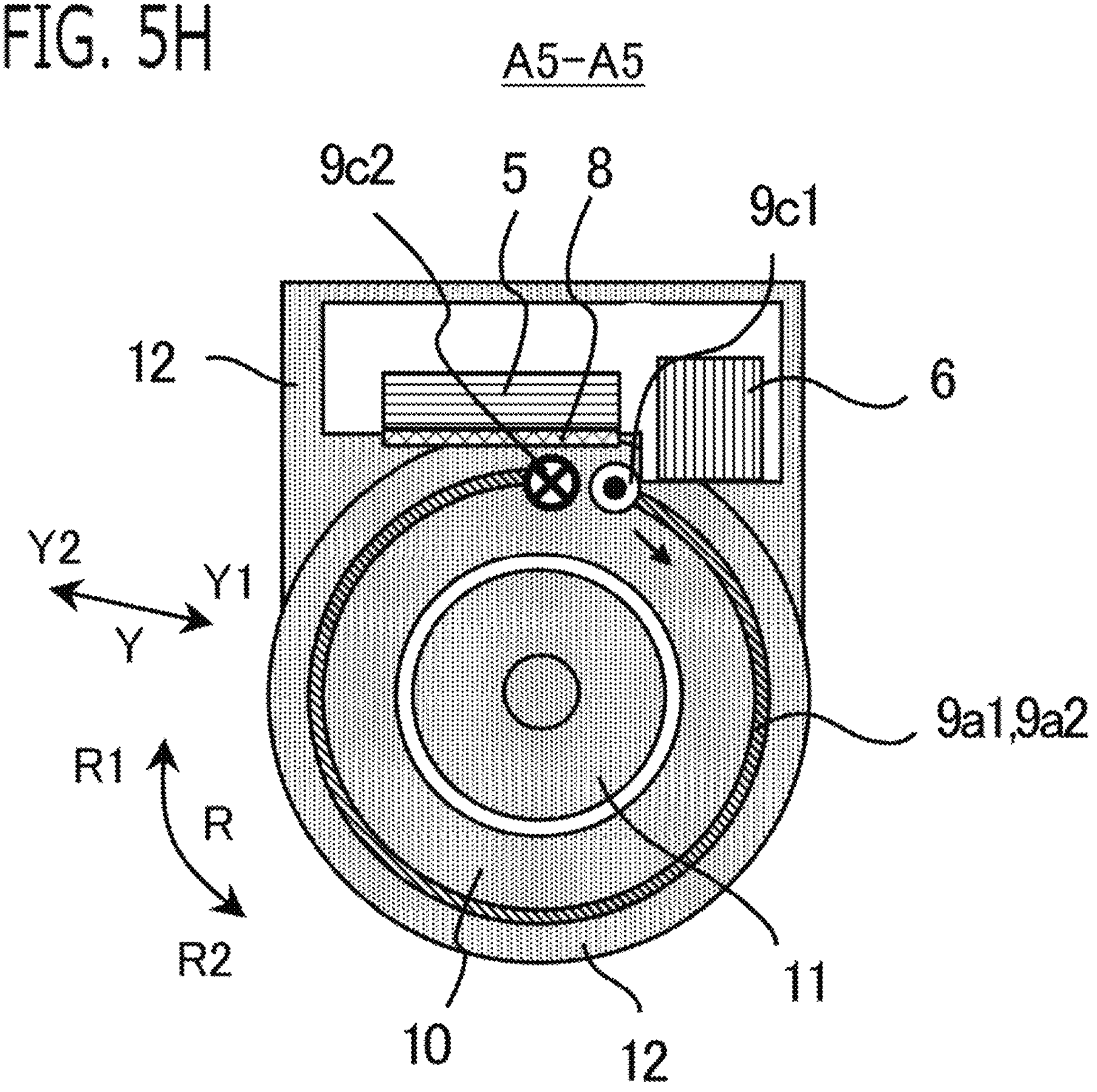
FIG. 5H is a schematic cross-sectional view of the rotary electric machine cut in the radial direction at A5-A5 cross section position of FIG. 5D, according to Embodiment 5.
Figure 5I:
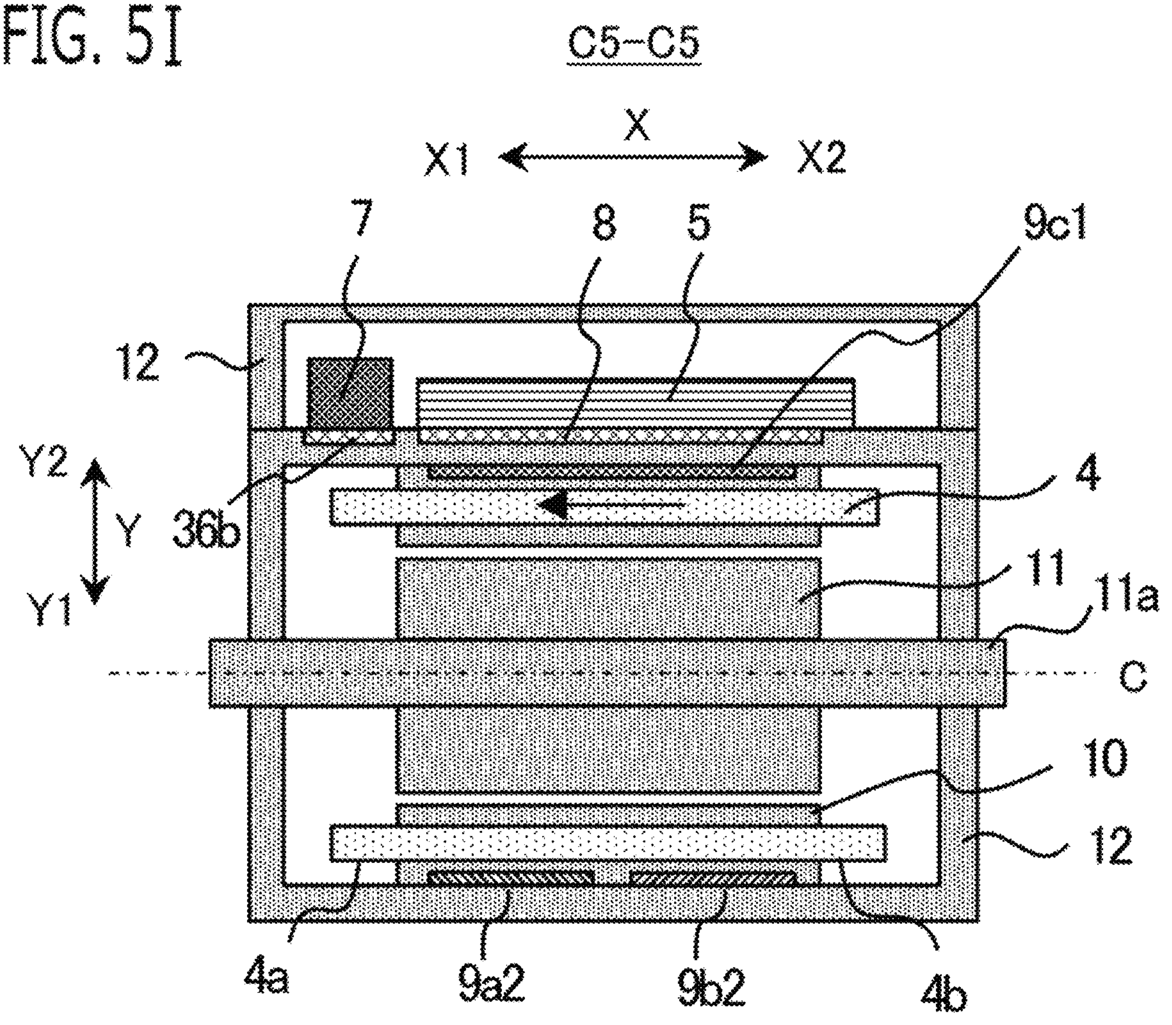
FIG. 5I is a schematic cross-sectional view of the rotary electric machine cut in the axial direction at C5-C5 cross section position of FIG. 5D, according to Embodiment 5.
Figure 5J:
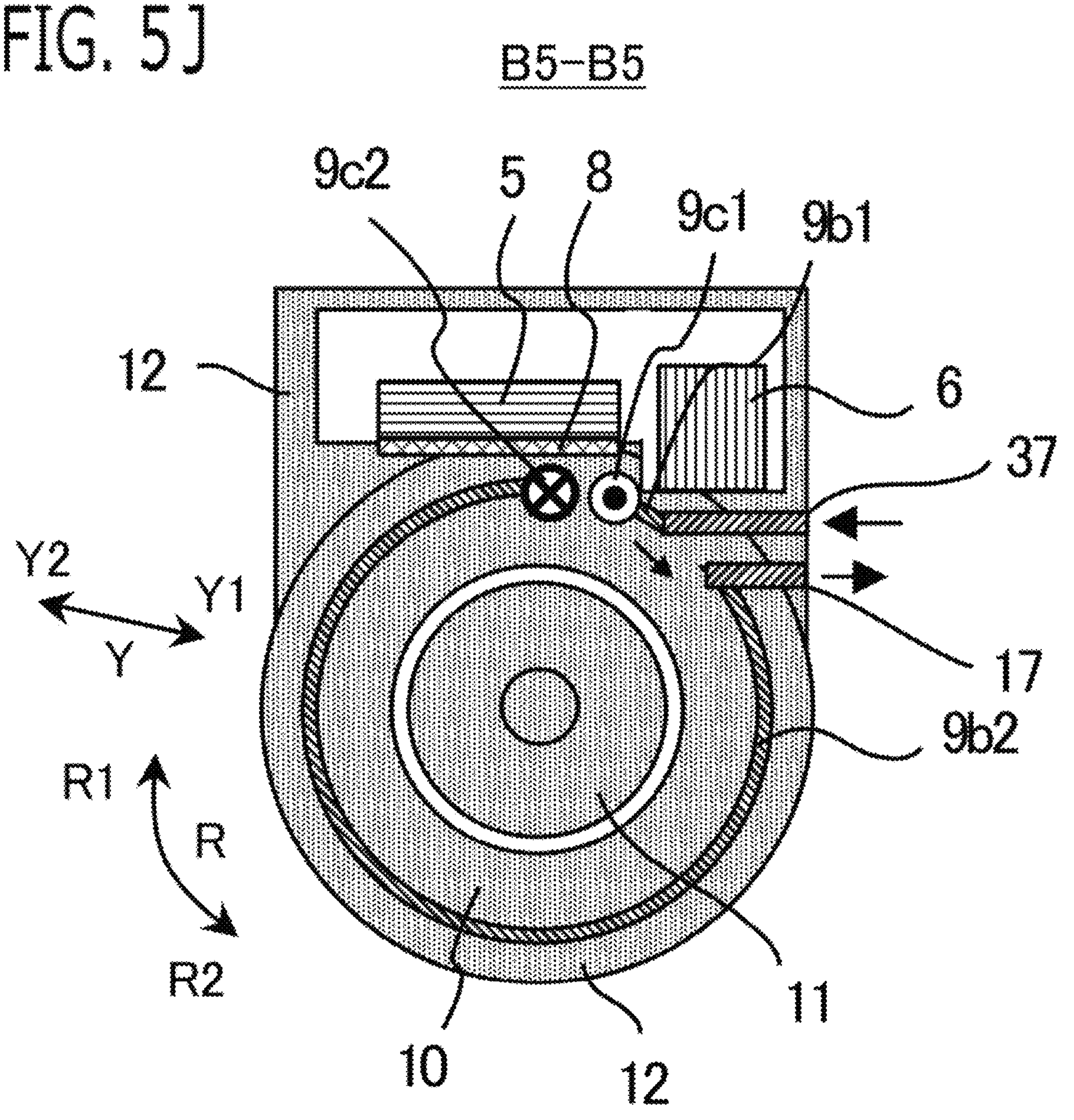
FIG. 5J is a schematic cross-sectional view of the rotary electric machine cut in the radial direction at B5-B5 cross section position of FIG. 5D, according to Embodiment 5.
Figure 5K:
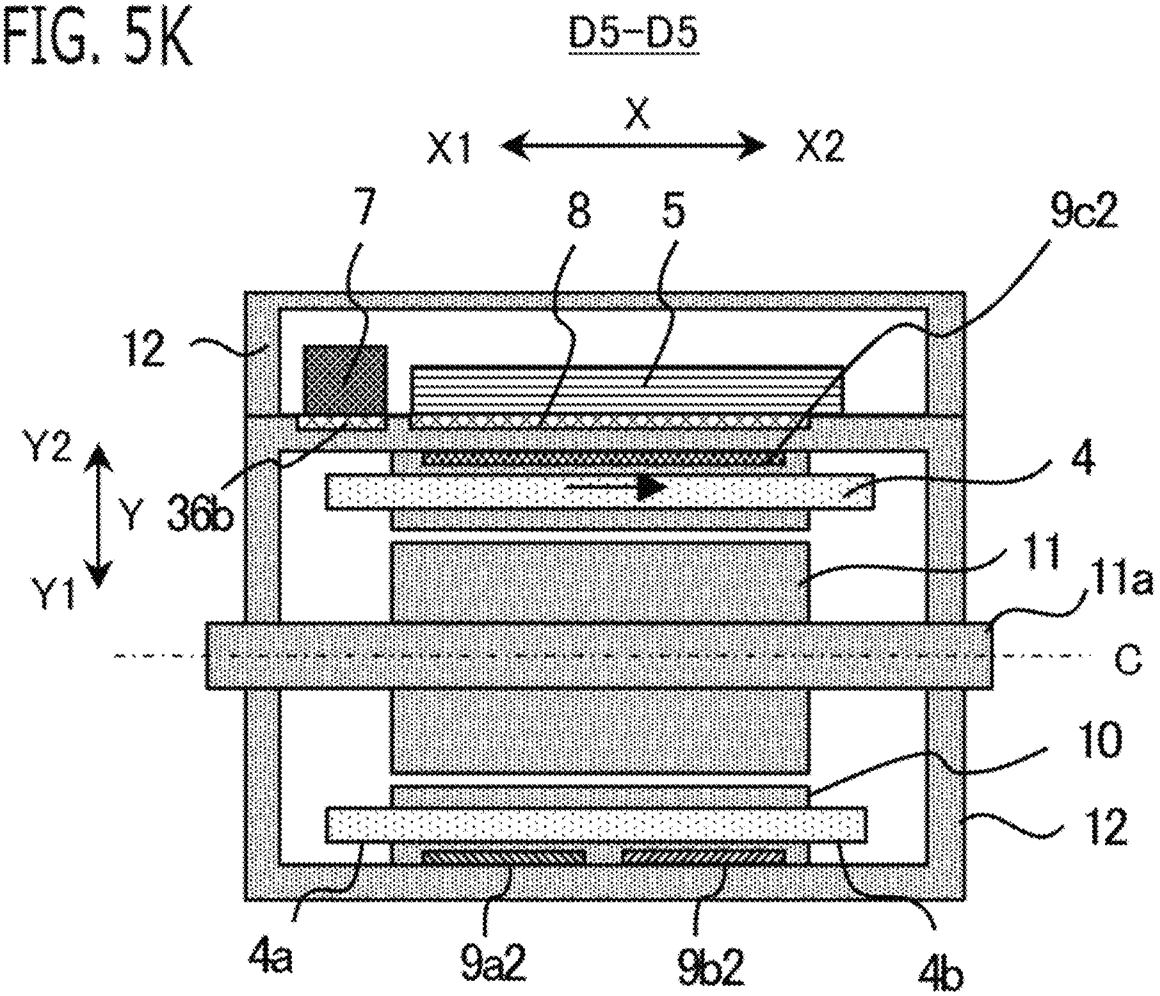
FIG. 5K is a schematic cross-sectional view of the rotary electric machine cut in the axial direction at D5-D5 cross section position of FIG. 5D, according to Embodiment 5.

FIG. 5A is a schematic diagram showing an order of refrigerant flow, and a cooling object. FIG. 5B is a schematic isometrical drawing of the rotary electric machine 1. FIG. 5C is an isometrical drawing of a principal part for explaining the motor cooling passage 9 provided in an outer circumferential part of the stator 10. FIG. 5D is an indication figure of cross section position showing a relation between the cross section positions of the rotary electric machine 1 and the motor cooling passage 9 which are shown in FIG. 5H to FIG. 5K. FIG. 5E is a schematic indication figure of cross section position of the rotary electric machine 1 cut in the radial direction Y, which shows the cross section position of the rotary electric machine 1 shown in FIG. 5F and FIG. 5G. FIG. 5F is a schematic cross-sectional view of the rotary electric machine 1 cut at E5-E5 cross section position of FIG. 5E, which shows a module cooling passage 8 and the like. FIG. 5G is a schematic cross-sectional view of the rotary electric machine 1 cut at F5-F5 cross section position of FIG. 5E, which shows a module cooling passage 8 and the like. FIG. 5H is a schematic cross-sectional view of the rotary electric machine 1 cut in the radial direction at A5-A5 cross section position of FIG. 5D. FIG. 5I is a schematic cross-sectional view of the rotary electric machine 1 cut in the axial direction at C5-C5 cross section position of FIG. 5D. FIG. 5J is a schematic cross-sectional view of the rotary electric machine 1 cut in the radial direction at B5-B5 cross section position of FIG. 5D. FIG. 5K is a schematic cross-sectional view of the rotary electric machine 1 cut in the axial direction at D5-D5 cross section position of FIG. 5D.

Similarly to Embodiment 1, the terminal block 7 is disposed on the axial direction one side X1 of the semiconductor power module 5.

Similarly to Embodiment 1, the module cooling passage 8 is disposed on the radial direction outside Y2 of the motor cooling passage 9, and the semiconductor power module 5 is disposed on the radial direction outside Y2 of the module cooling passage 8 so that heat transfer is possible.

A passage which connects between the module cooling passage 8 and the outflow port 36 of the module cooling passage 8 is referred as to an outflow passage 36*b*. In the present embodiment, the outflow passage 36*b* of the module cooling passage 8 is disposed on the radial direction inside Y1 of the terminal block 7 so that heat transfer is possible. According to this configuration, the terminal block 7 can be cooled by the refrigerant which flows through the module cooling passage 8.

The module cooling passage 8 is formed in a part of the case 12 or a housing which houses the inverter 2. The inflow port 16 of the module cooling passage 8 is formed in the circumferential direction other side R2 end of the module cooling passage 8, and is opened to the circumferential direction other side R2. An outlet 36*a* of the module cooling passage 8 is formed in the circumferential direction other side R2 part of the axial direction one side X1 end. Then, the outflow passage 36*b* extends to the circumferential direction one side R1 from the outlet 36*a* on the radial direction inside Y1 of the terminal block 7, and is opened to the circumferential direction one side R1. This opening is the outflow port 36 of the module cooling passage 8. The outflow passage 36*b* is also a cooling passage which cools the terminal block 7. The outflow passage 36*b* is disposed on the axial direction one side X1 of the module cooling passage 8. Similarly to the module cooling passage 8, the outflow passage 36*b* is formed in a part of the case 12 or a housing which houses the inverter 2.

The capacitor 6 is disposed on the circumferential direction one side R1 of the module cooling passage 8 and on the axial direction other side X2 of the outflow passage 36*b* so that heat transfer is possible.

The outflow port 36 of the module cooling passage 8 is connected with the inflow port 37 of the motor cooling passage 9 via the connection passage 18. The connection passage 18 is provided outside the case 12. In the present embodiment, since the outflow port 36 of the module cooling passage 8 is provided in the axial direction one side X1 part, the connection passage 18 extends also in the axial direction X.

6. Embodiment 6

Next, the rotary electric machine 1 according to Embodiment 6 will be explained. The explanation for constituent parts the same as those in Embodiment 1 will be omitted. The basic configuration of the rotary electric machine 1 according to the present embodiment is the same as that of Embodiment 1. Embodiment 6 is different from Embodiment 1 in arrangement of the capacitor 6.

Figure 6:
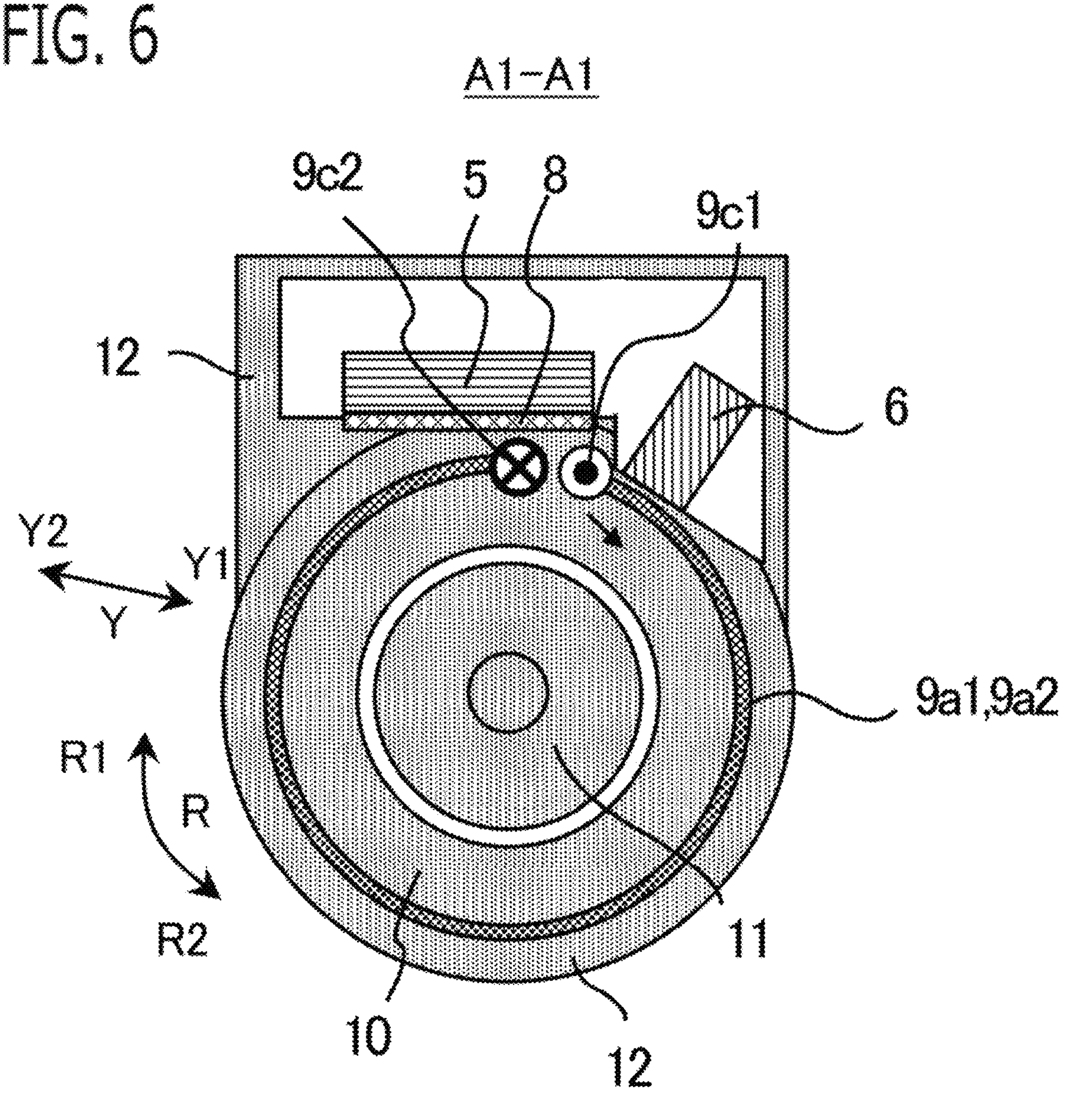
FIG. 6 is a schematic cross-sectional view of the rotary electric machine cut in the radial direction at A1-A1 cross section position of FIG. 1D same as FIG. 1G, according to Embodiment 6.

Similarly to FIG. 1G, FIG. 6 is a schematic cross-sectional view of the rotary electric machine 1 cut in the radial direction at A1-A1 cross section position of FIG. 1D.

In the present embodiment, a radial direction inside face of the capacitor 6 is disposed along a tangential direction of a circular part of the motor cooling passage 9 disposed on the radial direction inside Y1 of the capacitor 6. The radial-direction inside face of the capacitor 6 may not be parallel to the tangential direction, and an angle between the radial-direction inside face and the tangential direction may be 10 degrees or less.

According to this configuration, a distance between the motor cooling passage 9 and the radial-direction inside face of the capacitor 6 can be shortened, and the capacitor 6 can be effectively cooled by the motor cooling passage 9.

Other Embodiments

Figure 7:
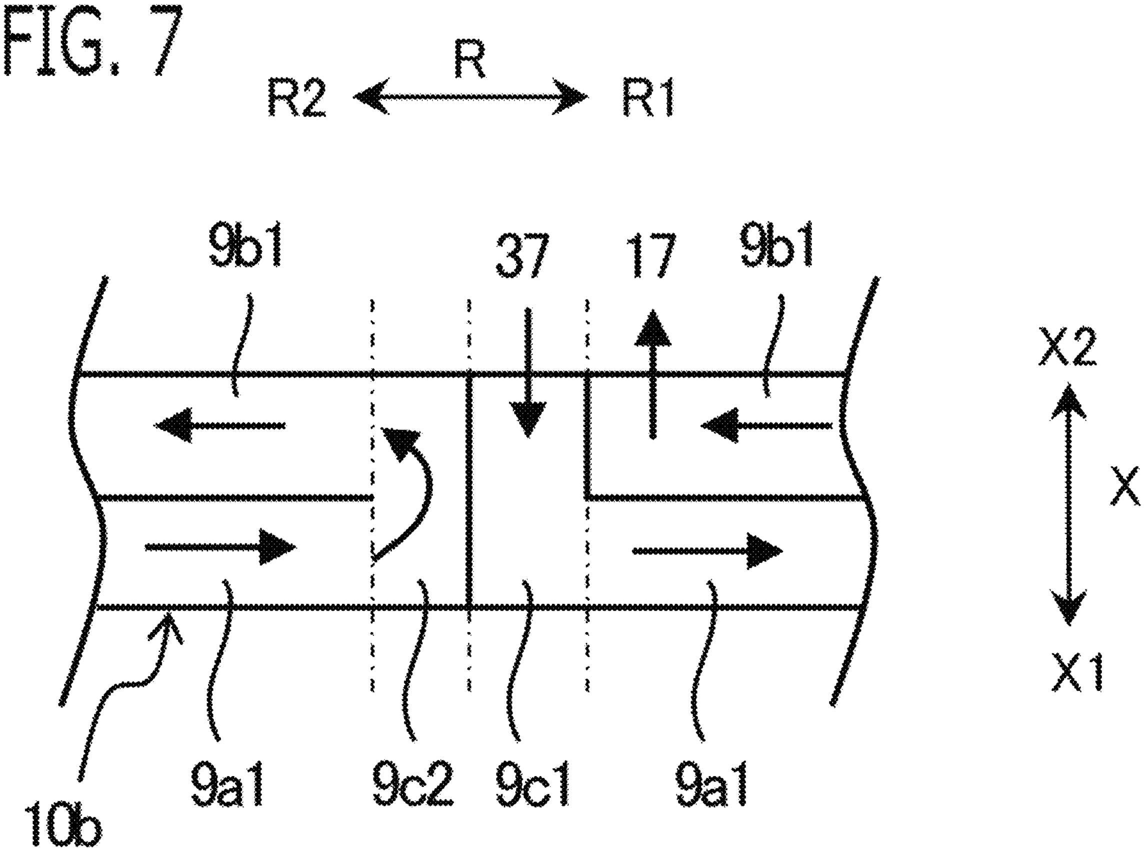
FIG. 7 shows a schematic diagram viewing a principal part of the motor cooling passage from the radial direction outside, according to other embodiments.

In each of the above-mentioned embodiments, there was explained the case where the motor cooling passage 9 is provided with two circumferential direction parts in which the one side circumferential direction passage 9*a* and the other side circumferential direction passage 9*b* are provided. However, the motor cooling passage 9 may be provided with one circumferential direction part in which the one side circumferential direction passage 9*a* and the other side circumferential direction passage 9*b* are provided. For example, FIG. 7 shows a schematic diagram viewing a principal part of the motor cooling passage 9 from the radial direction outside Y2. The motor cooling passage 9 may be provided with a circumferential direction part provided with the first one side circumferential direction passage 9*a*1 and the first other side circumferential direction passage 9*b*1; a circumferential direction part provided with the first axial direction passage 9*c*1; and a circumferential direction part provided with the second axial direction passage 9*c*2.

Then, the axial direction other side X2 part of the first axial direction passage 9*c*1 is connected to the inflow port 37. The axial direction one side X1 part of the first axial direction passage 9*c*1 is connected to the circumferential direction other side R2 end of the first one side circumferential direction passage 9*a*1. The axial direction one side X1 part of the second axial direction passage 9*c*2 is connected to the circumferential direction one side R1 end of the first one side circumferential direction passage 9*a*1. The axial direction other side X2 part of the second axial direction passage 9*c*2 is connected to the circumferential direction one side R1 end of the first other side circumferential direction passage 9*b*1. The circumferential direction other side R2 end of the first other side circumferential direction passage 9*b*1 is connected to the outflow port 17.

Figure 8:
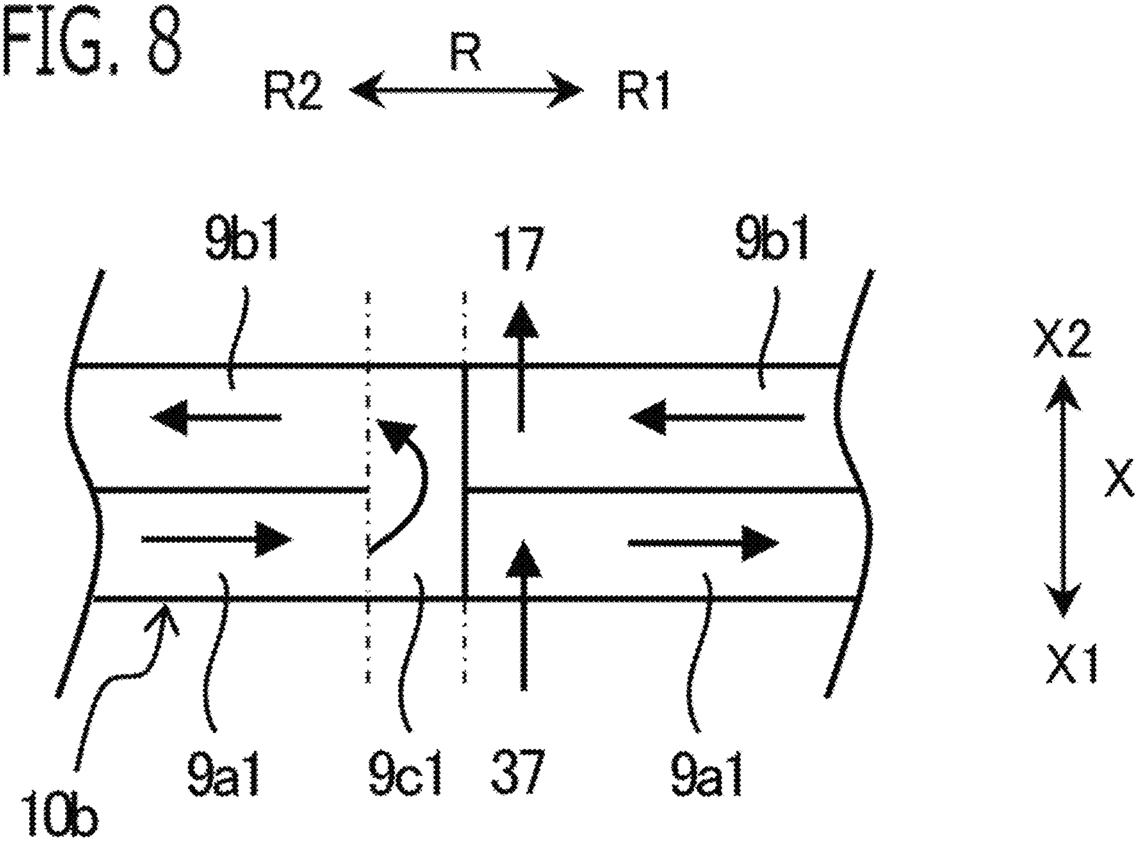
FIG. 8 shows a schematic diagram viewing a principal part of the motor cooling passage from the radial direction outside, according to other embodiments.

In each of the above-mentioned embodiments, there was explained the case where the motor cooling passage 9 is provided with two circumferential direction parts in which the axial direction passage 9*c* is provided. However, the motor cooling passage 9 may be provided with one circumferential direction part in which the axial direction passage 9*c* is provided. For example, FIG. 8 shows a schematic diagram viewing a principal part of the motor cooling passage 9 from the radial direction outside Y2. The motor cooling passage 9 may be provided with a circumferential direction part provided with the first one side circumferential direction passage 9*a*1 and the first other side circumferential direction passage 9*b*1; and a circumferential direction part provided with the first axial direction passage 9*c*1.

Then, the circumferential direction other side R2 end of the first one side circumferential direction passage 9*a*1 is connected to the inflow port 37. The circumferential direction one side R1 end of the first one side circumferential direction passage 9*a*1 is connected to the axial direction one side X1 part of the first axial direction passage 9*c*1. The axial direction other side X2 part of the first axial direction passage 9*c*1 is connected to the circumferential direction one side R1 end of the first other side circumferential direction passage 9*b*1. The circumferential direction other side R2 end of the first other side circumferential direction passage 9*b*1 is connected to the outflow port 17.

Figure 9:
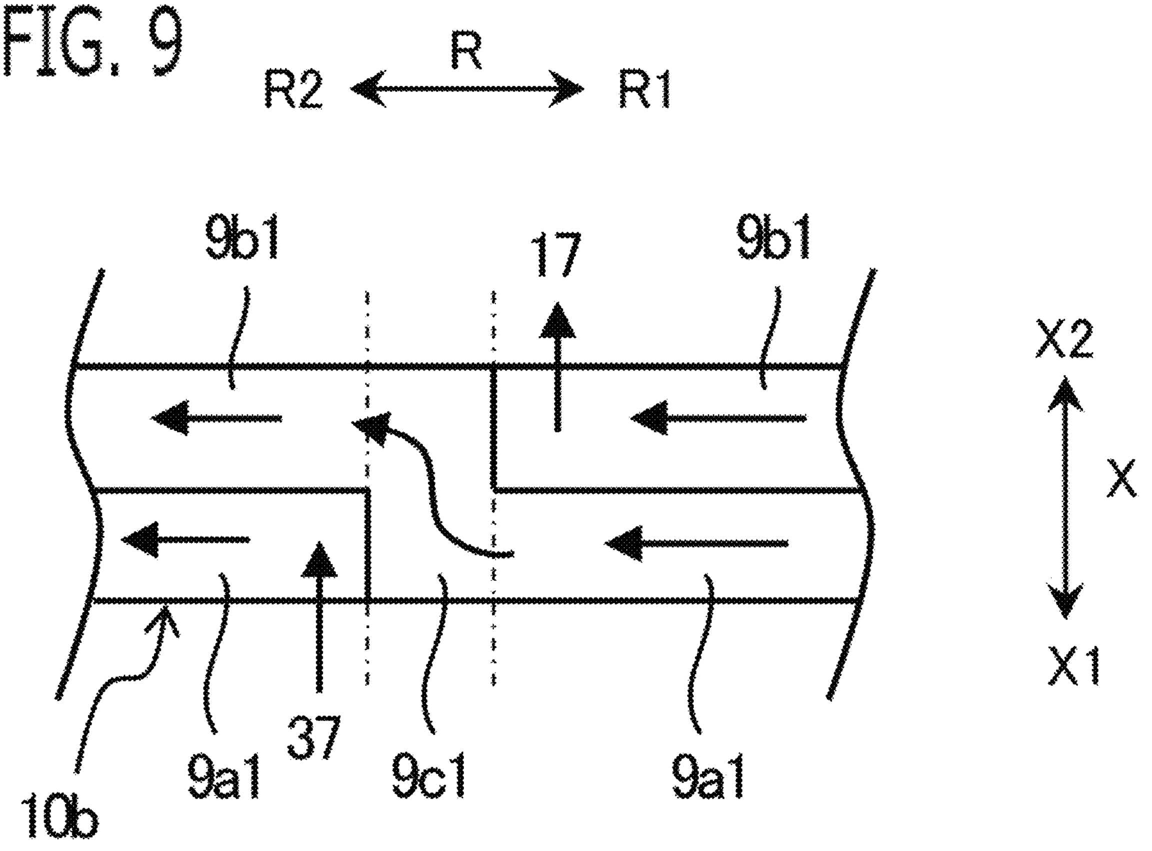
FIG. 9 shows a schematic diagram viewing a principal part of the motor cooling passage from the radial direction outside, according to other embodiments.

Alternatively, FIG. 9 shows a schematic diagram viewing a principal part of the motor cooling passage 9 from the radial direction outside Y2. The circumferential direction one side R1 end of the first one side circumferential direction passage 9*a*1 is connected to the inflow port 37. The circumferential direction other side R2 end of the first one side circumferential direction passage 9*a*1 is connected to the axial direction one side X1 part of the first axial direction passage 9*c*1. The axial direction other side X2 part of the first axial direction passage 9*c*1 is connected to the circumferential direction one side R1 end of the first other side circumferential direction passage 9b1. The circumferential direction other side R2 end of the first other side circumferential direction passage 9b1 is connected to the outflow port 17.

As described above, as long as a length of a part of the one side circumferential direction passage 9a which exists on an upstream side of a center position of a total length of the motor cooling passage 9 is longer than a length of a part of the other side circumferential direction passage 9b which exists on the upstream side of the center position of the total length of the motor cooling passage 9, a number of circumferential direction parts in which the one side circumferential direction passage 9a and the other side circumferential direction passage 9b are provided may be an arbitrary number, a number of circumferential direction parts in which the axial direction passage 9c is provided may be an arbitrary number, and arrangement and connection pattern of each passage may be arbitrary.

SUMMARY OF ASPECTS OF THE PRESENT DISCLOSURE

Hereinafter, the aspects of the present disclosure is summarized as appendixes.

APPENDIX 1

A rotary electric machine comprising:

a cylindrical tubular stator;

a winding that is distributed in a circumferential direction and is wound around the stator;

a rotor that is disposed on a radial direction inside of the stator;

a case that covers an outer circumferential face of the stator, and houses the stator, the winding, and the rotor; and a motor cooling passage that is provided in an outer circumferential part of the stator;

wherein the winding is connected in an one side coil end which is projected to the axial direction one side from the stator, wherein the motor cooling passage is provided with one or a plurality of circumferential direction parts that is provided with an one side circumferential direction passage which is an axial direction one side passage and an other side circumferential direction passage which is an axial direction other side passage, which are divided into the axial direction and extend in the circumferential direction; and one or a plurality of circumferential direction parts that is provided with an axial direction passage which communicates the one side circumferential direction passage and the other side circumferential direction passage and extends in the axial direction, wherein a refrigerant supplied from an inflow port flows through the one side circumferential direction passage and the other side circumferential direction passage in order via the axial direction passage, and then is discharged from an outflow port, a length of a part of the one side circumferential direction passage which exists on an upstream side of a center position of a total length of the motor cooling passage is longer than a length of a part of the other side circumferential direction passage which exists on the upstream side of the center position of the total length of the motor cooling passage.

APPENDIX 2

The rotary electric machine according to appendix 1, further comprising an inverter that is disposed on a radial direction outside of the stator, and is provided with a capacitor and a semiconductor power module which supply power to the winding, wherein the capacitor is disposed on the radial direction outside of a part of the motor cooling passage on the upstream side of the center position so that heat transfer is possible.

APPENDIX 3

The rotary electric machine according to appendix 2, wherein the one axial direction passage is provided in a part of the motor cooling passage on the upstream side of the center position, and wherein the capacitor is disposed on the radial direction outside of the one axial direction passage so that heat transfer is possible.

APPENDIX 4

The rotary electric machine according to appendix 2 or 3, wherein a radial direction inside face of the capacitor is disposed along a tangential direction of a circular part of the motor cooling passage disposed on the radial direction inside of the capacitor.

APPENDIX 5

The rotary electric machine according to any one of appendixes 1 to 4, further comprising:

an inverter that is disposed on a radial direction outside of the stator, and is provided with a capacitor and a semiconductor power module which supply power to the winding, and a module cooling passage that cools the semiconductor power module, and is connected with the motor cooling passage, wherein the module cooling passage is disposed on the radial direction outside of the motor cooling passage, and wherein the semiconductor power module is disposed on the radial direction outside of the module cooling passage so that heat transfer is possible.

APPENDIX 6

The rotary electric machine according to appendix 5, wherein the motor cooling passage and the module cooling passage are connected by a connection passage.

APPENDIX 7

The rotary electric machine according to appendix 6, wherein an outflow port of the module cooling passage is connected with the inflow port of the motor cooling passage via the connection passage.

APPENDIX 8

The rotary electric machine according to appendix 6 or 7, wherein the case further houses the inverter and the module cooling passage, and the connection passage is provided inside the case.

APPENDIX 9

The rotary electric machine according to any one of appendixes 6 to 8, wherein the inverter is provided with a terminal block which connects the winding to the capacitor and the semiconductor power module, and wherein an outflow passage of the module cooling passage is disposed on the radial direction inside of the terminal block so that heat transfer is possible.

APPENDIX 10

The rotary electric machine according to appendix 6 or 7, wherein the case further houses the inverter and the module cooling passage, and wherein the connection passage is provided outside the case.

APPENDIX 11

The rotary electric machine according to appendix 6, wherein the motor cooling passage is divided into an upstream side passage part and a downstream side passage part by the connection passage, and wherein, as the connection passage, an upstream side connection passage which connects a downstream end of the upstream side passage part with an inflow port of the module cooling passage, and a downstream side connection passage which connects an outflow port of the module cooling passage with an upstream end of the downstream side passage part are provided.

APPENDIX 12

The rotary electric machine according to appendix 11, wherein a division position between the upstream side passage part and the downstream side passage part exists on the upstream side of the center position.

APPENDIX 13

The rotary electric machine according to any one of appendixes 1 to 4, further comprising an inverter that is disposed on a radial direction outside of the stator, and is provided with a capacitor and a semiconductor power module which supply power to the winding, wherein the semiconductor power module is disposed on the radial direction outside of the part of the motor cooling passage on the upstream side of the center position so that heat transfer is possible.

APPENDIX 14

The rotary electric machine according to any one of appendixes 1 to 10 and 13, wherein the motor cooling passage is provided with a circumferential direction part provided with the first one side circumferential direction passage and the first other side circumferential direction passage; a circumferential direction part provided with the second one side circumferential direction passage and the second a other side circumferential direction passage; circumferential direction part provided with the first axial direction passage; and a circumferential direction part provided with the second axial direction passage, wherein the circumferential direction one side part of the first other side circumferential direction passage is connected to the inflow port, the circumferential direction other side end of the first other side circumferential direction passage is connected to the axial direction the other side part of the first axial direction passage, the axial direction one side part of the first axial direction passage is connected to the circumferential direction other side end of the first one side circumferential direction passage, the circumferential direction one side part of the first one side circumferential direction passage is connected to the circumferential direction other side end of the second one side circumferential direction passage, the circumferential direction one side part of the second one side circumferential direction passage is connected to the axial direction one side part of the second axial direction passage, the axial direction other side part of the second axial direction passage is connected to the circumferential direction one side part of the second other side circumferential direction passage, and the circumferential direction other side end of the second other side circumferential direction passage is connected to the outflow port, wherein the second axial direction passage is adjacently disposed on the circumferential direction other side of the first axial direction passage, and wherein a length in the circumferential direction of the circumferential direction part provided with the second one side circumferential direction passage and the second other side circumferential direction passage is longer than a length in the circumferential direction of the circumferential direction part provided with the first one side circumferential direction passage and the first other side circumferential direction passage.

APPENDIX 15

The rotary electric machine according to appendix 11 or 12, wherein the motor cooling passage is provided with a circumferential direction part provided with the first one side circumferential direction passage and the first other side circumferential direction passage; a circumferential direction part provided with the second one side circumferential direction passage and the second other side circumferential direction passage; and a circumferential direction part provided with the first axial direction passage, wherein the downstream side connection passage is disposed on the axial direction one side of the upstream side connection passage, the upstream side connection passage and the downstream side connection passage are adjacent to each other in the axial direction, the circumferential direction one side part of the first other side circumferential direction passage is connected to the inflow port, the circumferential direction other side end of the first other side circumferential direction passage is connected to an upstream end of the upstream side connection passage, a downstream end of the upstream side connection passage is connected to an inflow port of the module cooling passage, an outflow port of the module cooling passage is connected to an upstream end of the downstream side connection passage, an downstream end of the downstream side connection passage is connected to the circumferential direction other side end of the first one side circumferential direction passage, the circumferential direction one side part of the first one side circumferential direction passage is connected to the circumferential direction other side end of the second one side circumferential direction passage, the circumferential direction one side part of the second one side circumferential direction passage is connected to the axial direction one side part of the first axial direction passage, the axial direction other side part of the first axial direction passage is connected to the circumferential direction one side part of the second other side circumferential direction passage, and the circumferential direction other side end of the second other side circumferential direction passage is connected to the outflow port, wherein the first axial direction passage is adjacently disposed on the circumferential direction other side of the upstream side connection passage and the downstream side connection passage, and wherein a length in the circumferential direction of the circumferential direction part provided with the second one side circumferential direction passage and the second d other side circumferential direction passage is longer than a length in the circumferential direction of the circumferential direction part provided with the first one side circumferential direction passage and the first other side circumferential direction passage.

APPENDIX 16

The rotary electric machine according to any one of appendixes 1 to 15, wherein the rotary electric machine is a driving force source of wheel of vehicle.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A rotary electric machine comprising:

a cylindrical tubular stator;

a winding that is distributed in a circumferential direction and is wound around the stator;

a rotor that is disposed on a radial direction inside of the stator;

a case that covers an outer circumferential face of the stator, and houses the stator, the winding, and the rotor; and a motor cooling passage that is provided in an outer circumferential part of the stator;

wherein the winding is connected in an one side coil end which is projected to the axial direction one side from the stator, wherein the motor cooling passage is provided with one or a plurality of circumferential direction parts that is provided with an one side circumferential direction passage which is an axial direction one side passage and an other side circumferential direction passage which is an axial direction other side passage, which are divided into the axial direction and extend in the circumferential direction; and one or a plurality of circumferential direction parts that is provided with an axial direction passage which communicates the one side circumferential direction passage and the other side circumferential direction passage and extends in the axial direction, wherein a refrigerant supplied from an inflow port flows through the one side circumferential direction passage and the other side circumferential direction passage in order via the axial direction passage, and then is discharged from an outflow port, a length of a part of the one side circumferential direction passage which exists on an upstream side of a center position of a total length of the motor cooling passage is longer than a length of a part of the other side circumferential direction passage which exists on the upstream side of the center position of the total length of the motor cooling passage.

2. The rotary electric machine according to claim 1, further comprising an inverter that is disposed on a radial direction outside of the stator, and is provided with a capacitor and a semiconductor power module which supply power to the winding, wherein the capacitor is disposed on the radial direction outside of a part of the motor cooling passage on the upstream side of the center position so that heat transfer is possible.

3. The rotary electric machine according to claim 2, wherein the one axial direction passage is provided in a part of the motor cooling passage on the upstream side of the center position, and wherein the capacitor is disposed on the radial direction outside of the one axial direction passage so that heat transfer is possible.

4. The rotary electric machine according to claim 2, wherein a radial direction inside face of the capacitor is disposed along a tangential direction of a circular part of the motor cooling passage disposed on the radial direction inside of the capacitor.

5. The rotary electric machine according to claim 1, further comprising:

an inverter that is disposed on a radial direction outside of the stator, and is provided with a capacitor and a semiconductor power module which supply power to the winding, and a module cooling passage that cools the semiconductor power module, and is connected with the motor cooling passage, wherein the module cooling passage is disposed on the radial direction outside of the motor cooling passage, and wherein the semiconductor power module is disposed on the radial direction outside of the module cooling passage so that heat transfer is possible.

6. The rotary electric machine according to claim 5, wherein the motor cooling passage and the module cooling passage are connected by a connection passage.

7. The rotary electric machine according to claim 6, wherein an outflow port of the module cooling passage is connected with the inflow port of the motor cooling passage via the connection passage.

8. The rotary electric machine according to claim 6, wherein the case further houses the inverter and the module cooling passage, and the connection passage is provided inside the case.

9. The rotary electric machine according to claim 6, wherein the motor cooling passage is divided into an upstream side passage part and a downstream side passage part by the connection passage, and wherein, as the connection passage, an upstream side connection passage which connects a downstream end of the upstream side passage part with an inflow port of the module cooling passage, and a downstream side connection passage which connects an outflow port of the module cooling passage with an upstream end of the downstream side passage part are provided.

10. The rotary electric machine according to claim 9, wherein a division position between the upstream side passage part and the downstream side passage part exists on the upstream side of the center position.

11. The rotary electric machine according to claim 1, further comprising an inverter that is disposed on a radial direction outside of the stator, and is provided with a capacitor and a semiconductor power module which supply power to the winding, wherein the semiconductor power module is disposed on the radial direction outside of the part of the motor cooling passage on the upstream side of the center position so that heat transfer is possible.

12. The rotary electric machine according to claim 1, wherein the motor cooling passage is provided with a circumferential direction part provided with the first one side circumferential direction passage and the first other side circumferential direction passage; a circumferential direction part provided with the second one side circumferential direction passage and the second other side circumferential direction passage; a circumferential direction part provided with the first axial direction passage; and a circumferential direction part provided with the second axial direction passage, wherein a first circumferential direction part of the first other side circumferential direction passage is connected to the inflow port, a second circumferential direction end opposite to the first circumferential direction of the first other side circumferential direction passage is connected to a second axial direction part of the first axial direction passage, a first axial direction part opposite to the second axial direction of the first axial direction passage is connected to the second circumferential direction end of the first one side circumferential direction passage, the first circumferential direction part of the first one side circumferential direction passage is connected to the second circumferential direction end of the second one side circumferential direction passage, the first circumferential direction part of the second one side circumferential direction passage is connected to the first axial direction part of the second axial direction passage, the second axial direction part of the second axial direction passage is connected to the first circumferential direction part of the second other side circumferential direction passage, and the second circumferential direction end of the second other side circumferential direction passage is connected to the outflow port, wherein the second axial direction passage is adjacently disposed on the second circumferential direction of the first axial direction passage, and wherein a length in the circumferential direction of the circumferential direction part provided with the second one side circumferential direction passage and the second other side circumferential direction passage is longer than a length in the circumferential direction of the circumferential direction part provided with the first one side circumferential direction passage and the first other side circumferential direction passage.

13. The rotary electric machine according to claim 9, wherein the motor cooling passage is provided with a circumferential direction part provided with the first one side circumferential direction passage and the first other side circumferential direction passage; a circumferential direction part provided with the second one side circumferential direction passage and the second other side circumferential direction passage; and a circumferential direction part provided with the first axial direction passage, wherein the downstream side connection passage is disposed on a first axial direction of the upstream side connection passage, the upstream side connection passage and the downstream side connection passage are adjacent to each other in the axial direction, a first circumferential direction part of the first other side circumferential direction passage is connected to the inflow port, a second circumferential direction end opposite to the first circumferential direction of the first other side circumferential direction passage is connected to an upstream end of the upstream side connection passage, a downstream end of the upstream side connection passage is connected to an inflow port of the module cooling passage, an outflow port of the module cooling passage is connected to an upstream end of the downstream side connection passage, a downstream end of the downstream side connection passage is connected to the second circumferential direction end of the first one side circumferential direction passage, the first circumferential direction part of the first one side circumferential direction passage is connected to the second circumferential direction end of the second one side circumferential direction passage, the first circumferential direction part of the second one side circumferential direction passage is connected to a second axial direction part opposite to the first axial direction of the first axial direction passage, the first axial direction part of the first axial direction passage is connected to the first circumferential direction part of the second other side circumferential direction passage, and the second circumferential direction end of the second other side circumferential direction passage is connected to the outflow port, wherein the first axial direction passage is adjacently disposed on the second circumferential direction of the upstream side connection passage and the downstream side connection passage, and wherein a length in the circumferential direction of the circumferential direction part provided with the second one side circumferential direction passage and the second other side circumferential direction passage is longer than a length in the circumferential direction of the circumferential direction part provided with the first one side circumferential direction passage and the first other side circumferential direction passage.

14. The rotary electric machine according to claim 1, wherein the rotary electric machine is a driving force source of wheel of vehicle.

* * * * *